(12) United States Patent
Giannoni et al.

(10) Patent No.: US 11,761,678 B2
(45) Date of Patent: *Sep. 19, 2023

(54) HEAT EXCHANGE CELL AND METHOD

(71) Applicant: CONDEVO S.p.A., Milan (IT)

(72) Inventors: Rocco Giannoni, Marudo (IT); Remo Castelli, Marudo (IT)

(73) Assignee: CONDEVO S.p.A., Milan (IT)

( * ) Notice: Subject to any disclaimer, the term of this patent is extended or adjusted under 35 U.S.C. 154(b) by 392 days.

This patent is subject to a terminal disclaimer.

(21) Appl. No.: 17/122,901

(22) Filed: Dec. 15, 2020

(65) Prior Publication Data
US 2021/0131701 A1 May 6, 2021

Related U.S. Application Data

(63) Continuation of application No. 15/126,166, filed as application No. PCT/IB2014/059901 on Mar. 17, 2014, now Pat. No. 10,900,691.

(51) Int. Cl.
*F24H 1/16* (2022.01)
*F24H 9/14* (2006.01)
(Continued)

(52) U.S. Cl.
CPC ............. *F24H 1/165* (2013.01); *F24H 1/43* (2013.01); *F24H 8/00* (2013.01); *F24H 9/148* (2013.01);
(Continued)

(58) Field of Classification Search
CPC ... F24H 1/165; F24H 1/43; F24H 8/00; F24H 9/148; F28D 7/024; F28D 21/0007;
(Continued)

(56) References Cited

U.S. PATENT DOCUMENTS 4,901,677 A * 2/1990 Demetri ................. F22B 21/26
165/102
5,687,678 A 11/1997 Suchomel
(Continued)

FOREIGN PATENT DOCUMENTS

CN          1809716          7/2006
CN          201066197        5/2008
(Continued)

OTHER PUBLICATIONS

Office Action dated Dec. 24, 2020 for Japanese Patent Application No. 2019-184451.
(Continued)

*Primary Examiner* — Steven B Mcallister
*Assistant Examiner* — Benjamin W Johnson
(74) *Attorney, Agent, or Firm* — Clayton, McKay & Bailey, PC

(57) ABSTRACT

A heat exchange cell includes a casing, a heat exchanger in which a first heat transfer fluid flows, a feeding zone, and first and second collection chambers for a second heat transfer fluid. The casing can include rear, front, and peripheral side walls. The heat exchanger can be helically-shaped, mounted in the casing, and include at least one tubular duct for the flow of the first heat transfer fluid. The tubular duct can be coiled about a longitudinal axis and define a helix. The feeding zone of the second heat transfer fluid can be defined in the casing coaxially and internally with respect to the helix. The first chamber can be defined externally with respect to the heat exchanger by a radially outer wall thereof and the peripheral side wall. The second chamber can be at least partially delimited by at least one separating element.

20 Claims, 18 Drawing Sheets

(51) Int. Cl.

| | | |
|---|---|---|
| *F24H 8/00* | (2022.01) | |
| *F28F 13/08* | (2006.01) | |
| *F28D 7/02* | (2006.01) | |
| *F28F 3/02* | (2006.01) | |
| *F28F 9/22* | (2006.01) | |
| *F24H 1/43* | (2022.01) | |
| *F28D 21/00* | (2006.01) | |
| *F28F 9/20* | (2006.01) | |
| *F28F 9/00* | (2006.01) | |

(52) U.S. Cl.
CPC ......... *F28D 7/024* (2013.01); *F28D 21/0007* (2013.01); *F28F 3/022* (2013.01); *F28F 9/001* (2013.01); *F28F 9/005* (2013.01); *F28F 9/20* (2013.01); *F28F 9/22* (2013.01); *F28F 13/08* (2013.01); *F28D 2021/0024* (2013.01); *F28F 2240/00* (2013.01); *F28F 2270/00* (2013.01); *Y02B 30/00* (2013.01)

(58) Field of Classification Search
CPC ... F28D 2021/0024; F28F 3/022; F28F 9/001; F28F 9/005; F28F 9/20; F28F 9/22; F28F 13/08; F28F 2240/00; F28F 2270/00; Y02B 30/00
USPC ...................................................... 122/250 R
See application file for complete search history.

(56) References Cited

U.S. PATENT DOCUMENTS

| | | | |
|---|---|---|---|
| 7,281,497 B2 | 10/2007 | Le Mer | |
| 2006/0196450 A1* | 9/2006 | Le Mer | F24H 1/43 |
| | | | 122/18.1 |
| 2006/0219395 A1 | 10/2006 | Le Mer | |
| 2006/0266306 A1 | 11/2006 | Le Mer | |
| 2007/0000653 A1 | 1/2007 | Alessandrini | |
| 2007/0209606 A1* | 9/2007 | Hamada | F28F 1/02 |
| | | | 122/18.1 |
| 2011/0185985 A1 | 8/2011 | Ahmady | |
| 2012/0312513 A1* | 12/2012 | Le Mer | F24H 8/00 |
| | | | 165/159 |

FOREIGN PATENT DOCUMENTS

| | | | |
|---|---|---|---|
| CN | 102341651 | 2/2012 | |
| CN | 102822607 | 12/2012 | |
| CN | 103732996 | 4/2014 | |
| EP | 0745813 | 12/1996 | |
| EP | 1160521 | 12/2001 | |
| EP | 1281919 | 2/2003 | |
| EP | 1281919 A2 * | 2/2003 | ............... F24H 1/43 |
| FR | 2846075 | 4/2004 | |
| JP | 2005321170 | 11/2005 | |
| JP | 2006503260 | 1/2006 | |
| JP | 2005321172 | 9/2007 | |
| JP | 2017500457 | 1/2017 | |
| JP | 2017515089 | 6/2017 | |
| RU | 2419040 | 5/2011 | |
| WO | 9416272 | 7/1994 | |
| WO | 2004036121 | 4/2004 | |
| WO | 2005080900 | 9/2005 | |
| WO | 2012156954 | 11/2012 | |

OTHER PUBLICATIONS

Decision of Grant (along with English Translation) dated Oct. 17, 2018 for RU2016139958/06(063702) filed Mar. 9, 2015.

International Search Report dated Jul. 7, 2015, for PCT/IB2015/051709.

Office Action dated Aug. 3, 2018, in JP Application No. 2017-500457.

Office Action dated Aug. 22, 2017, in CN Application No. 201580014258.

* cited by examiner

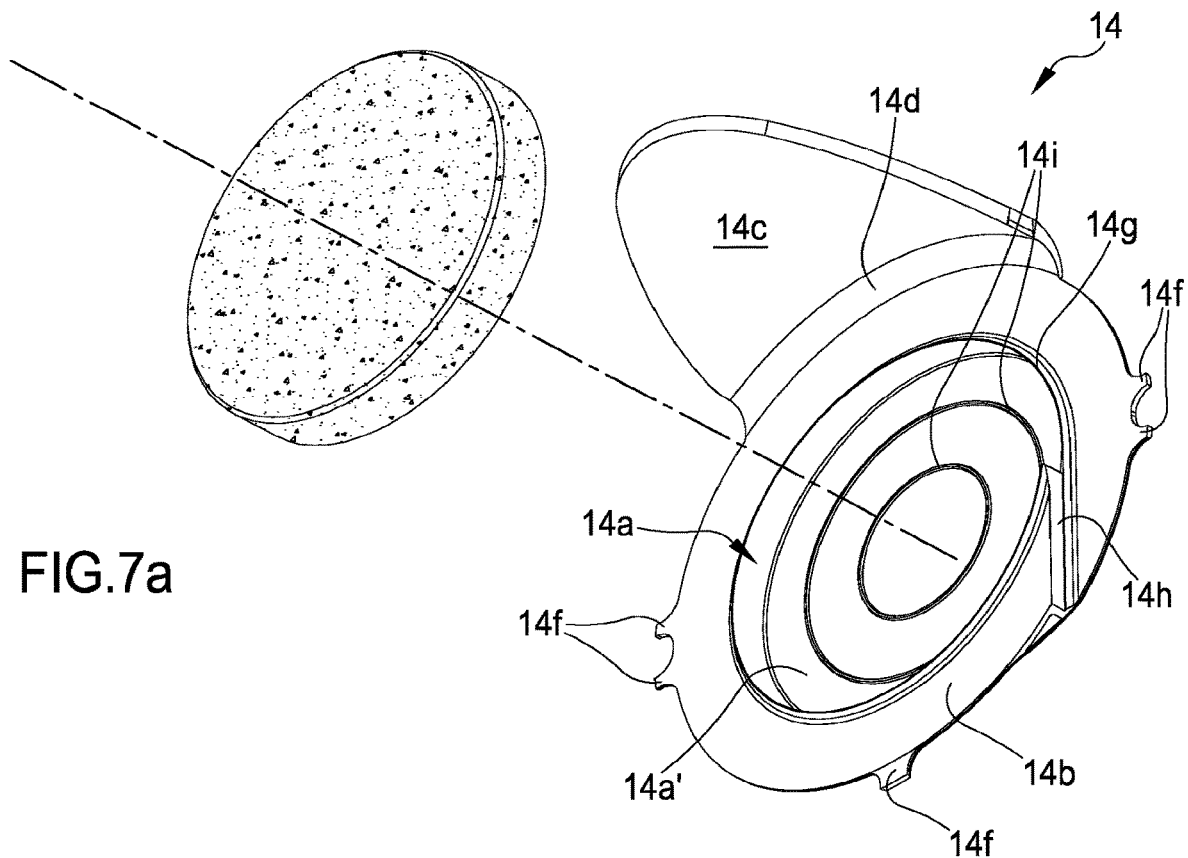
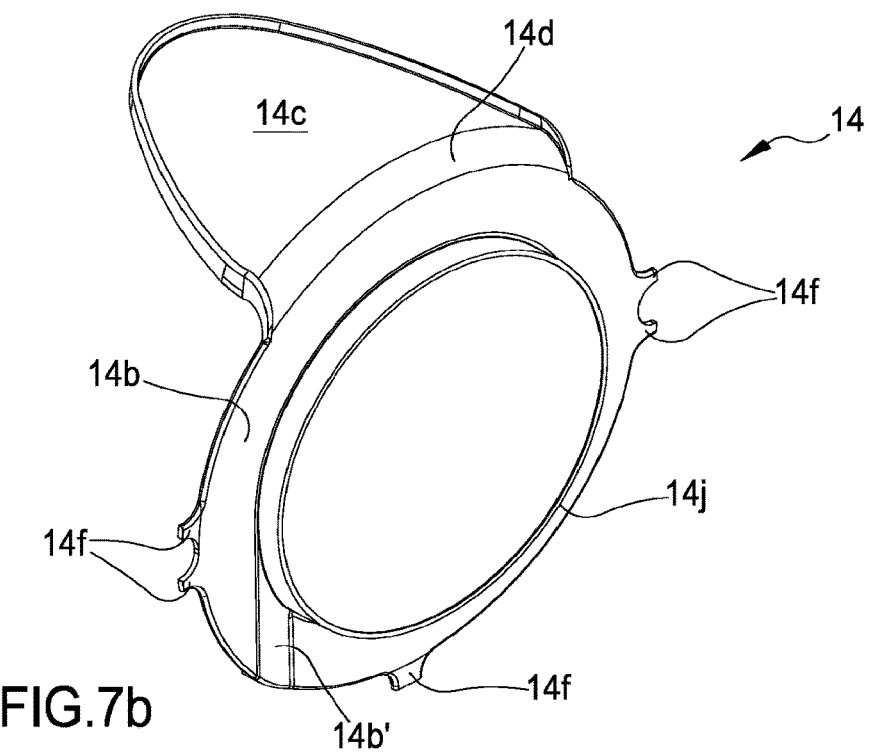

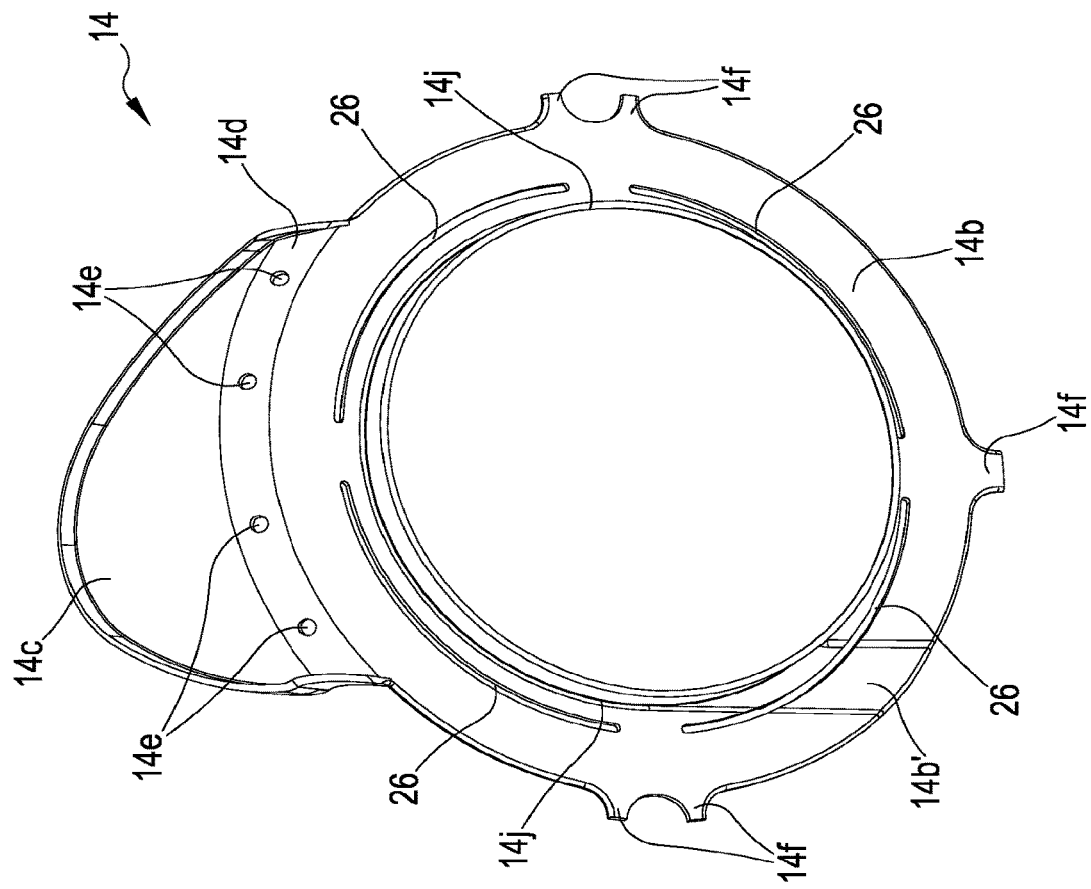
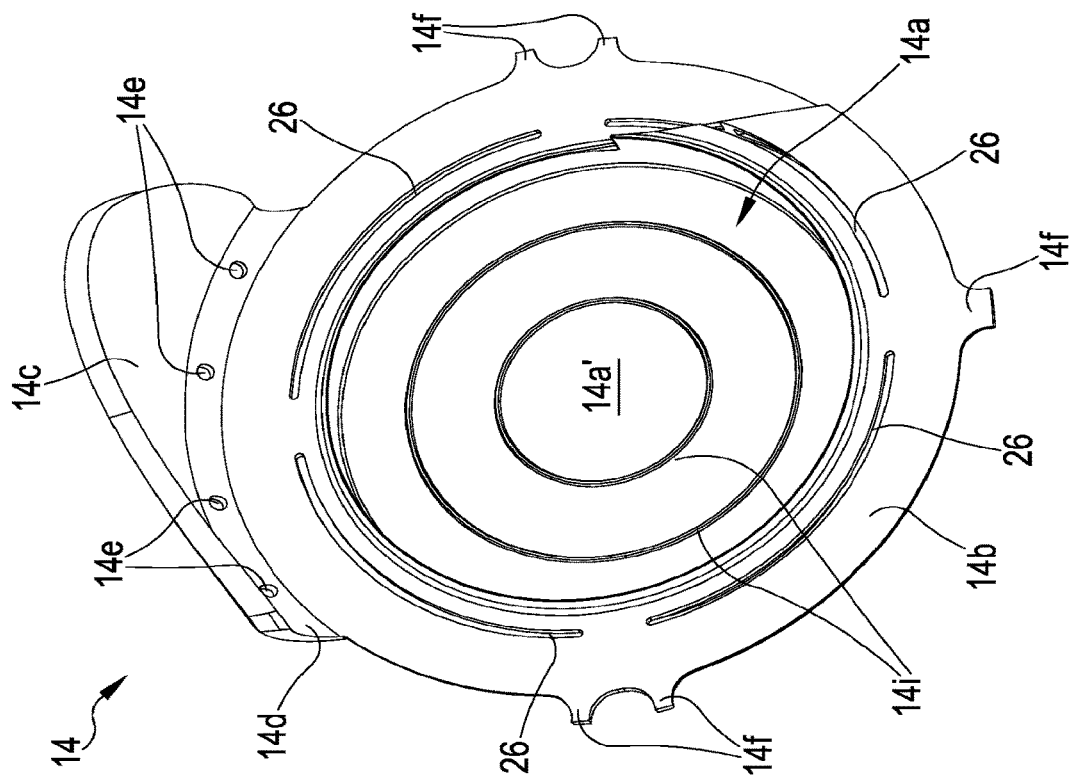

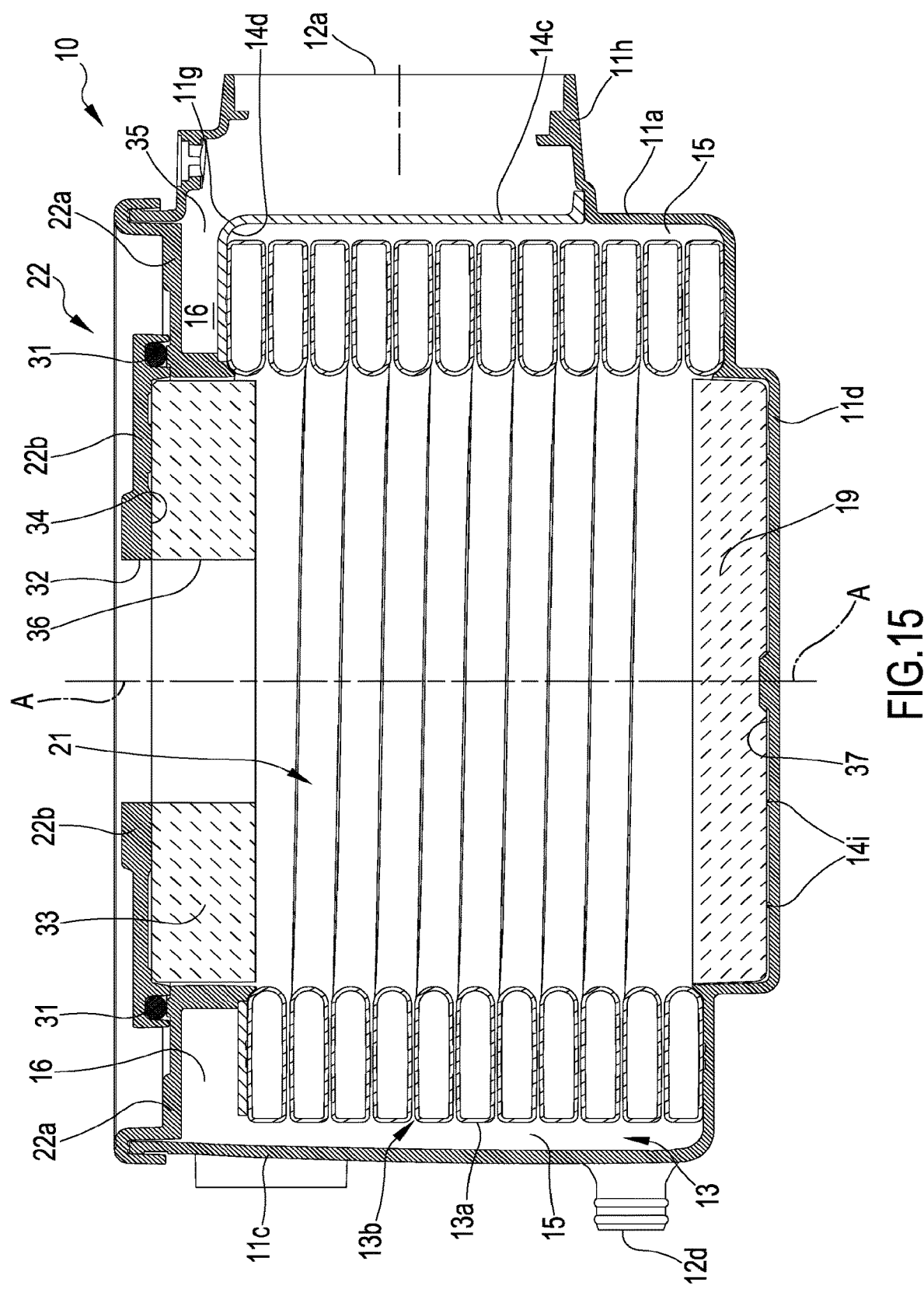

HEAT EXCHANGE CELL AND METHOD

This application is a continuation of U.S. patent application Ser. No. 15/126,166, filed Sep. 14, 2016, now U.S. Pat. No. 10,900,691, which is a national phase filing of PCT/IB2015/051709, filed Mar. 9, 2015, which claims priority to PCT/IB2014/059901, filed Mar. 17, 2014, the entireties of all of which are hereby incorporated by reference.

BACKGROUND OF THE INVENTION

The present invention relates to a heat exchange cell and to a heat exchange method which can be carried out by means of such a cell.

In particular, the invention relates to a heat exchange cell comprising at least one heat exchanger mounted in a respective containment casing, which cell has a preferred although non exclusive use in water heating apparatuses, in heating or air conditioning systems, for both domestic use and for use in complexes of dwelling-houses, industrial areas or shopping areas.

In the following description and in the appended claims, the term: "heat exchange cell" is used to indicate a unit, preferably of a modular type, comprising at least one heat exchanger mounted in a respective containment casing and configured to carry out a heat exchange between a first heat transfer fluid circulating within the heat exchanger, and a second heat transfer fluid flowing in the containment casing externally to the heat exchanger itself.

In a preferred embodiment and as will become apparent hereinafter, the invention relates to a heat exchange cell and method of the condensation type.

RELATED ART

As is known, the function of a heat exchange cell is to transfer thermal energy between two fluids, hereinafter precisely referred to as first and second heat transfer fluid.

For example, in the case of common domestic gas boilers, the function of the heat exchange cell is to heat water circulating inside the heat exchanger mounted in the cell by means of hot combustion gases produced by a burner.

To this end, the heat exchange cells of the condensation type are for example configured to use both the heat developed as a result of combustion, and the latent condensation heat contained in the combustion gases. The amount of the latent condensation heat that is recovered mainly depends on the temperature of the return water from the heating system that enters the lower temperature side of the heat exchange cell.

Currently, heat exchange cells particularly appreciated for their characteristics of high heat exchange efficiency (related to the presence of a large exchange surface), compactness, competitive weight and cost are those equipped with a helically-shaped heat exchanger housed in a respective containment casing.

In particular, such a heat exchanger comprises at least one tubular duct coiled about a longitudinal axis of the helix according to a plurality of coils having a cross-section of a value determined according to the desired thermal power.

The coils of such a tubular duct may have either a flat cross-section, such as for example described in International patent application WO 94/16272 in the name of Le Mer or in European patent application EP 0 745 813 in the name of Viessmann Werke, or a circular cross-section, such as for example described in International patent application WO 2005/080900 in the name of Cosmogas.

In both cases, an interstice is defined between the consecutive coils of the helically wound tubular duct forming a fluid path for the flow of the second heat transfer fluid (for example hot combustion gases produced by a burner) along a substantially radial, or an axial-radial direction if the coils are inclined with respect to a longitudinal axis of the helix. The interstice defined between the consecutive coils of the helically wound tubular duct has a predetermined and preferably constant width.

The helically-shaped tubular duct defines coaxially and internally with respect to the heat exchanger a feeding zone of the second heat transfer fluid in which, in gas-liquid heat exchange cells for water-heating apparatuses, a burner is generally mounted.

As said, the second heat transfer fluid therefore tends to flow through the interstices between the coils in a substantially radial or axial-radial direction, thus transferring heat to the first heat transfer fluid circulating inside the duct.

In a first configuration of heat exchange cells of known type and as described for example in International patent application WO 2005/080900 in the name of Cosmogas, or in European patent application EP 1 160 521 in the name of Viessmann Werke, once having flown through the interstices between the coils, the second heat transfer fluid reaches an annular collection chamber externally defined with respect to the heat exchanger and externally delimited by the side wall of the casing, to then flow directly to the outside of the cell through an opening formed in the side wall of the cell casing.

In a second configuration of heat exchange cells of known type and as described for example in International patent application WO 94/16272 in the name of Le Mer, or in International patent application WO 2004/036121 in the name of Giannoni France, on the other hand, a second collection chamber is provided for the second heat transfer fluid defined internally and coaxially to the heat exchanger, at the rear of a partition element supporting a disc of a thermal insulation made of refractory material. Such a disc is positioned within the heat exchanger so as to divide the helix formed by the same in two parts, respectively upstream and downstream of the partition element with respect to the flowing direction of the second heat transfer fluid.

In this way, the helically-shaped heat exchanger is divided into a front part, or primary heat exchange portion, positioned upstream of said partition element with respect to the flowing direction of the combustion gases and directly exposed to the heat produced by the burner and into a rear part, or secondary heat exchange portion, positioned downstream of said partition element and screened by the same with respect to the burner.

According to this second configuration of the cell, the hot combustion gases produced by the burner—before being discharged from the heat exchange cell—flow through in series firstly the primary heat exchange portion of the heat exchanger towards the annular collection chamber, passing through the interstices separating the coils thereof radially or axially-radially from the inside outwards, and then the secondary heat exchange portion towards the second collection chamber, passing through the interstices separating the coils thereof radially or axially-radially from the outside inwards along a direction substantially perpendicular or inclined with respect to the side wall of the containment casing.

From the functional point of view, the two front and rear portions of the helically-shaped heat exchanger are intended to absorb the heat generated by the burner and by the flue gases upstream of the partition element so as to determine the maximum thermal power that can be delivered by the heat exchanger at the maximum outlet temperature of the first heat transfer fluid and, respectively, to carry out the recovery of the latent condensation heat of the hot combustion gases downstream of the partition element.

In a third known configuration of heat exchange cells and as described for example in U.S. Pat. No. 4,901,677 the aforementioned second collection chamber of the second heat transfer fluid is externally defined with respect to a coiled heat exchanger with finned tubes downstream of a separating element supporting a disc made of a heat-insulating refractory material, said separating element being mounted in turn at the rear of the heat exchanger.

The second collection chamber of the second heat transfer fluid is therefore defined between the separating element and the rear wall of the containment casing of the heat exchange cell and the first and second collection chamber of the second heat transfer fluid are in fluid communication with each other by means of an annular passage defined at a radially outer position with respect to the separating element and configured to allow a flow of the second heat transfer fluid substantially in parallel and close to a peripheral side wall of the containment casing.

According to the configuration described in International patent applications WO 94/16272, WO 2004/036121 and in U.S. Pat. No. 4,901,677, the second collection chamber comprises an outlet passage of the second fluid centrally arranged with respect to the chamber and coaxially arranged with respect to the casing of the heat exchange cell, so as to discharge the combustion gases from the second collection chamber in a direction parallel to a longitudinal axis of the helix of the heat exchanger.

More specifically, according to the third known cell configuration described in U.S. Pat. No. 4,901,677, the second heat transfer fluid comes out from the heat exchange cell by flowing through a discharge channel axially and centrally extending from the rear wall of the containment casing of the cell itself.

SUMMARY OF THE INVENTION

The Applicant has noted that the above known configurations of heat exchange cells have some drawbacks and limitations.

As to the heat exchange cells having said first configuration without inner partition elements and described in WO 2005/080900 or EP 1 160 521, the Applicant has observed that these cells—while allowing a full exploitation of the capacity of the heat exchanger to absorb the heat generated by the burner both by heat exchange with the combustion gases and by radiation and, therefore, while allowing to achieve a high maximum thermal power at the maximum outlet temperature of the first heat transfer fluid—do not allow an optimal heat exchange between the combustion gases that radially flow through the heat exchanger between the coils and the first heat transfer fluid circulating in the tubular duct of the heat exchanger.

In fact, the Applicant has found that the combustion gases tend to flow within the containment casing of the heat exchange cell preferentially towards the outlet opening formed in the side wall of the casing, along paths which tend to by-pass along the axial extension of the heat exchanger a portion of the coils which is far from being negligible.

This drawback is particularly felt when the heat exchange cell is mounted horizontally in the operating configuration, since the outlet opening of the combustion gases is in this case positioned towards the top for obvious reasons of opportunity and ease of installation, thereby promoting a convective rise of the gases that increase the phenomena of formation of preferential by-pass pathways of the heat exchanger.

The resulting loss of heat exchange efficiency must therefore be compensated in this type of cells by using a suitable number of coils of the heat exchanger which is often higher than desirable to fully exploit a given thermal power of the burner, with an increase in the axial extension of the exchanger and, consequently, of the heat exchange cell.

In addition to that, the limited heat exchange efficiency related to said preferential flows of the combustion gases within the cell also involves a limited condensing capacity of the latter, which is to the detriment of the overall efficiency thereof or which requires an increase in the number of coils of the heat exchanger for achieving the same efficiency.

As to the heat exchange cells having said second configuration provided with partition elements within the heat exchanger and described in WO 94/16272 and WO 2004/036121, the Applicant has noted that these cells—while allowing to achieve a higher condensing capacity compared to the first configuration of cells with an increase in the efficiency of the cell accomplished by the portion of the heat exchanger positioned downstream of the partition element—do not allow the full exploitation of the thermal power of the burner, since only the front part of the heat exchanger is directly exposed to the burner and is therefore capable to absorb heat therefrom both by heat exchange with the combustion gases and by radiation.

It therefore ensues that for the same overall efficiency of the heat exchange cell, this second known configuration of the cells has a size smaller than that of the above first configuration thanks to a greater condensing capacity, but a lower maximum thermal power at the maximum outlet temperature of the first heat transfer fluid.

Moreover, the Applicant has observed that the discharge configuration of the combustion gases from the second collection chamber shown in the prior art documents illustrated above with reference to the second and to the third known configuration of the cells, requires the use of collection and conveying elements of the gases downstream of the heat exchanger and externally with respect to the heat exchange cell thereby increasing the axial extension of the latter in an undesired manner.

In this regard, the third known cell configuration described in U.S. Pat. No. 4,901,677 is particularly penalised in terms of axial extension due to the presence of the aforementioned axial discharge channel of the second heat transfer fluid extending from the rear wall of the containment casing of the cell.

In this concern, it should be observed that the reduction of the overall dimensions is an ever increasingly stringent requirement of the market in combination with minimisation of costs and of the pressure losses on the one hand, and the maximisation of the heat exchange efficiency, on the other hand.

The problem underlying the invention is therefore that of obviating the above mentioned drawbacks and, in particular, that of providing a heat exchange cell which, with the same overall efficiency of the cell, combines the advantageous aspects of the known cell configurations described above with a maximum flexibility of installation and a minimum axial size.

More specifically, the invention aims to devise a heat exchange cell which—with the same overall efficiency of the cell—is capable to deliver a high maximum thermal power at the maximum outlet temperature of the first heat transfer fluid and at the same time has an improved flexibility of installation, as well as an improved heat exchange capacity between the first and the second heat transfer fluid with the minimum axial size of the cell.

According to a first aspect thereof, the invention relates to a heat exchange cell as defined in the appended claims; preferred features of the cell are set forth in the dependent claims.

More particularly, the invention relates to a heat exchange cell comprising:
a containment casing comprising a rear wall, a front wall and a peripheral side wall,
a helically-shaped heat exchanger comprising at least one tubular duct for the flow of a first heat transfer fluid coiled about a longitudinal axis of the helix according to a plurality of coils; the heat exchanger being mounted in the containment casing;
a feeding zone of a second heat transfer fluid, intended for the heat exchange with the first heat transfer fluid, defined in the casing coaxially and internally with respect to the heat exchanger;
a first collection chamber of the second heat transfer fluid externally defined with respect to the heat exchanger between a radially outer wall of the heat exchanger and the peripheral side wall of the containment casing; and
a second collection chamber of the second heat transfer fluid at least partially delimited by at least one separating element mounted at an axially external position with respect to said heat exchanger;
wherein the peripheral side wall of the casing encloses and laterally delimits the heat exchanger and the first collection chamber of the second heat transfer fluid substantially along the entire axial extension thereof;
wherein said second collection chamber is defined at an axially external position with respect to said heat exchanger between said at least one separating element, the peripheral side wall and the rear wall or the front wall of the containment casing;
wherein the first and the second collection chambers of the second heat transfer fluid are separated from one another by the at least one separating element and are in fluid communication with each other by means of at least one first passage configured to allow a flow of the second heat transfer fluid from said first to said second collection chamber substantially in parallel to said peripheral side wall and in proximity thereto;
wherein said separating element comprises a heat exchange portion in contact with at least one portion of an end coil of the heat exchanger and configured to allow a heat exchange between said at least one coil portion of the heat exchanger and said second collection chamber; and
wherein the heat exchange cell further comprises at least one second passage allowing a fluid outlet from the second collection chamber, said second passage being peripherally defined in said second collection chamber between an axial end of the peripheral side wall and the rear wall or the front wall of the containment casing.

Within the framework of the present description and of the subsequent claims, the various "axial", "longitudinal", "transverse" or "radial" directions or orientations of the cell or of the elements thereof as well as the positioning of said elements in the cell such as "front", "rear" or "side" are intended to be referred to the longitudinal axis of the heat exchanger helix, if not otherwise indicated.

In the operating configuration of the heat exchange cell, such a longitudinal axis may be horizontal or vertical; it follows that the various directions, orientation or positioning of the cell or of the elements thereof should be considered in relation to the orientation of the longitudinal axis of the heat exchanger helix.

In the following description and for descriptive simplicity, reference will conventionally be made, without any limiting intent, to an operating position of the heat exchange cell in which the longitudinal axis of the heat exchanger is horizontal.

Within the framework of the present invention and of the subsequent claims, the clause: "separating element mounted at an axially external position with respect to the heat exchanger" is used to indicate that the separating element is mounted externally to and axially flanking the heat exchanger and not interposed between the coils, as envisaged by the aforementioned second configuration of the heat exchange cells of the prior art.

In the following description and in the appended claims, the term: "thermal power" is used to indicate the amount of energy transferred per unit time in terms of heat between the first heat transfer fluid circulating in the heat exchanger and the second heat transfer fluid circulating externally thereto.

Within the framework of the present description and of the subsequent claims, the term: heat transfer fluid, is used to indicate any fluid capable of receiving/transferring heat from/to external heat sources and of transferring the heat to different points of an apparatus or system in which the fluid circulates.

Thus, for example, in the case of gas-liquid heat exchange cells, the first heat transfer fluid may consist of water to be heated (such as in boilers for domestic use) and the second heat transfer fluid may consist of hot gases, for example combustion gases coming from a burner, or the first heat transfer fluid may consist of a compressed gas or other fluid at relatively high temperature and the second heat transfer fluid may consist of cold air coming from a suitable circulation apparatus (such as in air conditioning systems).

In the following description and in the appended claims, the term: "size" of the containment casing or of the heat exchanger of the cell is used to indicate the space occupied by the same along the axial (i.e., longitudinal) direction and transversely to the axial direction, for example in height and width if the containment casing is substantially prismatic in shape or along the radial direction if the containment casing is substantially cylindrical in shape.

In the following description and in the appended claims, the terms: "upstream" and "downstream" are used to indicate the position of an element or part of the cell with reference to the flowing direction of the respective heat transfer fluid, for example the second heat transfer fluid.

Within the framework of the present description and of the subsequent claims, the feature according to which the separating element comprises a heat exchange portion configured to allow a heat exchange between the aforementioned at least one portion of an end coil of the heat exchanger and the second collection chamber, and evidently with the second heat transfer fluid flowing therein in the operating conditions of the cell, indicates that at least the heat exchange portion of the separating element has such a structure, for example thickness and/or composition, that does not substantially hinder the heat transmission between the end coil of the heat exchanger and the second collection chamber.

The separating element of the heat exchange cell according to the invention, therefore, has a structure that differs from the structure of the separating element described in U.S. Pat. No. 4,901,677, which consists of an insulating body that, in practice, is configured to prevent the heat exchange between the end coil of the heat exchanger and the collection chamber of the second heat transfer fluid defined downstream of the separating element.

Preferably, at least the heat exchange portion of the separating element is made of a material, preferably metallic, having a high thermal conductivity, such as for example aluminium or steel.

In the following description and in the appended claims, the term: "material having a high thermal conductivity", is intended to indicate a material having thermal conductivity preferably equal to or greater than 10 W/(m·K).

For the purposes of the invention, the separating element can be made as a single piece of one and the same material or can comprise parts made of different materials, provided that the heat exchange portion of the separating element has such a structure as defined above which does not substantially hinder the heat transmission between the end coil of the heat exchanger and the second collection chamber.

Thus, for example, the separating element can comprise a metal part, in the heat exchange portion and a part made of a high-performance plastic material provided with properties of resistance to chemicals, flame and water vapour, such as for example polyphenylene sulphide (PPS), in the portions less thermally stressed, for example those portions that do not face the feeding zone of the second heat transfer fluid.

Preferably, the separating element has a suitably thin thickness so as to maximise the heat transmission between the end coil of the heat exchanger and the collection chamber of the second heat transfer fluid, but at the same time capable to impart adequate characteristics of mechanical resistance to the separating element itself.

Preferably, the separating element has a thickness comprised between 0.8 and 5 mm as a function of the material which it is made of. Thus, for example, the separating element has a thickness comprised between 0.8 and 2.4 mm if it is made of steel, whereas it has a thickness comprised between 2.2 and 4.0 mm if it is made of aluminium.

For the purposes of the invention, the containment casing of the heat exchange cell can be made of any structural material suitable for this type of use, such as for example aluminium, steel or high performance plastics with properties of resistance to chemicals, flame and water vapour, such as for example polyphenylene sulphide (PPS).

For the purposes of the invention, the aforementioned heat exchanger may be made of any material, preferably a metal, having a high thermal conductivity that is commonly used for heat exchange purposes, such as aluminium or steel.

According to the present invention, the Applicant has perceived that compared to the cell configurations of known type described above, it is possible to deliver a high maximum thermal power at the maximum outlet temperature of the first heat transfer fluid and at the same time achieve an improved flexibility of installation, as well as an improved heat exchange capacity while having—with the same overall efficiency of the cell—the minimum axial size of the cell, by simultaneously intervening on the following characteristics of the cell:

- on the mounting position of the separating element at an axially external position with respect to the heat exchanger;
- on the configuration of the first fluid passage adapted to allow a flow of the second heat transfer fluid from the first to the second collection chamber substantially in parallel to the peripheral side wall of the casing of the cell and in proximity to such a wall;
- on the position of the second fluid passage allowing a fluid outlet from the second collection chamber of the second heat transfer fluid, a passage that is peripherally defined in the second collection chamber between an axial end of the peripheral side wall of the containment casing of the cell and the rear wall or the front wall of the casing itself; and
- on the configuration of the heat exchange portion of the separating element in contact with at least one portion of an end coil of the heat exchanger, a configuration adapted to allow a heat exchange between the end coil of the heat exchanger and the second collection chamber and, in particular, with the second heat transfer fluid flowing in the latter when the cell is in operation.

The Applicant has first of all experimentally found that the mounting position of the separating element (at an axially external position with respect to the heat exchanger) allows to obtain the advantageous technical effect—particularly appreciated in the case of gas-liquid heat exchange cells provided with a burner—of exposing the entire axial extension of the heat exchanger to the burner and to the combustion gases, so as to obtain—with the same overall efficiency of the cell—a high maximum thermal power at the maximum outlet temperature of the first heat transfer fluid.

In this regard, the Applicant has found that the maximum thermal power at the maximum outlet temperature of the first heat transfer fluid of a heat exchange cell according to the invention provided with burner is advantageously greater—with the same efficiency and size of the cell—with respect to the second known configuration of the cells described above.

Basically, the heat exchange cell of the invention is advantageously capable of exploiting to the maximum extent and in a homogeneous manner the heat exchange with the second heat transfer fluid and, when the cell is provided with a burner, of exploiting to the maximum extent the thermal power generated by the latter, in all of the operating conditions, due to the fact that the heat exchanger is directly exposed for its entire axial extension to the second heat transfer fluid, for example to the combustion gases generated by the burner itself.

The Applicant has also found that thanks to the mounting of the at least one separating element at an axially external position with respect to the heat exchanger, it is advantageously possible to simultaneously achieve the additional advantageous technical effect of increasing the flexibility of installation of the heat exchange cell in a heating or air conditioning apparatus, in particular in water heating apparatuses.

In this way, in fact, it is possible to define the second collection chamber of the second heat transfer fluid at an axially external position with respect to the heat exchanger between the separating element, the peripheral side wall of the containment casing and the rear wall or the front wall of the latter.

In this way, it is thus advantageously possible to have a heat exchange cell configured to adapt itself—with minimum structural modifications—to the installation requirements in the heating or air conditioning apparatus and, in particular, to the positioning of evacuation ducts from the apparatus of the second heat transfer fluid discharged from the cell.

The Applicant has also experimentally found that the configuration of the first fluid passage between the first and the second collection chambers and the peripheral position of the second passage allowing a fluid outlet from the second collection chamber cooperate in a synergic manner to achieve, within the cell, a particular flow of the second heat transfer fluid that exerts the following advantageous technical effects:
  i) that of uniformly distributing the flow of the second heat transfer fluid both in its flowing through the heat exchanger along a substantially radial or axial-radial direction, and in its flowing through the first collection chamber in the part of the cell upstream of the separating element;
  ii) that of uniformly distributing the flow of the second heat transfer fluid in the passage towards the second collection chamber, a flow that is distributed by the separating element along a peripheral part of the casing of the cell, that is to say, substantially in parallel to the peripheral side wall of the casing and in proximity to such a wall; and
  iii) that of uniformly distributing the flow of the second heat transfer fluid in the second collection chamber defined downstream of the separating element reducing to the maximum possible extent the dead zones within such a collection chamber that is substantially completely engaged by the flow of the second heat transfer fluid.

The uniform flow thus obtained in the second collection chamber achieves the additional advantageous effect of increasing the heat exchange with the first heat transfer fluid flowing within the end coil of the heat exchanger and this without any substantial increase in the axial size of the cell.

The Applicant has finally experimentally found that the peripheral configuration of the first fluid passage between the first and the second collection chambers and the peripheral position of the second passage allowing a fluid outlet from the second collection chamber cooperate in a synergistic manner with the characteristics of location (axially externally with respect to the heat exchanger) and of heat exchange configuration of the heat exchange portion of the separating element.

As a matter of fact, this synergistic cooperation allows to increase the heat exchange between the second heat transfer fluid flowing in the second collection chamber and the first heat transfer fluid flowing within the end coil of the heat exchanger.

Basically, the second collection chamber of the second heat transfer fluid advantageously constitutes an additional heat exchange element of the cell engaged by a uniform and well distributed flow of the second heat transfer fluid, an element which allows to increase the heat exchange efficiency of the cell and in particular—when desired—to increase the condensing effect thanks to the heat exchange with the heat exchange portion of the separating element which, in turn, is in contact with the end coil of the heat exchanger to which the first heat transfer fluid, having the lowest temperature within the heat exchange cell, is fed during operation.

According to a second aspect thereof, the present invention relates to a heat exchange method as defined in the appended claims; preferred features of the method are set forth in the dependent claims.

More particularly, the invention relates to a heat exchange method between a first heat transfer fluid and a second heat transfer fluid in a heat exchange cell comprising:
  a containment casing comprising a rear wall, a front wall and a peripheral side wall;
  a helically-shaped heat exchanger comprising at least one tubular duct for the flow of a first transfer fluid coiled about a longitudinal axis of the helix according to a plurality of coils; the heat exchanger being mounted in said containment casing;
  a feeding zone of a second heat transfer fluid, intended for the heat exchange with the first heat transfer fluid, defined in the casing coaxially and internally with respect to the heat exchanger;
  a first collection chamber of the second heat transfer fluid externally defined with respect to the heat exchanger between a radially outer wall of the heat exchanger and the peripheral side wall of the containment casing;
  a second collection chamber of the second heat transfer fluid at least partially delimited by at least one separating element mounted at an axially external position with respect to the heat exchanger;
  wherein the peripheral side wall of the casing encloses and laterally delimits the heat exchanger and the first collection chamber of the second heat transfer fluid substantially along the entire axial extension thereof;
  wherein said first and second collection chambers of the second heat transfer fluid are separated from one another by said at least one separating element so as to define said second collection chamber between said at least one separating element, the peripheral side wall and the rear wall or the front wall of the containment casing;
  wherein said separating element comprises a heat exchange portion in contact with at least one portion of an end coil of the heat exchanger and configured to allow a heat exchange between said at least one portion of an end coil of the heat exchanger and the second heat transfer fluid flowing in said second collection chamber;
  wherein the method comprises the steps of:
    feeding the second heat transfer fluid in said feeding zone;
    collecting the second heat transfer fluid in said first collection chamber;
    feeding the second heat transfer fluid from said first to said second collection chamber substantially in parallel to the peripheral side wall of the casing and in proximity thereto by means of at least one first passage formed between a peripheral edge of said at least one separating element and the peripheral side wall of the containment casing and/or in a peripheral area of said at least one separating element;
    carrying out a heat exchange between the second heat transfer fluid flowing in said second collection chamber and the first heat transfer fluid flowing in the end coil of the heat exchanger by means of said heat exchange portion of the separating element; and
    discharging the second heat transfer fluid from the second collection chamber along a direction substantially perpendicular to a longitudinal axis of the heat exchange cell by means of at least one second passage allowing a fluid outlet peripherally defined in said second collection chamber between an axial end of the peripheral side wall and the rear wall or the front wall of the containment casing.

Advantageously, the heat exchange method of the invention achieves the technical effects described above in relation to the heat exchange cell.

According to a third aspect thereof, the present invention relates to a heating or air conditioning apparatus comprising a heat exchange cell as defined in the present description.

The present invention in at least one of the above aspects may have at least one of the following preferred features; the latter may in particular be combined with each other as desired to meet specific application requirements.

In a preferred embodiment, the helix-shaped heat exchanger comprises at least one bare tubular duct, in other words, a duct devoid of heat exchange fins extending from its outer surface.

In this way, it is advantageously possible to avoid in a substantially complete manner a deterioration in heat exchange performance over time, related to the accumulation of scales at the contact area between the heat exchange fins and the outer surface of the tubular duct, an area that is difficult to clean in practice.

In a preferred embodiment, the tubular duct of the heat exchanger has a flat, preferably oval, cross section.

Preferably, the coils of the aforementioned plurality of coils of the tubular duct of the heat exchanger have a flat cross section the major axis of which is substantially perpendicular to the longitudinal axis of the helix of the heat exchanger.

In an additional preferred embodiment and in order to satisfy specific application requirements, the major axis of the flat cross section of the coils of the tubular duct of the heat exchanger is inclined with respect to the longitudinal axis of the helix.

Preferably, the angle of inclination is comprised between 60° and 87°.

In a preferred embodiment, the peripheral side wall of the casing encloses and laterally delimits the heat exchanger and the first collection chamber of the second heat transfer fluid substantially without interruption.

Within the framework of the present description and of the following claims, such a preferred feature indicates that the peripheral side wall of the containment casing is devoid of openings configured to allow a substantial flow of the second heat transfer fluid towards an outlet opening of the latter directly communicating with the outside of the cell, thereby substantially by-passing the second collection chamber.

Preferably, the separating element mounted axially flanking, at the rear or at the front of the heat exchanger, is configured to structurally separate the second collection chamber of the second heat transfer fluid from both the first collection chamber and from the feeding zone of the second heat transfer fluid defined coaxially and internally with respect to the heat exchanger, in such a way as to allow a peripheral flow of the second heat transfer fluid within the containment casing of the cell towards the second collection chamber along a direction substantially parallel to the peripheral side wall of the casing and adjacent thereto.

To this end and as will be outlined in greater detail hereinafter, the separating element may have any shape suitable for the purpose and may be provided or not with through openings for allowing the passage of the second heat transfer fluid in relation to the shape and configuration of the containment casing of the cell.

Preferably, said at least one first passage for fluid communication between the first and the second collection chamber of the second heat transfer fluid is formed between a peripheral edge of the at least one separating element and the peripheral side wall of the containment casing and/or in a peripheral area of the at least one separating element.

In a particularly preferred embodiment, the heat exchange cell comprises a plurality of first passages formed between a peripheral edge of the at least one separating element and the peripheral side wall of the containment casing and/or in a peripheral area of the separating element.

The Applicant has experimentally found that by suitably adjusting the configuration of the first fluid passage(s) between the first and the second collection chambers it is possible to achieve the additional advantageous technical effect of optimising the fluid dynamics of the second heat transfer fluid both in flowing through the heat exchanger along a substantially radial or axial-radial direction, and in flowing through the first collection chamber in the part of the cell upstream of the separating element.

Such an optimisation of the fluid dynamics of the second heat transfer fluid involves in turn an advantageous increase of the heat exchange efficiency.

In a preferred embodiment of the invention, the optimisation of the fluid dynamics of the second heat transfer fluid is conveniently obtained by adjusting the total cross-sectional area of fluid flow defined by the aforementioned at least one or by the aforementioned plurality of first passages.

In particular, the Applicant has experimentally found that it is possible to achieve, in a simple and effective manner, an optimisation of the fluid dynamics of the second heat transfer fluid in the area of the cell upstream of the separating element by imparting to the total cross-sectional area of fluid flow defined by said at least one or by said plurality of first passages an advantageously low value with respect to the overall internal cross section of the casing of the cell.

In a preferred embodiment, the total cross-sectional area of fluid flow defined by said at least one or by said plurality of first passages is comprised between 5% and 30% of the total internal cross-section of the containment casing.

In this concern, the Applicant has experimentally found that values of the total cross-sectional area of fluid flow below 5% of the total internal cross-section of the containment casing can negatively influence the operating stability of the heat exchange cell.

The Applicant has also experimentally found that values of the total cross-sectional area of fluid flow above 30% of the total internal cross-section of the containment casing do not allow to achieve substantial additional effects of fluid dynamic optimisation in addition to the aforementioned effect of a uniform flow distribution of the second heat transfer fluid while flowing through the heat exchanger, the first collection chamber and while flowing through the separating element towards the second collection chamber, an effect related—as outlined above—to the peripheral location of the first fluid passage(s).

In a more preferred embodiment, the total cross-sectional area of fluid flow defined by said at least one or by said plurality of first passages is comprised between 5% and 25%.

Depending upon the needs, such a total cross-sectional area of fluid flow can be adjusted in one of the following preferred ranges: between 5% and 20%, between 15% and 30%, between 10% and 20%, between 10% and 25%, between 15% and 25% or between 15% and 20% of the total cross section of the containment casing.

Within the framework of the present description and in the subsequent claims, all numbers expressing amounts, quantities, percentages, and so forth, are to be understood as being preceded in all instances by the term "about" except where otherwise indicated. Also, all ranges of numerical entities include all the possible combinations of the maximum and minimum numerical values and all the possible intermediate ranges therein, in addition to those specifically indicated herein.

The Applicant has in particular experimentally found that by observing such specific values of the total cross-sectional area of fluid flow of the second heat transfer fluid defined by the first passage(s), an effective optimisation of the fluid dynamics of the second heat transfer fluid—which outwardly crosses the heat exchanger substantially radially or axially-radially—is achieved along substantially the entire axial extension of the heat exchanger and along substantially the entire circumferential extension thereof, significantly reducing preferential fluid paths and by-pass phenomena of the coils of the heat exchanger.

In particular, the Applicant has found that the flow rate of the second heat transfer fluid that radially or axially-radially crosses the heat exchanger flowing through the interstices defined between the coils can be made substantially constant along the axial extension of the heat exchanger itself.

The Applicant also considers that such a flow rate is made substantially constant also along the circumferential extension of the heat exchanger ensuring that the second heat transfer fluid flows in a uniform manner within the first annular collection chamber along the circumferential extension of the heat exchanger, significantly reducing the presence in the first collection chamber of dead zones not involved by the fluid flow.

The Applicant has found that, by optimising in this manner the fluid dynamics of the second heat transfer fluid and therefore the heat exchange between such a fluid and the heat exchanger, it is advantageously possible to increase the heat exchange efficiency of the cell—with respect to the first configuration without internal partition elements illustrated above—thereby reducing the size of the heat exchanger—in particular along the axial direction—with a consequent advantageous reduction of costs, consumption of material and size both of the heat exchanger, and of the heat exchange cell which contains the same.

In a preferred embodiment, the cross-sectional area of fluid flow defined by said at least one or by said plurality of first passages is uniformly distributed along the perimeter of the peripheral side wall of the containment casing.

In this way, it is advantageously possible to uniformly adjust the distribution along the circumferential direction of the second heat transfer fluid thereby optimising the fluid dynamics thereof.

In an additional preferred embodiment, the cross-sectional area of fluid flow defined by said at least one or by said plurality of first passages increases along the perimeter of the peripheral side wall of the containment casing of the cell as the distance of the aforementioned at least one second passage allowing a fluid outlet from the second collection chamber of the second heat transfer fluid increases.

This preferred embodiment of the heat exchange cell is particularly advantageous when the cell is horizontally mounted in the operating configuration. The horizontal mounting configuration, in fact, inevitably promotes the convective rise of the second heat transfer fluid, for example combustion gases coming from a burner, increasing the phenomena of formation of preferential paths by-passing the lower areas of the heat exchanger.

By contrast, this preferred embodiment of the heat exchange cell limits the formation of accumulation pockets of the second heat transfer fluid in the area, for example the upper area in the case of an horizontal mounting of the cell, of the first collection chamber close to the passage allowing a fluid outlet from the second collection chamber promoting—thanks to a lower pressure drop—the flow of the second heat transfer fluid towards the farthest areas from the second passage allowing a fluid outlet from the second collection chamber of the second heat transfer fluid, for example the lower ones in the case of an horizontal mounting of the cell.

In this way, the distribution of the second heat transfer fluid along the circumferential extension of the first collection chamber defined outside of the heat exchanger is particularly optimised, thereby significantly reducing the presence of dead zones not involved by the fluid flow in the first collection chamber.

Within the framework of this preferred embodiment, the desired increase in cross-sectional area of fluid flow defined by the first passage(s) along the perimeter of the peripheral side wall of the containment casing of the cell as the distance from the second passage allowing a fluid outlet from the second collection chamber increases, can be achieved in a plurality of ways.

Thus, in a first preferred embodiment, the desired increase in the cross-sectional area of fluid flow can be achieved by providing a plurality of through holes (forming as many first fluid passages) in the peripheral area of the separating element, the through holes having a cross-sectional area of fluid flow which increases as the distance from the second passage allowing a fluid outlet from the second collection chamber increases.

In an alternative preferred embodiment, the desired increase in the cross-sectional area of fluid flow can be achieved by defining one or a plurality of first fluid passages between the peripheral edge of the separating element and the peripheral side wall of the containment casing, the fluid passages having a cross-sectional area of fluid flow which increases as the distance from the second passage allowing a fluid outlet from the second collection chamber increases.

In a further preferred embodiment, the desired increase in the cross-sectional area of fluid flow can be achieved by combining the methods described above.

Within the framework of these embodiments, the shape of the first fluid passage(s) is not critical provided that it remains capable to allow an increase of the cross-sectional area of fluid flow of the second heat transfer fluid as the distance from the second passage allowing a fluid outlet from the second collection chamber increases.

Preferably, the separating element comprises a substantially plate-shaped or a substantially ring-shaped body.

Preferably, the separating element comprises a substantially plate-shaped body when the separating element is mounted at an axially external and rearward position with respect to the heat exchanger.

Preferably, the separating element comprises a substantially ring-shaped body when the separating element is mounted at an axially external and frontward position with respect to the heat exchanger.

In this way, the separating element is of simple manufacture while allowing the geometry of the separating element to be modified in a simple and flexible manner so as to have a configuration of said at least one passage for the fluid communication between the first and the second collection chambers of the second heat transfer fluid which is most suitable to optimize the fluid dynamics of the latter fluid.

Preferably, the body of the separating element has a shape essentially mating the shape of the containment casing.

Within the framework of the preferred embodiment in which the separating element is mounted at an axially external and rearward position with respect to the heat exchanger, and if the containment casing is substantially cup-shaped or is substantially cylindrical, the body of the separating element is preferably substantially disc-shaped.

Preferably, the separating element has at least in part a transversal dimension smaller than the cross-section of the containment casing of the cell; in this way, said at least one passage for the fluid communication between the first and the second collection chambers is, as outlined above, formed between a peripheral edge of the separating element and the peripheral side wall of the containment casing.

In this way, it is advantageously possible to define in an extremely simple and easy manner said at least one first passage for the fluid communication between the first and the second collection chambers of the second heat transfer fluid, first passage which in this case peripherally extends between the peripheral edge of the separating element and the peripheral side wall of the casing, without having to provide specific ducts.

Preferably, the separating element comprises at least one spacer protrusion laterally extending from the peripheral edge of the separating element and cooperating in abutment relationship with the peripheral side wall of the containment casing.

Still more preferably, the separating element comprises a plurality of spacer protrusions which laterally extend from the peripheral edge.

In this way, it is advantageously possible to obtain in an extremely simple way a perfect centering and correct positioning of the separating element with respect to the casing, so as to form in an equally simple manner the aforementioned at least one first passage or the aforementioned plurality of first passages for the fluid communication between the first and the second collection chambers of the second heat transfer fluid.

Optionally and as outlined above, the spacer protrusion(s) allow(s) to obtain, in an extremely simple manner, the aforementioned preferred configuration whereby the cross-sectional area of fluid flow defined by said at least one first passage increases along the perimeter of the peripheral side wall of the containment casing of the cell as the distance from the second passage allowing a fluid outlet from the second collection chamber of the second heat transfer fluid increases.

Preferably, the heat exchange cell further comprises a third collection chamber of the second heat transfer fluid defined downstream of the second collection chamber, the third chamber being in fluid communication with the second passage allowing a fluid outlet from the second collection chamber and with an outlet opening of the second heat transfer fluid from the heat exchange cell defined downstream of said third collection chamber.

In a preferred embodiment, the heat exchange cell further comprises at least one closing partition wall extending between the peripheral side wall of the casing and a portion of a peripheral edge of the at least one separating element, wherein the closing partition wall is configured to limit a direct fluid communication between the first and the second collection chambers of the second heat transfer fluid.

In this way, it is advantageously possible to optimize the fluid dynamics of the second heat transfer fluid, in particular in the passage between the first and the second collection chambers by adjusting, in particular and as outlined above, the cross-sectional area of fluid flow defined by said at least one first passage, by modifying the geometry and/or the size of such a partition wall.

Still more preferably, the at least one closing partition wall extends from said portion of the peripheral edge of the at least one separating element or from the peripheral side wall of the containment casing of the cell.

In a preferred embodiment, particularly advantageous when the cell is horizontally mounted in the operating configuration, the aforementioned at least one closing partition wall extends from the portion of the peripheral edge of the aforementioned at least one separating element, or from the peripheral side wall of the containment casing of the cell, at the aforementioned at least one second passage allowing a fluid outlet from the second collection chamber of the second heat transfer fluid.

In this way, it is advantageously possible to limit by-pass phenomena of the second heat transfer fluid flowing from the first collection chamber towards the second passage allowing a fluid outlet defined in the second collection chamber between an axial end of the peripheral side wall and the rear wall or the front wall of the containment casing of the cell.

In this case, therefore, the second heat transfer fluid is preferably directed towards the other areas of the second collection chamber where the desired additional heat transfer to the end coil of the heat exchanger takes place, said additional heat transfer being advantageously mediated by the aforementioned heat exchange portion of the separating element.

In a preferred embodiment, the third collection chamber of the second heat transfer fluid is defined in a cap extending from the peripheral side wall of the casing and is positioned downstream of the aforementioned at least one second passage allowing a fluid outlet from the second collection chamber.

In this way, it is advantageously possible to impart a suitable configuration to the third collection chamber by suitably configuring and positioning such an external cap as a function of the application requirements.

In a preferred embodiment, the aforementioned cap extends from the peripheral side wall of the containment casing of the cell at an inner opening formed at least in part in the thickness of the peripheral side wall of the casing; in this case the separating element further comprises a plate-shaped portion, extending from the at least one closing partition wall in parallel to the peripheral side wall of the casing, and housed with shape coupling in the inner opening.

In this way, it is advantageously possible to limit by-pass phenomena of the second heat transfer fluid flowing from the first to the third collection chamber of such a fluid, instead preferentially directing the second heat transfer fluid towards the second collection chamber where a further transfer of heat to the heat exchanger takes place, advantageously mediated by the aforementioned heat exchange portion of the separating element.

Preferably, said at least one closing partition wall comprises at least a first passage configured to allow a flow of the second heat transfer fluid from the first towards the aforementioned at least one second passage allowing a fluid outlet from the second collection chamber substantially in parallel to the peripheral side wall of the casing and in the proximity thereto.

In this way, it is advantageously possible to increase the possibility of adjusting the fluid dynamics of the second heat transfer fluid, both by adjusting the value of the total cross-sectional area of passage of the second heat transfer fluid from the first towards the second collection chamber, and by directing a secondary flow of the second heat transfer fluid towards the second passage allowing a fluid outlet from the second collection chamber in the preferred configuration of the cell in which the closing partition wall extends at the aforementioned at least one second passage allowing a fluid outlet from the second collection chamber of the second heat transfer fluid.

In this preferred embodiment of the heat exchange cell, particularly advantageous when the cell is horizontally mounted in the operating configuration, the aforementioned at least one first passage formed in the aforementioned at least one closing partition wall advantageously hinders the formation of accumulation pockets of the second heat transfer fluid in the upper area of the first collection chamber due to the convective rise of such a fluid.

Within the framework of the aforementioned preferred embodiments, the aforementioned at least one first passage can comprise one or more through holes and/or through slits formed in the aforementioned closing partition wall and having suitable shapes and sizes as a function of the type of fluid dynamic adjustment to be achieved.

In a particularly preferred embodiment, the second collection chamber of the second heat transfer fluid has a substantially annular configuration.

In the preferred embodiment in which the second collection chamber is defined at an axially external position with respect to the heat exchanger between the separating element, the peripheral side wall and the rear wall of the containment casing of the cell, this substantially annular configuration of the second collection chamber can be obtained—in a preferred and advantageous manner—by suitably shaping the separating element and/or the rear wall of the containment casing of the cell.

Advantageously, the substantially annular configuration of the second collection chamber of the second heat transfer fluid allows to optimise the fluid dynamics of such a fluid in its flowing through the second chamber, thereby increasing the heat exchange with the first heat transfer fluid which flows within the end coil of the heat exchanger and which is in heat exchange relationship with the second heat transfer fluid mediated by the aforementioned heat exchange portion of the separating element.

In particular, the second collection chamber configured in a substantially annular manner achieves the following advantageous technical effects:

it allows to form an additional heat exchange element of the cell that is particularly effective in further increasing the heat exchange efficiency of the cell and in particular—when desired—further increasing the condensing effect of the second heat transfer fluid (for example combustion gases); this, thanks to the heat exchange with the heat exchange portion of the separating element, which is in heat exchange relationship and preferably in direct contact with an end coil of the heat exchanger to which the first heat transfer fluid, having the minimum temperature within the exchange cell, is advantageously fed in operation;

it allows to impart to the second heat transfer fluid a flowing movement which hinders a direct passage towards the second passage allowing a fluid outlet from the second collection chamber, thereby increasing in this way the heat transfer from such a fluid and, if desired, increasing the condensing ability of the second collection chamber of the cell.

In a preferred embodiment, the aforementioned at least one separating element comprises a substantially plate-shaped body and is centrally provided with a heat-insulating disc facing the feeding zone of the second heat transfer fluid.

Advantageously, the heat-insulating disc allows to achieve a suitable thermal insulation between the feeding zone of the second heat transfer fluid, which has a very high temperature, and the second collection chamber of such a fluid, in which the second fluid flows once it has transferred most of its initial heat.

In the preferred embodiment in which the cell is a gas-liquid heat exchange cell for water-heating apparatuses, the second heat transfer fluid is preferably formed by the combustion gases of a burner housed in such a feeding zone that will also be indicated in the present description with the term "combustion chamber".

More preferably, the heat-insulating disc is housed in a respective housing seat centrally formed in the body of the separating element.

Preferably, the heat-insulating disc is totally received coaxially and internally with respect to the heat exchanger.

In this way, it is advantageously possible to thermally insulate the feeding zone of the second heat transfer fluid—which is the hottest part of the cell—from the second collection chamber of the second heat transfer fluid and from the rear wall of the containment casing, thereby increasing the condensing ability of the second collection chamber, where desired, and thermally protecting the material of the containment casing.

In a preferred embodiment, the body of the separating element is substantially plate-shaped, whereas the heat exchange portion of the separating element comprises a peripheral crown of such a substantially plate-shaped body.

In this way, the peripheral crown of the body of the separating element is capable of both act as a heat exchange portion allowing an optimal heat exchange between the first heat transfer fluid that flows within the end coil of the heat exchanger and the second heat transfer fluid that flows within the second collection chamber, and form a receiving seat adapted to accommodate preferably with substantial shape coupling, the first coil of the heat exchanger, aiding to firmly hold the exchanger in position and facilitating the mounting operations of the same within the heat exchange cell.

Preferably, the heat exchange portion of the separating element, in this preferred case formed by the peripheral crown of the body of the separating element, is in direct contact, without leaving interspaces and without interposition of heat-insulating elements, with the first inlet coil of the heat exchanger in which the first fluid circulating inside the exchanger has the lowest temperature.

In this way, it is advantageously possible to increase the heat exchange between the second heat transfer fluid that laps the rear face of the separating element and the heat exchanger, in particular with the first coil thereof, increasing, when desired, the capacity of the heat exchange cell of recovering the latent condensation heat.

In a particularly preferred embodiment, the peripheral crown is radially external with respect to the housing seat of the heat-insulating disc.

In this way, it is advantageously possible to transfer a part of the heat absorbed by the heat-insulating disc to the heat exchange portion of the separating element and from the latter to the end coil of the heat exchanger thereby increasing the heat exchange efficiency of the cell.

In a particularly preferred embodiment, the peripheral crown of the substantially plate-shaped body of the separating element at least partially extends spiral-wise substantially with the same winding pitch as the coils of the heat exchanger.

Preferably, the second collection chamber of the second heat transfer fluid also has a cross-sectional area of fluid flow variable along a circumferential direction.

Thanks to the substantially annular and spiral-shaped configuration of the second collection chamber of the second heat transfer fluid which ensues from this preferred feature, it is advantageously possible to further optimise the fluid dynamics of such a fluid in its flowing through the second chamber, thereby increasing the heat exchange with the first heat transfer fluid flowing within the end coil of the heat exchanger and which is in a heat exchange relationship with the second heat transfer fluid mediated by the aforementioned heat exchange portion of the separating element.

In particular, the second collection chamber configured in a substantially annular manner forms a sort of additional single-coil spiral duct which conveys the flow of the second heat transfer fluid towards the second passage allowing a fluid outlet from the second collection chamber in a uniform and directed manner.

This single-coil spiral duct substantially acts as an additional spiral heat exchange element of the cell which allows to further increase the heat exchange efficiency of the cell and particularly allowing—when desired—to further increase the condensation effect of the combustion gases thanks to the heat exchange with the separating element which is in contact with an end coil of the heat exchanger to which the first heat transfer fluid having the minimum temperature within the heat exchange cell is advantageously fed during operation.

Thanks to the at least partial spiral-wise development of the peripheral crown of the substantially plate-shaped body of the separating element and to the substantially annular and spiral configuration of the second collection chamber of the second heat transfer fluid that derives from the combination of these preferred features, it is also advantageously possible to achieve the aforementioned increase of the heat exchange efficiency of the cell minimising at the same time the axial size of the cell itself.

In this preferred embodiment, in fact, the second collection chamber of the second heat transfer fluid is partially interpenetrating in the volume occupied by the heat exchanger, having its own winding pitch which generates with its end coil (which lies on axially offset planes), a volume that is advantageously exploited for the purposes of heat exchange by the second collection chamber of the second heat transfer fluid instead of remaining unused as in the case of the cells of the prior art in which a heat exchanger of this type is installed.

Preferably, and since the opposite ends of the peripheral crown lie on axially staggered planes, such ends are connected by an inclined connecting wall.

Advantageously, this inclined connecting wall prevents the creation of recesses or steps which may negatively influence the fluid dynamics of the second heat transfer fluid, in particular by attenuating any turbulence phenomena that could arise between the opposite axially offset ends of the peripheral crown.

Preferably, the housing seat of the heat-insulating disc comprises a bottom wall internally provided with at least one spacer relief configured to keep the disc at a predetermined distance from the rear wall of the housing seat.

In this way, a beneficial thermal insulation is obtained between the bottom of the housing seat and the disc which has a high temperature as it borders the feeding zone of the second heat transfer fluid, for example a combustion chamber of the cell where a combustion gas at high temperature (second heat transfer fluid) is generated. The heat dispersions towards the bottom wall of the housing seat of the heat-insulating disc are thus reduced ensuring that the heat exchange portion of the separating element—laterally extending around the housing seat of the heat-insulating disc—best performs its function of a further heat exchange element, for example with condensation effects, with the second heat transfer fluid.

Preferably, the housing seat of the insulating disc comprises a bottom wall externally provided with at least one spacer relief extending towards the rear wall of the casing.

In this way, it is advantageously possible to obtain a better heat insulation between the housing seat of the disc which, being in contact with the disc is at a high temperature, and the rear wall of the containment casing of the cell. This reduces heat losses towards the cell containment casing, increasing the condensing capacity of the cell in the second collection chamber of the second heat transfer fluid.

Preferably, the housing seat of the disc is at least partially peripherally delimited by a circumferential relief extending from the separating element at the front thereof.

Advantageously, such a circumferential relief formed about the housing seat of the disc delimits the peripheral crown of the body of the separating element which acts as a housing seat for the first coil of the heat exchanger and thus ensures a self-centering and locking in the correct position of the heat exchanger with respect to the separating element and to the containment casing of the cell.

Thanks to this locking in the correct position of the heat exchanger, it is also advantageously possible to prevent that the inlet and outlet connections of the heat exchanger, mounted in abutment relationship and sealingly mounted in corresponding inlet and outlet sleeves of the containment casing, do not come out from the sleeves as a consequence of the pressure exerted by the first heat transfer fluid.

Preferably, the peripheral crown of the body of the separating element comprises a rectilinear portion laterally extending with respect to a rectilinear end portion of the heat exchanger.

In this way, it is advantageously possible to further facilitate the installation of the heat exchanger within the cell since the rectilinear portion of the separating element, configured to receive and preferably cooperate in abutment relationship with a rectilinear portion of the tubular duct forming the first coil of the heat exchanger, provides a precise angular reference for assembling together the two pieces.

In a preferred embodiment, the rear wall of the housing seat of the heat-insulating disc, preferably provided with the aforementioned at least one spacer relief extending rearwardly towards the rear wall of the casing, is substantially in contact with the rear wall of the casing.

In this way, it is advantageously possible to impart to the second collection chamber of the second heat transfer fluid the aforementioned substantially annular configuration by using a housing seat of the heat-insulating disc extending towards the rear wall of the casing, while having at the same time the minimum axial size of the cell.

In this way, it is also advantageously possible to avoid a passage of the second heat transfer fluid between the rear wall of the housing seat of the disc, having a relatively high temperature capable of releasing heat to the fluid, and the rear wall of the containment casing of the cell, thereby increasing the heat exchange ability—condensing where desired—of the second collection chamber of the second heat transfer fluid.

In a preferred embodiment, the side wall of the housing seat of the heat-insulating disc comprises a portion tapered towards the rear wall of the housing seat.

In this way, it is advantageously possible to reduce the pressure losses of the second heat transfer fluid flowing in the second collection chamber, thereby allowing to reduce the power of the feeding devices (generally a fan) necessary to feed such a fluid into the heat exchange cell and ensure a correct operation thereof.

In a preferred embodiment, the heat exchange cell comprises a substantially annular heat-insulating element, associated to the front wall of the containment casing and facing the feeding zone of the second heat transfer fluid.

In this way, it is advantageously possible to thermally insulate the front wall of the containment casing from the feeding zone of the second heat transfer fluid—usually at a high temperature especially if a burner is present—thereby thermally protecting the material of such a wall.

Preferably, the aforementioned substantially annular heat-insulating element is housed in a respective housing seat formed in the front wall of the containment casing of the cell.

In a first preferred embodiment, the housing seat of the substantially annular heat-insulating element is formed coaxially and externally with respect to an opening, preferably coaxial to the longitudinal axis of the cell, formed in the front wall of the containment casing and configured to receive a burner or other feeding means of the second heat transfer fluid in the cell.

In a second preferred embodiment, the housing seat of the substantially annular heat-insulating element is defined by the inner walls of an opening, preferably coaxial to the longitudinal axis of the cell, formed in the front wall of the containment casing and configured to allow the connection with a feeding duct of a hot fluid to be cooled, as for example occurs in the case in which the cell acts as a heat recuperator.

In a preferred embodiment, the second collection chamber of the second heat transfer fluid is defined at an axially external position with respect to the heat exchanger between the aforementioned at least one separating element, the peripheral side wall, the front wall of the containment casing and at least partially coaxially and externally with respect to the aforementioned substantially annular heat-insulating element.

In this way, it is advantageously possible to achieve the maximum reduction of axial size of the heat exchange cell, since a part of the axial size of the substantially annular heat-insulating element is exploited to define—coaxially and externally with respect to such an element—the second collection chamber of the second heat transfer fluid in the front zone of the cell.

Moreover, this preferred configuration of the cell allows to achieve the additional advantageous technical effect of an effective heat insulation of the second collection chamber of the second heat transfer fluid, collection chamber which is actually defined coaxially and externally with respect to the substantially annular heat-insulating element.

As a result, an improved heat exchange between the second and the first heat transfer fluid respectively flowing in the second collection chamber and in the front end coil of the heat exchanger is achieved and—where desired—also an improved condensing capacity of the second collection chamber.

Within the framework of this preferred embodiment in which the second collection chamber of the second heat transfer fluid is defined in the front zone of the cell, the separating element preferably comprises a substantially ring-shaped body, whereas the heat exchange portion of the separating element in contact with at least one portion of an end coil of the heat exchanger (in this case the front one) comprises a part, preferably all, of the aforementioned substantially ring-shaped body.

In this way, it is advantageously possible to maximise the heat exchange between the second and the first heat transfer fluid respectively flowing in the second collection chamber and in the front end coil of the heat exchanger.

Preferably, the heat exchange portion of the separating element in heat exchange relationship with at least one portion of an end coil of the heat exchanger is in direct contact, without leaving interspaces and without interposition of heat-insulating elements, with such an end coil to which the first heat transfer fluid having the lowest temperature is advantageously fed during operation.

This preferred configuration and similarly to what has been described above, allows to increase the heat exchange between the second heat transfer fluid that touches the front face of the separating element and the heat exchanger, in particular the heat exchange between the second heat transfer fluid and the first coil of the heat exchanger, thereby increasing the condensing capacity of the heat exchange cell when desired.

In a particularly preferred embodiment and similarly to the previous embodiment of the separating element provided with a plate-shaped body, the substantially ring-shaped body of the front separating element extends laterally and around the substantially annular heat-insulating element, for example at a radially external position with respect to the same.

Also in this case it is thus advantageously possible to transfer a part of the heat absorbed by the substantially annular heat-insulating element to the heat exchange portion of the separating element and from the latter to the end coil of the heat exchanger, thereby increasing the heat exchange efficiency of the cell.

In a preferred embodiment and similarly to the previous embodiment of the separating element provided with a plate-shaped body, the substantially ring-shaped body of the front separating element at least partially extends spiral-wise substantially with the same winding pitch as the coils of the heat exchanger.

Preferably, also in this case the second collection chamber of the second heat transfer fluid defined in the front zone of the cell preferably has a cross-sectional area of fluid flow variable along a circumferential direction.

Thanks to the substantially annular and spiral-shaped configuration of the second collection chamber of the second heat transfer fluid which ensues from this preferred feature, it is thus advantageously possible to achieve—*mutatis mutandis*—the technical effects outlined above, in other words those of further optimising the fluid dynamics of the second heat transfer fluid in its flowing through the second chamber, increasing the heat exchange with the first heat transfer fluid flowing within the end coil (in this case the front one) of the heat exchanger and that is in heat exchange relationship with the second heat transfer fluid mediated by the aforementioned at least one separating element, while minimising at the same time the axial extension of the heat exchange cell;

Also in this case, furthermore, the second collection chamber configured in a substantially annular manner forms a sort of additional single-coil spiral duct that conveys the flow of the second heat transfer fluid in a uniform and directed manner towards the second passage allowing a fluid outlet from the second collection chamber, which additional single-coil spiral duct substantially behaves as an additional spiral heat exchange element of the cell, partially interpenetrating in the volume of the spiral heat exchanger.

All this allows, as outlined above, to further increase the heat exchange efficiency of the cell with a minimum axial size thereof.

In a preferred embodiment, the separating element comprises a plurality of heat exchange protrusions extending from a rear face of the aforementioned heat exchange portion of the separating element facing towards the rear wall of the casing or from a front face of the aforementioned heat exchange portion of the separating element facing towards the front wall of the containment casing of the cell.

In this way, it is advantageously possible to increase the heat exchange surface of the separating element, thereby increasing the extent of heat exchange between the second heat transfer fluid and the heat exchange portion of the separating element (and therefore the heat exchanger) within the second collection chamber and, this, in both the preferred embodiments in which the latter chamber is defined in the rear or front zone of the cell.

In a preferred embodiment, the aforementioned plurality of heat exchange protrusions is distributed in such a way as to define at least one channel, most preferably a plurality of passage channels, allowing the flow of the second heat transfer fluid, extending along a substantially radial direction and/or along an inclined direction with respect to said substantially radial direction.

The passage channels thus defined advantageously direct the flow of the second heat transfer fluid towards the centre of the second collection chamber and therefore towards an area provided with heat exchange protrusions, thereby further increasing the overall heat exchange and the condensing capacity of the second collection chamber of the cell.

Preferably, the passage channels of the second heat transfer fluid defined within the heat exchange protrusions can be rectilinear or curvilinear.

Preferably, the heat exchange protrusions are shaped substantially as a peg and/or as a fin so as to maximize the heat exchange surface.

In a preferred embodiment, the separating element comprises a plurality of diverting fins extending from the peripheral edge of the separating element, the diverting fins having a development along a radial direction towards the peripheral side wall of the casing and optionally along the axial direction towards the rear wall or towards the front wall of the casing.

Advantageously, the diverting fins allow to further regulate the fluid dynamics of the second heat transfer fluid flowing inside the second collection chamber, radially directing the fluid towards the centre of the separating element (i.e., towards the longitudinal axis of the cell and of the second collection chamber) where the heat exchange protrusions may be located, hindering a purely peripheral flow of the second heat transfer fluid close to the peripheral side wall of the casing with possible by-passes of such a fluid towards the fluid outlet passage from the second collection chamber.

In a preferred embodiment, said at least one separating element further comprises at least one substantially slot-shaped through slit positioned close to the heat-insulating disc or to the substantially annular heat-insulating element.

More preferably, the at least one through slit is formed close to the housing seat of the heat-insulating disc or to the substantially annular heat-insulating element.

Advantageously, the presence of one or more slits in the separating element allows to achieve a partial thermal decoupling between the disc or the substantially annular heat-insulating element and the seat for housing the same, if foreseen, and the heat exchange portion of the body of the separating element that is in contact with the first inlet coil of the heat exchanger, significantly colder than the heat-insulating disc, or of the substantially annular heat-insulating element.

In this way, it is advantageously possible to limit the temperature of the heat exchange portion of the body of the separating element, thereby increasing the condensing capacity of the heat exchange cell when desired.

As mentioned above, in a preferred embodiment of the invention the second heat transfer fluid is a combustion gas generated by a burner configured to be mounted in the feeding zone of the second heat transfer fluid (combustion chamber) defined in the casing coaxially and internally with respect to the heat exchanger.

In this case and as illustrated above, the cell is preferably a condensing heat exchange cell.

As illustrated earlier, in an additional preferred embodiment of the invention the second heat transfer fluid is a hot gas (possibly combustion gas) sent to the feeding zone of the second heat transfer fluid defined in the casing coaxially and internally with respect to the heat exchanger.

In this case and as mentioned above, the cell is preferably a heat recuperator.

Within the framework of the heat exchange method of the invention and as outlined above, the step of feeding the second heat transfer fluid from the first to the second collection chamber is carried out by means of said at least one first passage formed between a peripheral edge of the at least one separating element and the peripheral side wall of the containment casing and/or in a peripheral zone of the at least one separating element.

In this way, it is advantageously possible to uniformly distribute the second heat transfer fluid within the cell.

In a preferred embodiment, the heat exchange method comprises the step of limiting a direct passage of the second heat transfer fluid from the first to the second collection chamber by means of said at least one closing partition wall described above extending between the peripheral side wall of the casing and the separating element.

In this way and as outlined above, it is advantageously possible to adjust the fluid dynamics of the second heat transfer fluid by adjusting the cross-section of the fluid passage between the first and the second collection chamber, simply by changing the shape and/or size of said closing partition wall.

In a preferred embodiment, the heat exchange method further comprises the step of feeding the second heat transfer fluid from the second collection chamber to a third collection chamber defined downstream of the second chamber and in fluid communication with the aforementioned at least one second passage allowing a fluid outlet from the second chamber and with an outlet opening of the second heat transfer fluid from the cell.

In a preferred embodiment, the heat exchange method further comprises the step of feeding a part, or secondary flow, of the second heat transfer fluid from the first collection chamber towards the aforementioned at least one second passage allowing a fluid outlet from the second collection chamber.

In this way and as outlined above, it is advantageously possible to increase the possibilities of adjustment and optimisation of the fluid dynamics of the second heat transfer fluid.

As outlined above, this preferred embodiment of the method according to the invention is particularly advantageous when the cell is horizontally mounted in the operating configuration, since feeding such a secondary flow of the second heat transfer fluid directly towards the passage allowing a fluid outlet from the second collection chamber effectively hinders the formation of accumulation pockets of the second heat transfer fluid in the upper zone of the first collection chamber due to the convective rise of such a fluid.

In a preferred embodiment, the heat exchange method further comprises the step of conveying the flow of the second heat transfer fluid through a plurality of heat exchange protrusions extending from a rear face of the aforementioned heat exchange portion of the separating element facing towards the rear wall of the casing of the cell or from a front face of the aforementioned heat exchange portion of the separating element facing towards the front wall of the casing.

In this way and as already mentioned above, it is advantageously possible to increase the heat exchange between the second heat transfer fluid and the heat exchange portion of the separating element (and the end coil of the heat exchanger in heat exchange relationship with such a portion of the separating element) thanks to the presence of a larger heat exchange surface.

In a preferred embodiment, the heat exchange method further comprises the step of conveying the flow of the second heat transfer fluid along a radial direction towards the central part of the second collection chamber and/or along an inclined direction with respect to said substantially radial direction.

In this way and as described above, it is advantageously possible to direct the flow of the second heat transfer fluid along a radial direction towards the centre of the second collection chamber and therefore towards an area provided with heat exchange protrusions, further increasing the overall heat exchange and the condensing capacity of the second collection chamber of the cell.

In a preferred embodiment, the heat exchange method further comprises the step of diverting the flow of the second heat transfer fluid by means of a plurality of diverting fins extending from the peripheral edge of the separating element, the diverting fins having a development along a radial direction towards the peripheral side wall of the casing and optionally along the axial direction towards the rear wall or the front wall of the casing.

In this way and as described above, it is advantageously possible to further regulate the fluid dynamics of the second heat transfer fluid flowing inside the second collection chamber, directing such a fluid radially towards the centre of the separating element (i.e., towards the longitudinal axis of the cell and of the second collection chamber) where the heat exchange protrusions may be positioned, hindering a purely peripheral flow of the second heat transfer fluid close to the peripheral side wall of the casing with possible by-passes of such a fluid towards the outlet opening of the cell.

In a preferred embodiment, the heat exchange method further comprises the step of adjusting the fluid dynamics of the second heat transfer fluid fed towards the second collection chamber by adjusting the total cross-sectional area of fluid flow of the at least one first passage formed between a peripheral edge of the at least one separating element and the peripheral side wall of the containment casing and/or in the peripheral zone of the at least one separating element.

In this way and as described above, it is advantageously possible to optimize the fluid dynamics of the second heat transfer fluid inside the cell in a very simple manner without resorting to complicated structures or additional adjustment elements.

Preferably, the aforementioned adjusting step comprises uniformly distributing the flow rate of the second heat transfer fluid fed towards the second collection chamber along the perimeter of said peripheral side wall.

In this way and as outlined above, it is advantageously possible to uniformly adjust the distribution along the circumferential direction of the second heat transfer fluid, optimising the fluid dynamics thereof.

In an alternative preferred embodiment, particularly advantageous when the cell is horizontally mounted in the operating configuration, the aforementioned adjusting step comprises distributing along the perimeter of the peripheral side wall of the casing a flow of the second heat transfer fluid sent towards the second collection chamber so as to increase the flow rate of such a fluid as the distance from said at least one second passage allowing a fluid outlet from the second collection chamber increases.

In this way and as outlined above, it is advantageously possible to hinder the formation of accumulation pockets of the second heat transfer fluid in the zone, for example the upper one in the case of a horizontal mounting of the cell, of the first collection chamber close to the passage allowing a fluid outlet from the second collection chamber, thereby promoting—thanks to a lower pressure drop—a flow of the second heat transfer fluid towards the zones farthest from the second passage allowing a fluid outlet from the second collection chamber of the second heat transfer fluid, for example the lower ones in case of a horizontal mounting of the cell.

In this way, the distribution of the second heat transfer fluid along the circumferential extension of the first collection chamber externally defined with respect to the heat exchanger is optimised, thereby significantly reducing the presence of dead zones not flown by the fluid in the first collection chamber.

BRIEF DESCRIPTION OF THE FIGURES

Additional features and advantages of the present invention will be better apparent from the following detailed description of some preferred embodiments thereof, made with reference to the accompanying drawings.

The different features in the single configurations may be combined with one another as desired according to the description above, whenever the accomplishment is desired of the advantages resulting in a specific way from a particular combination.

Figure 1:
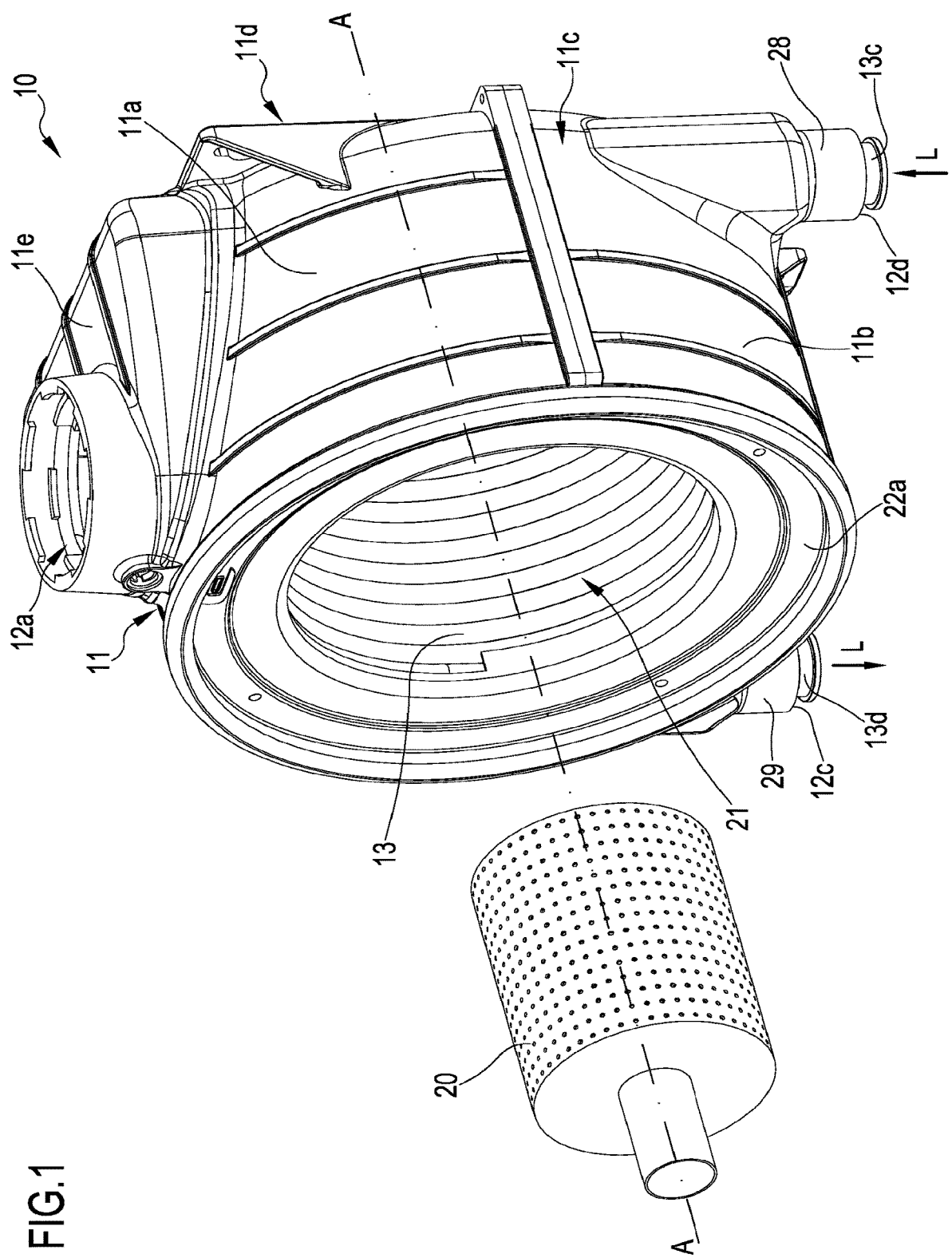
Figure 2A:
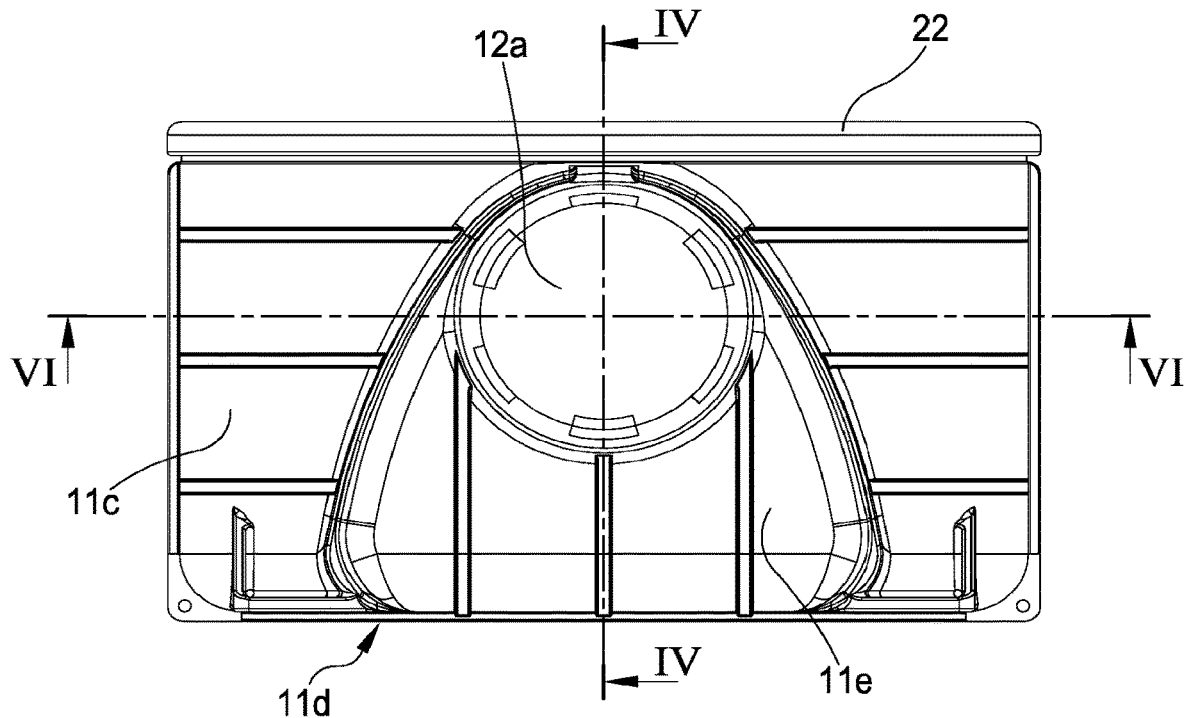
Figure 2B:
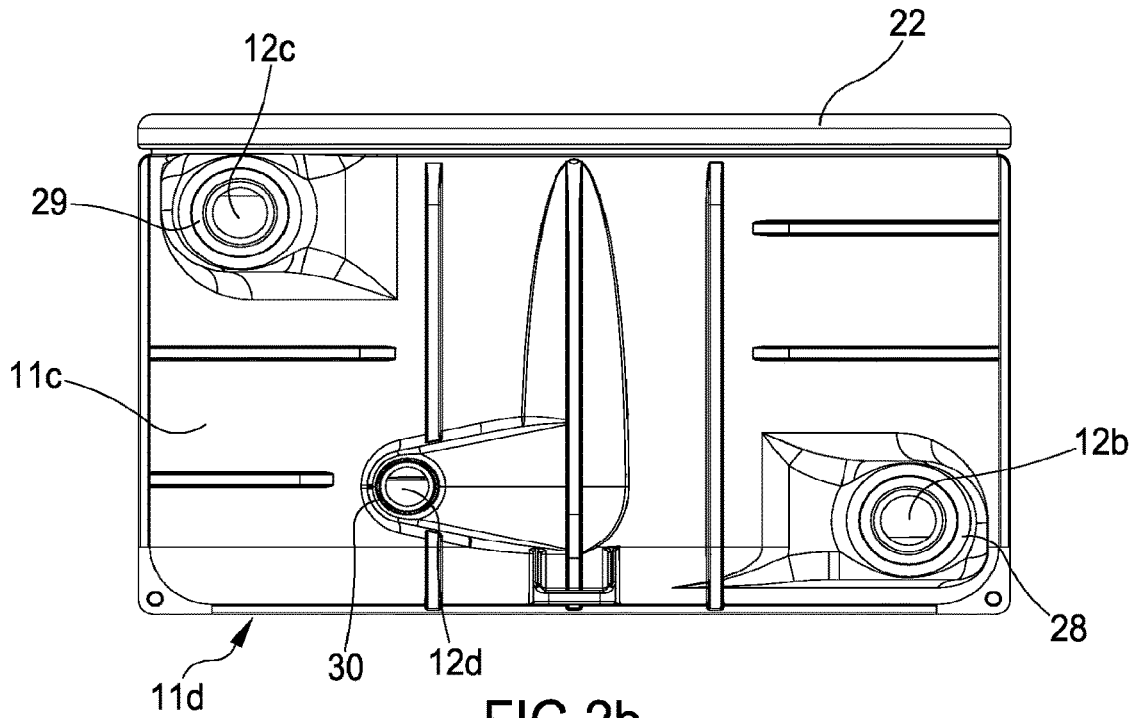
Figure 3:
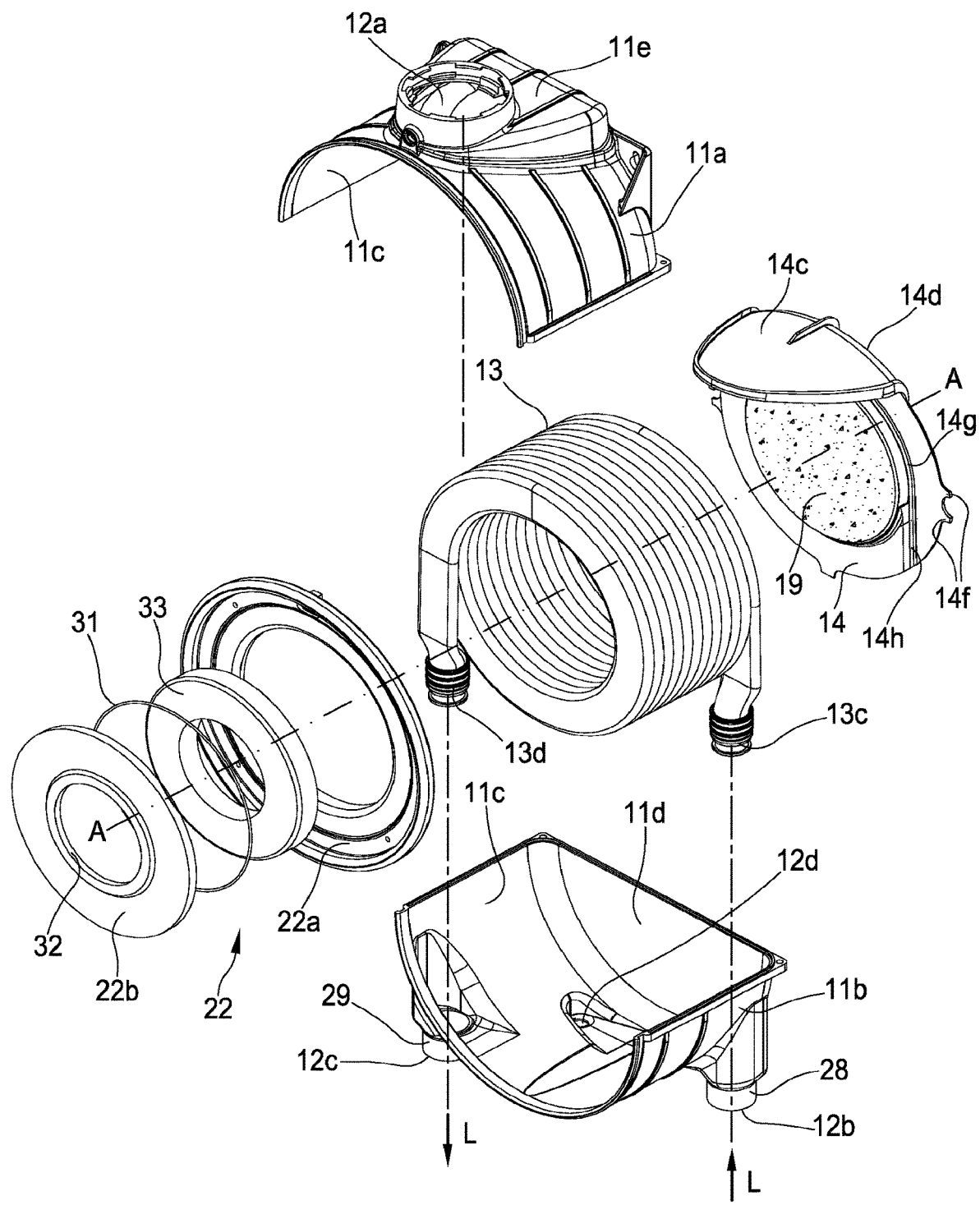
Figure 4:
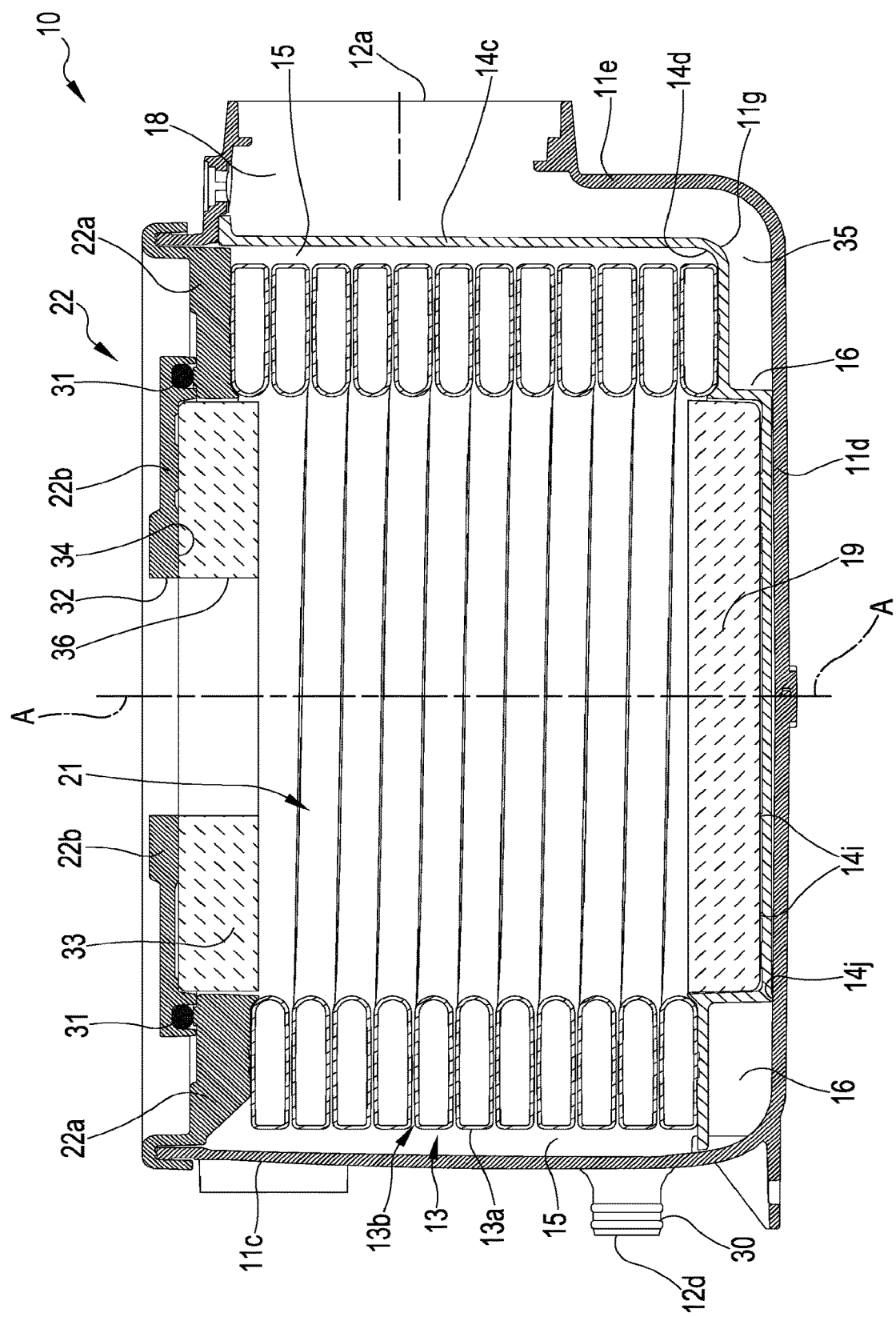
Figure 5:
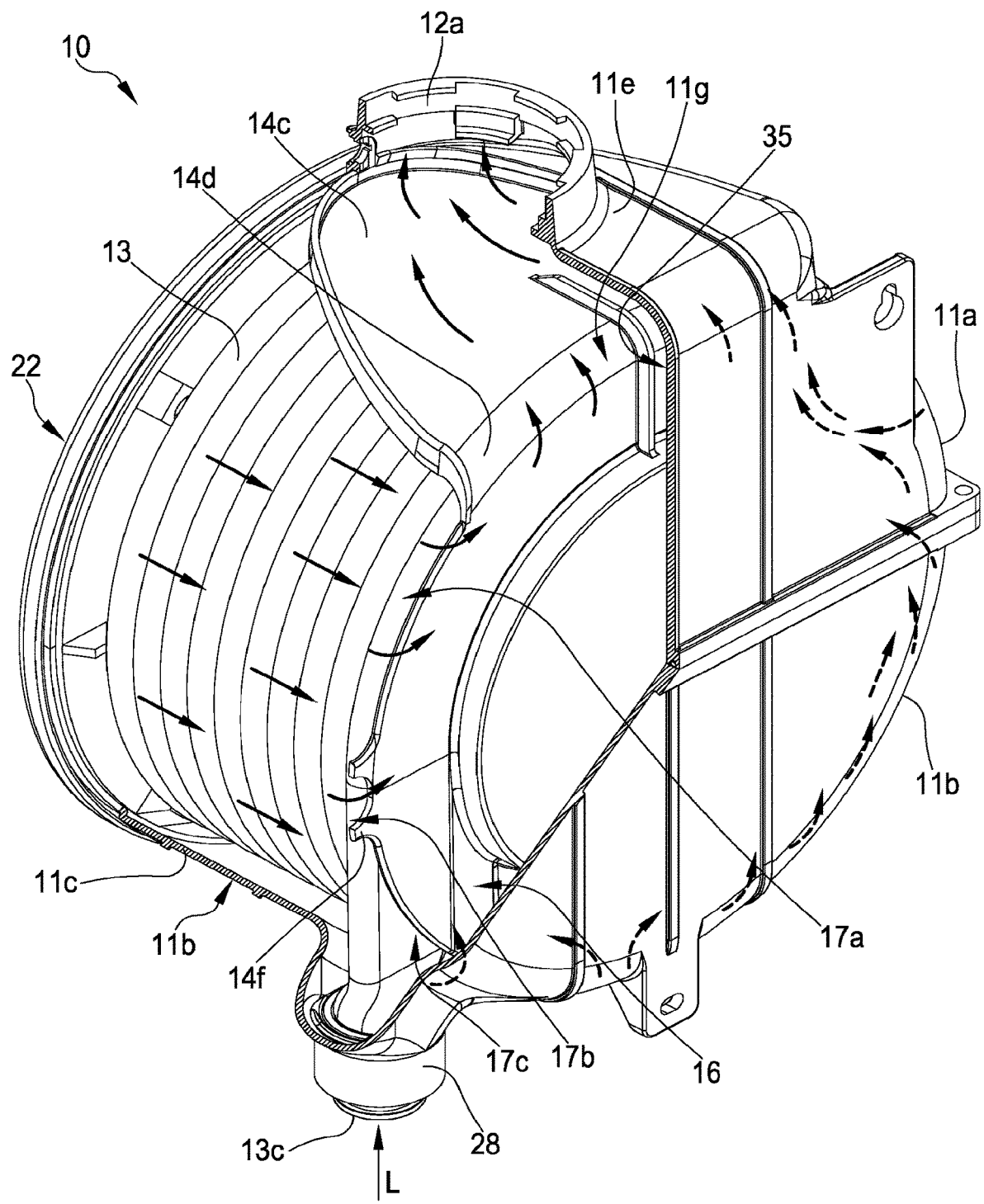
Figure 6:
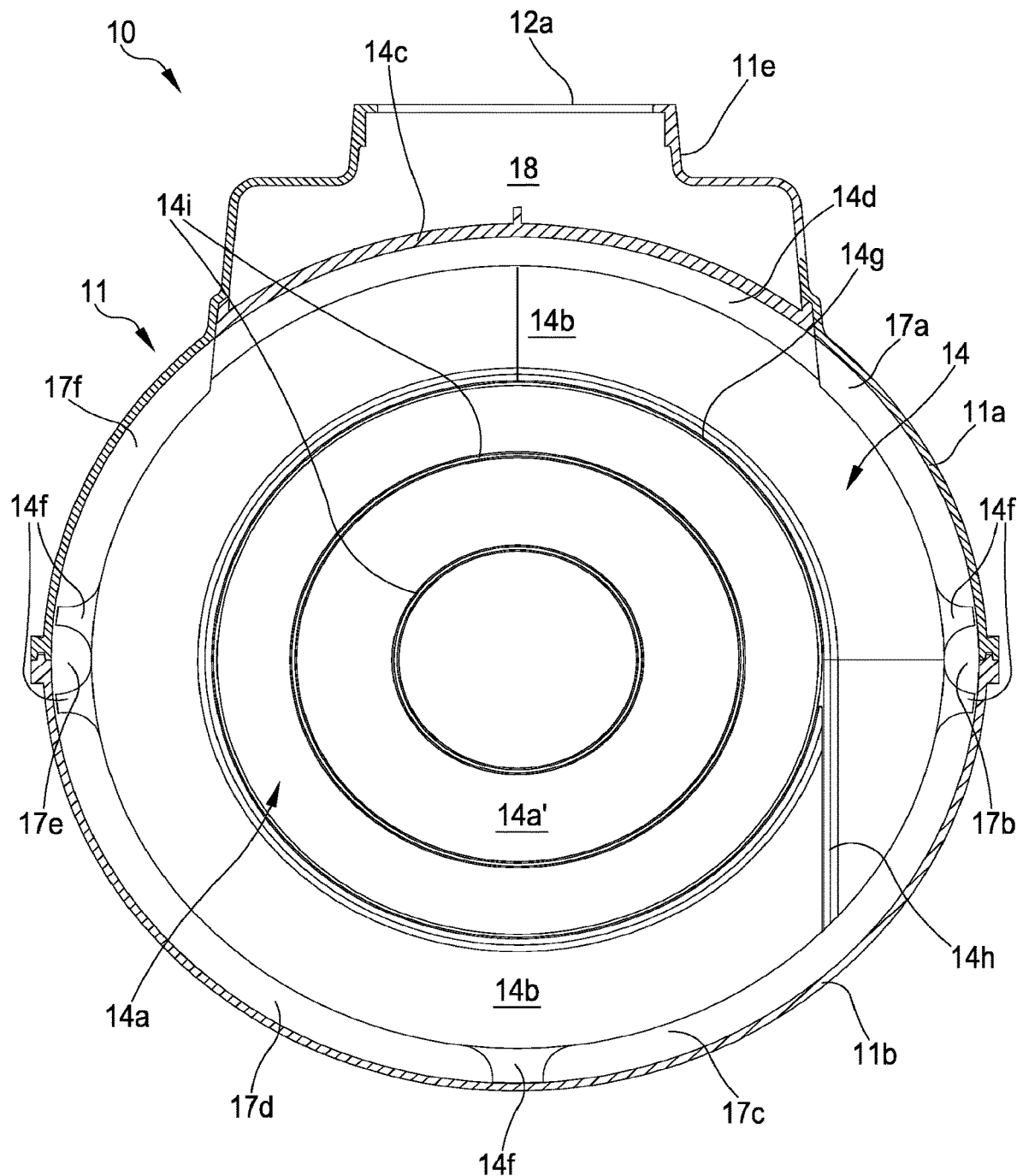
Figure 8:
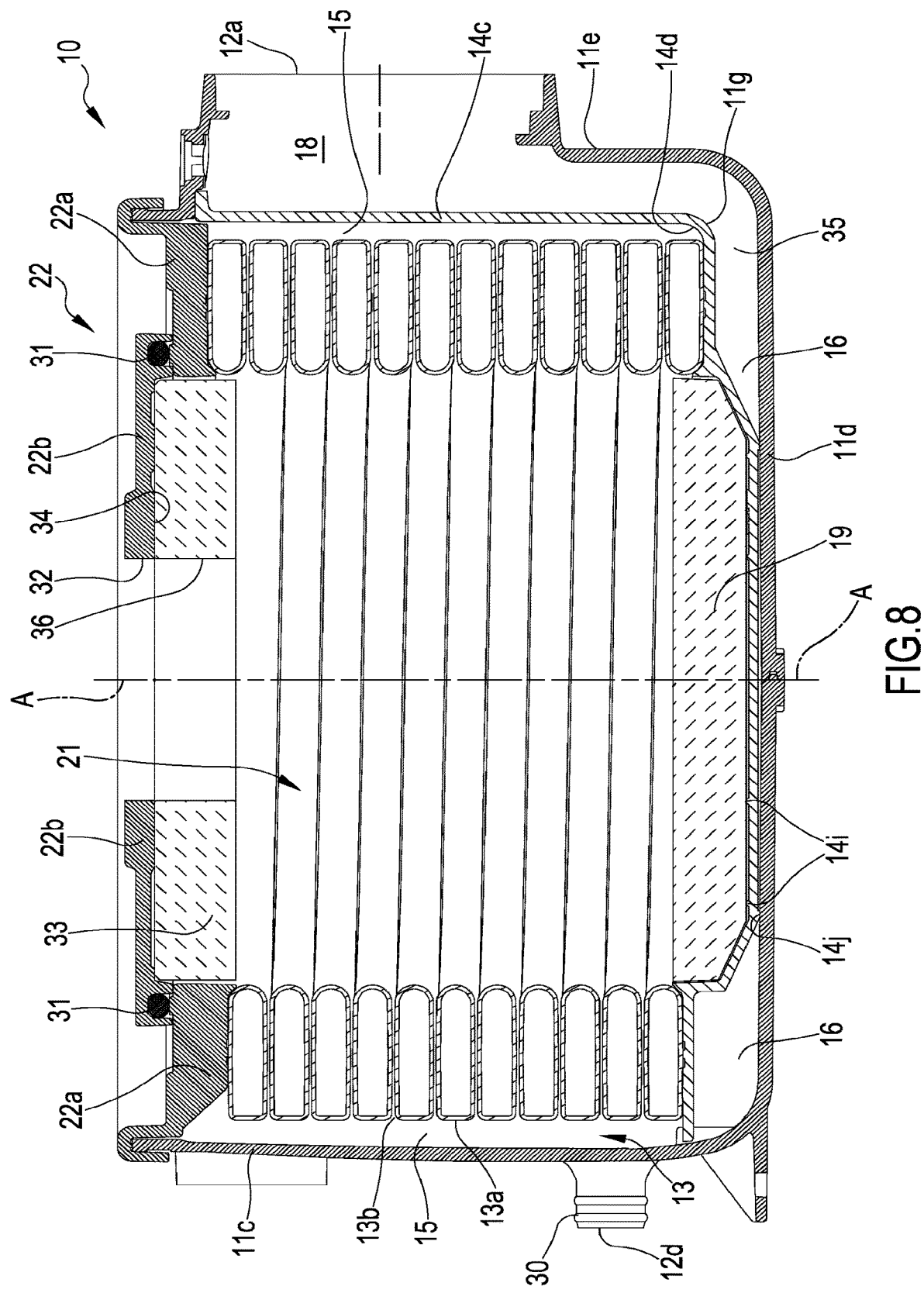
Figure 10:
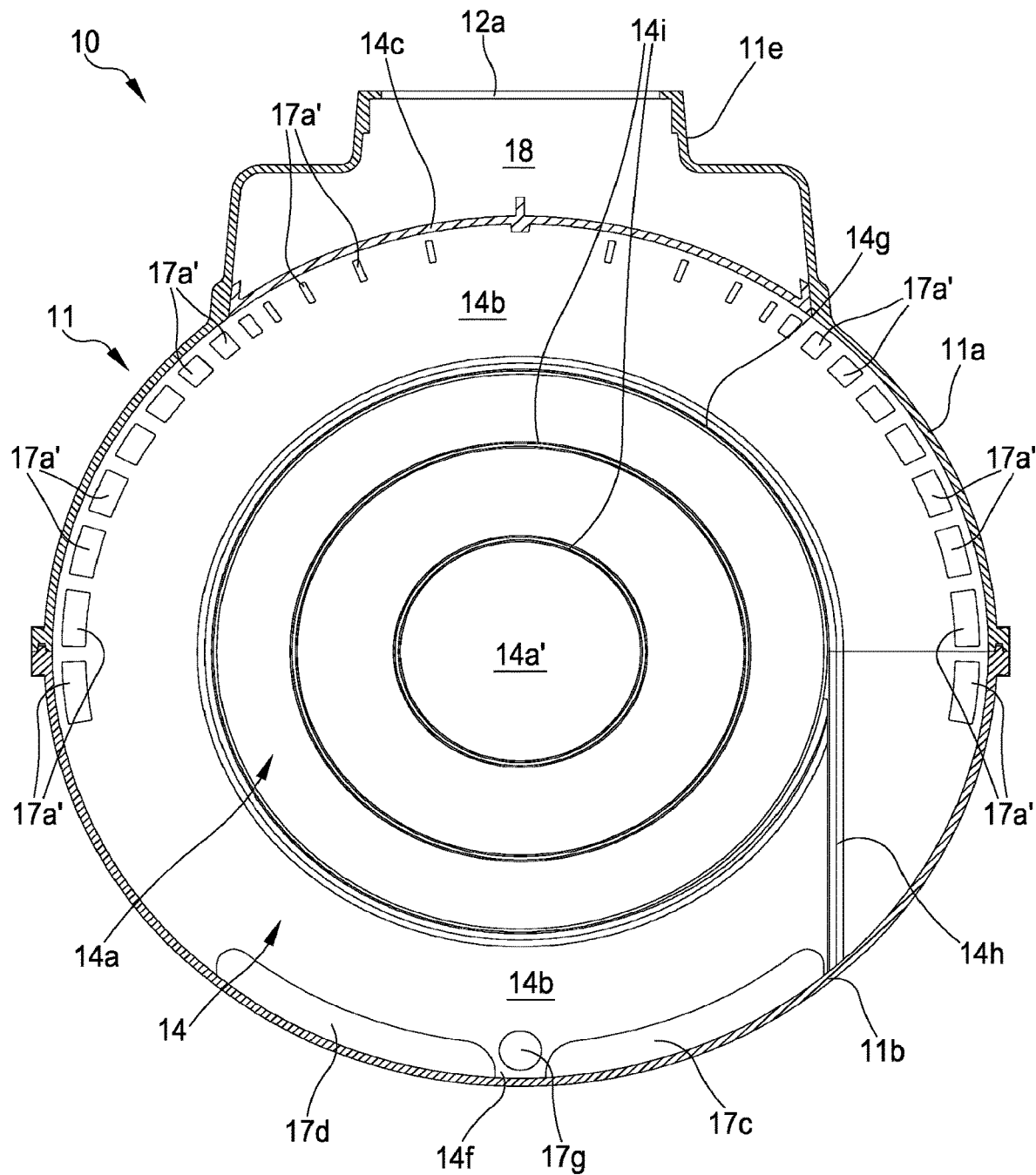
Figure 11:
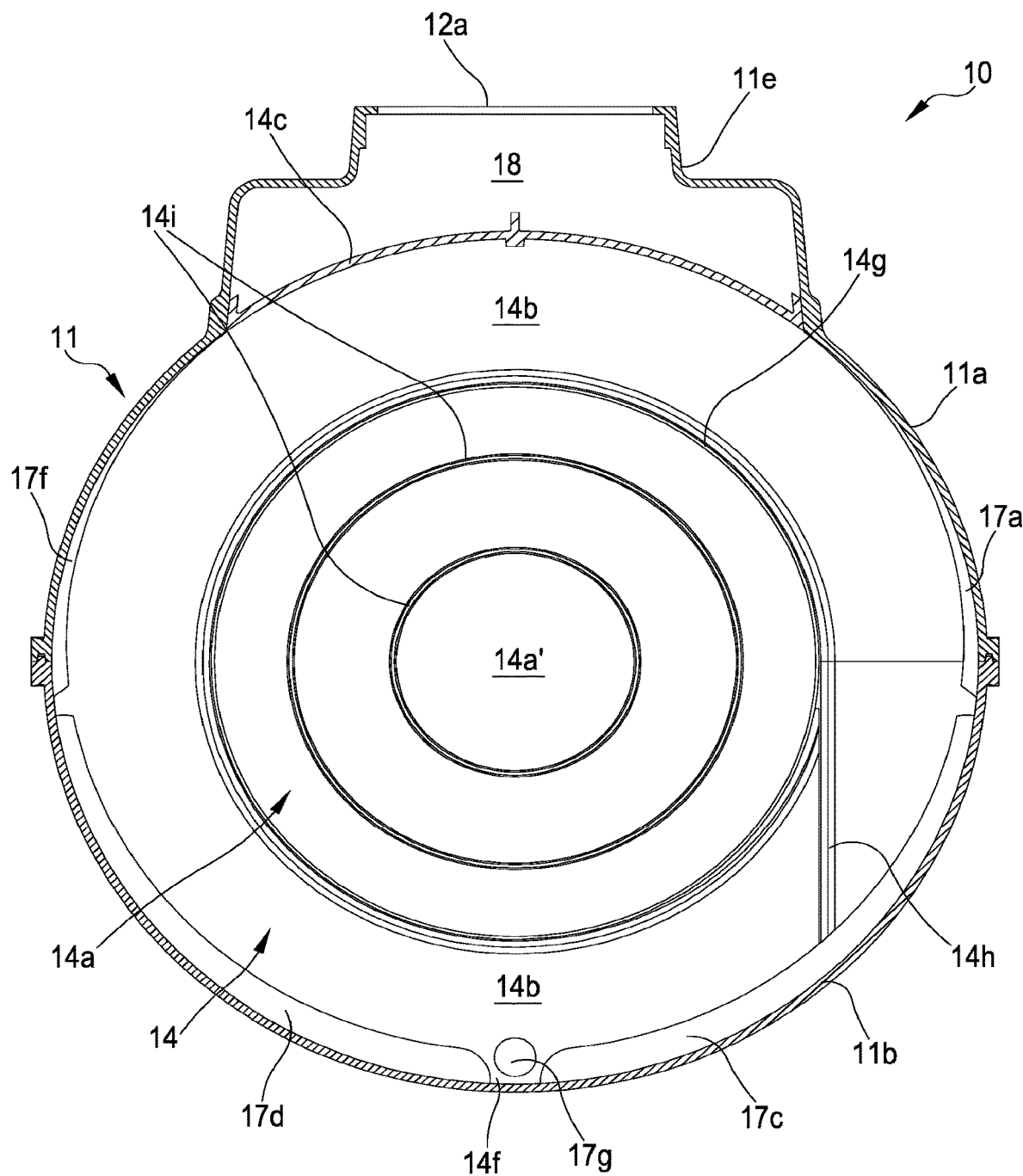
Figure 12A:
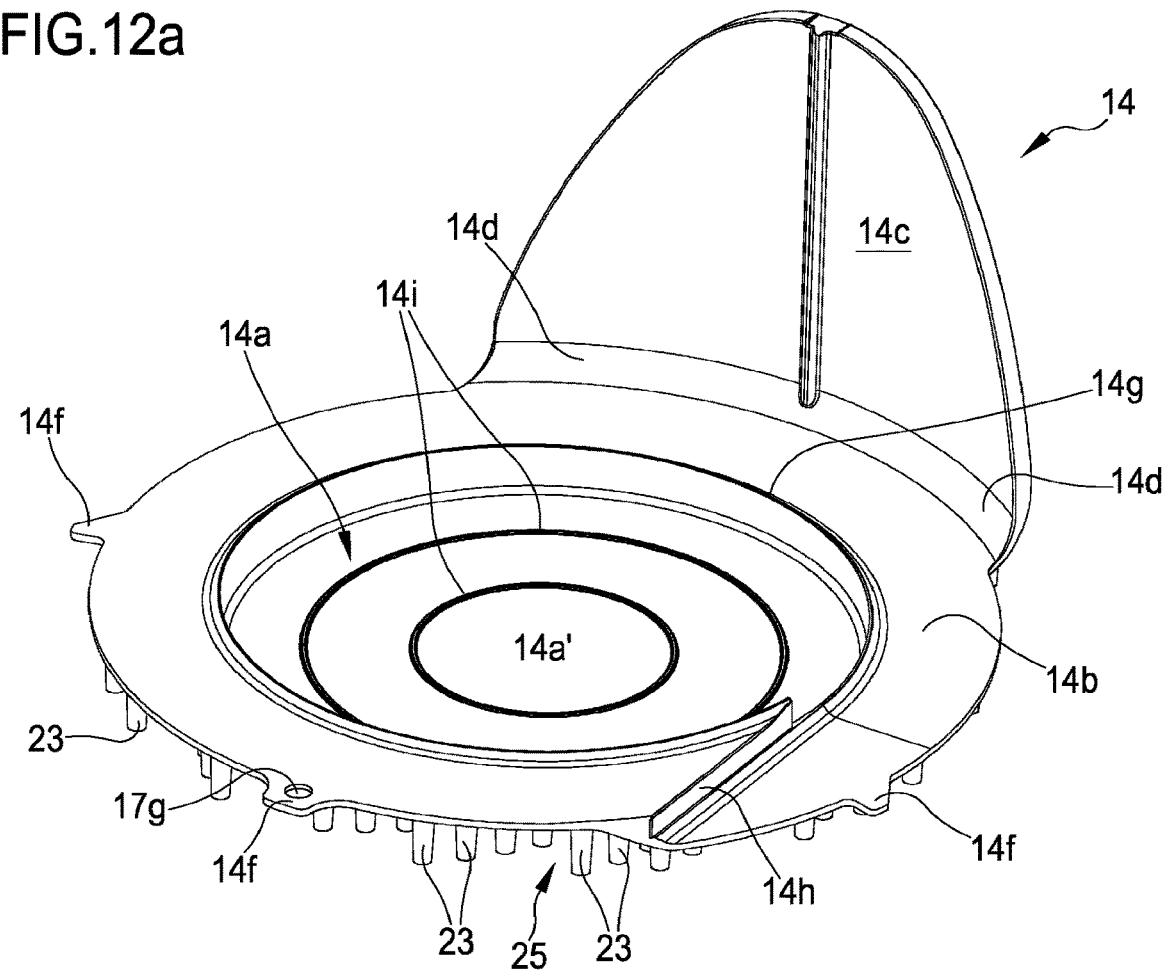
Figure 12B:
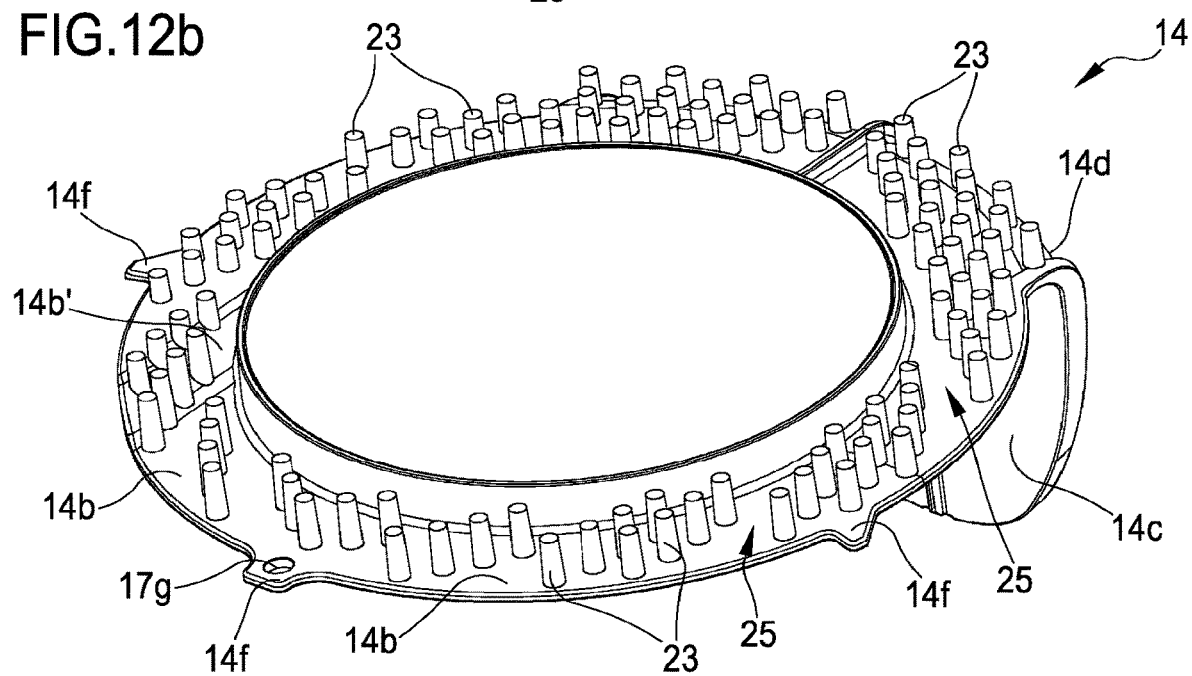
Figure 13A:
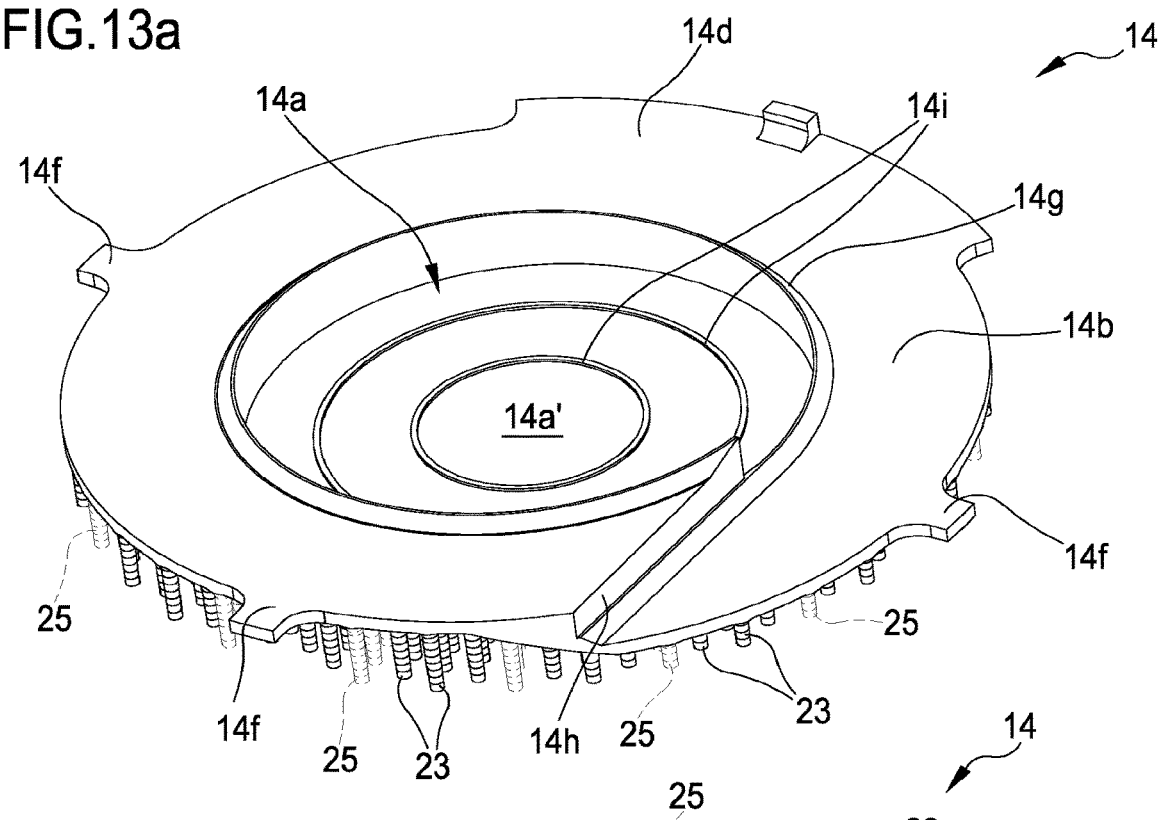
Figure 13B:
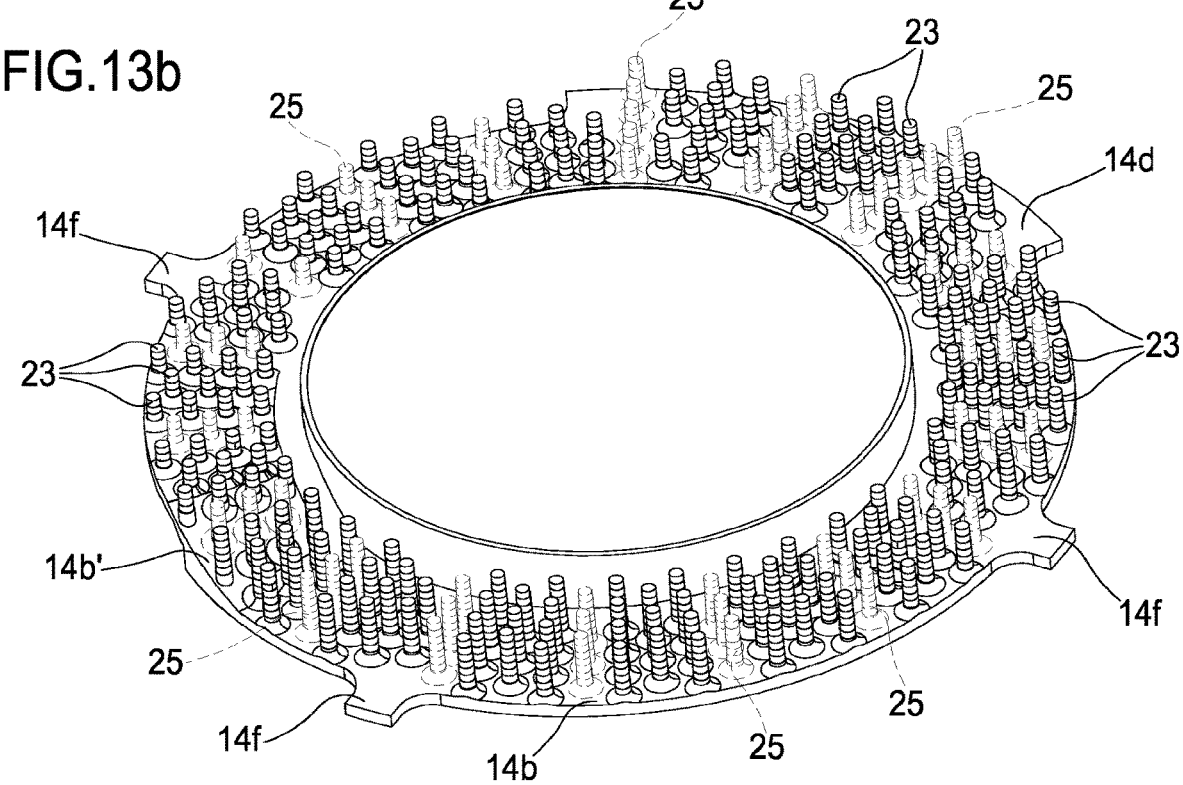
Figure 14A:
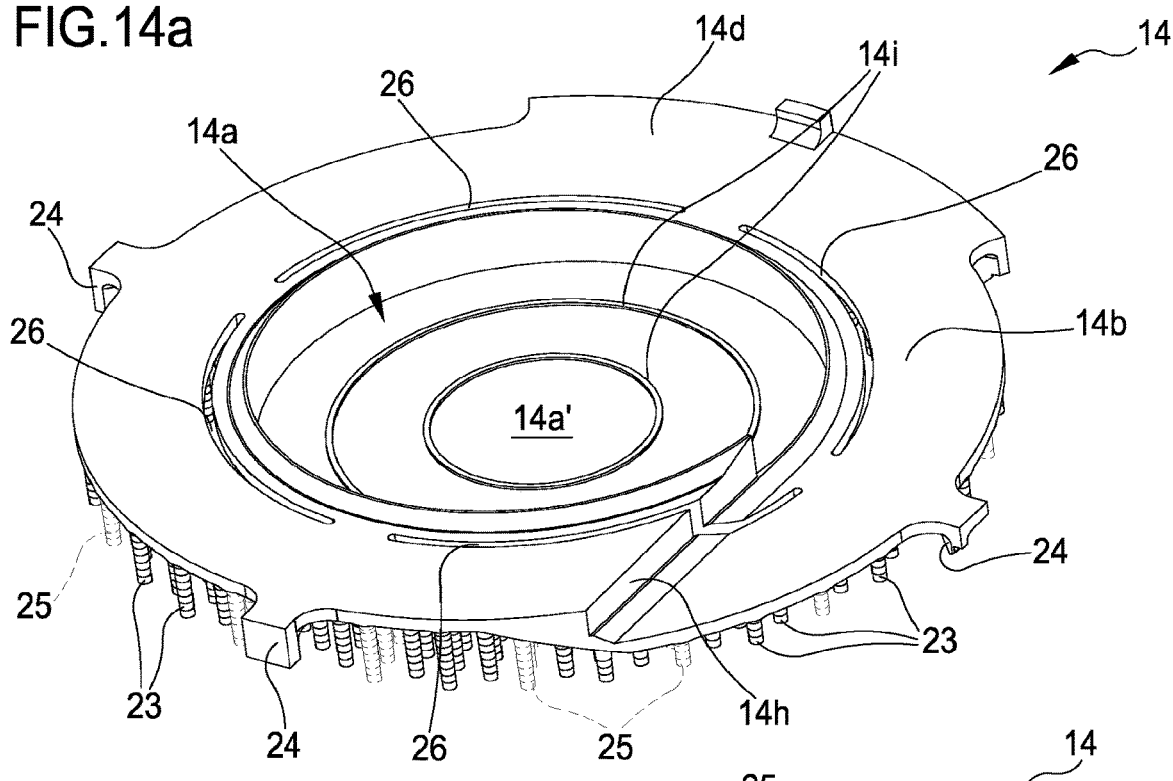
Figure 14B:
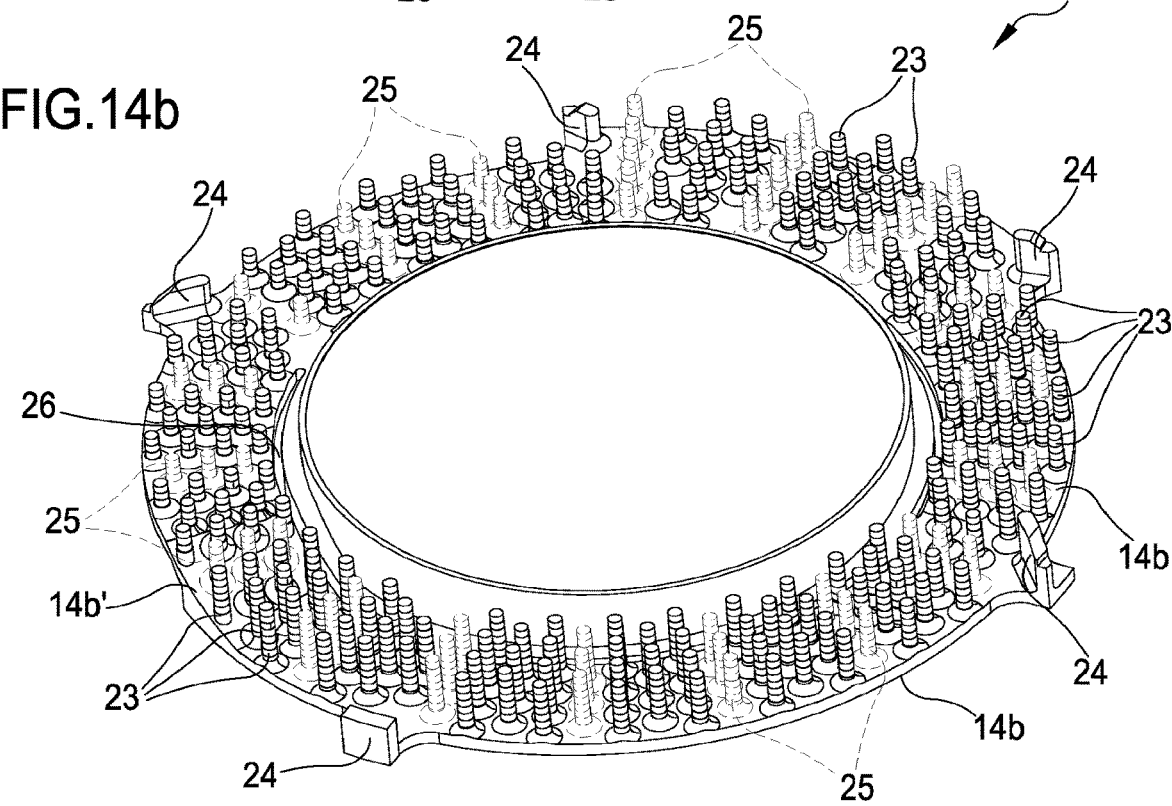
Figure 17:
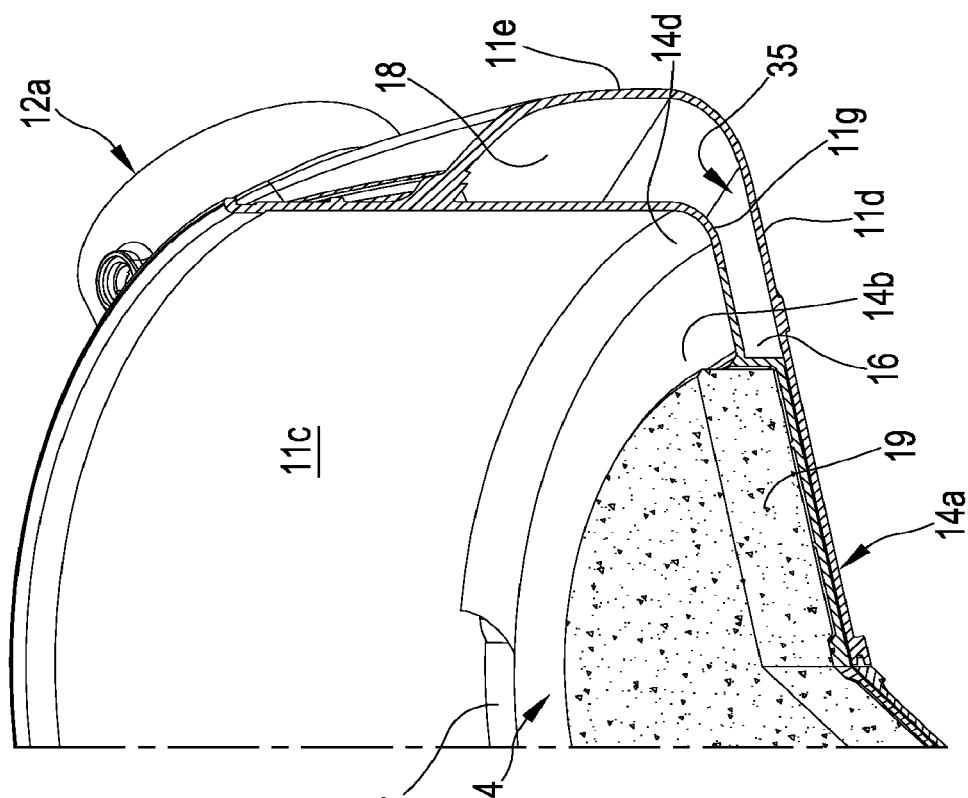
Figure 16:
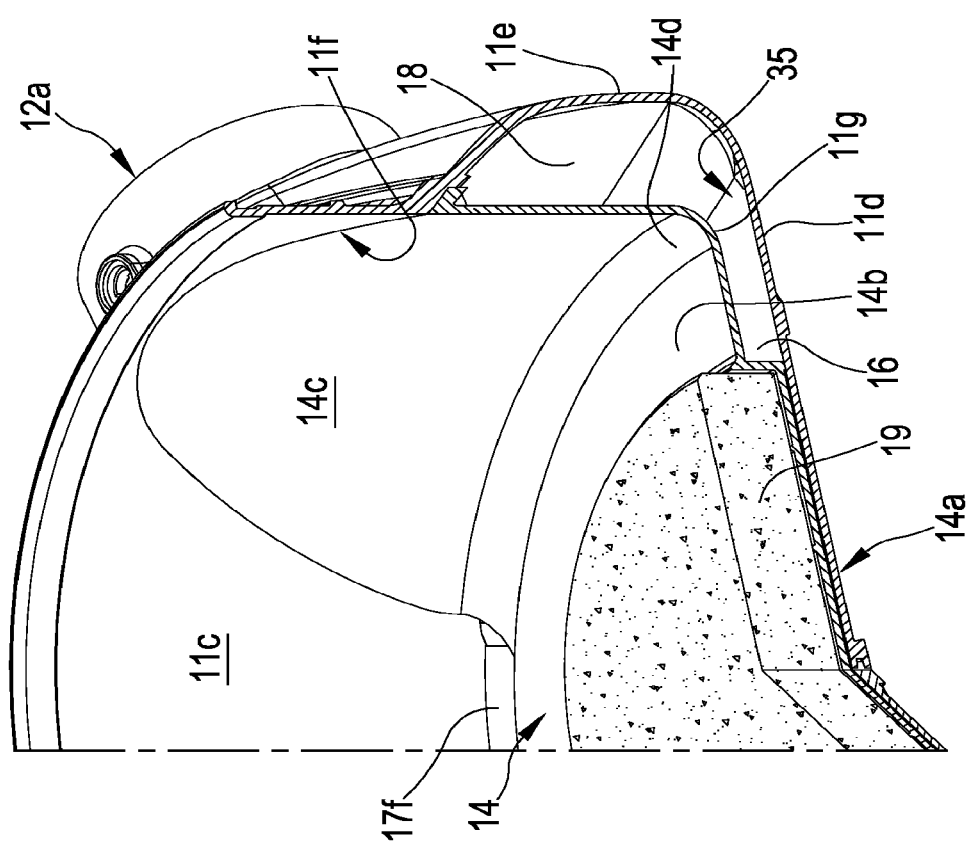
Figure 18:
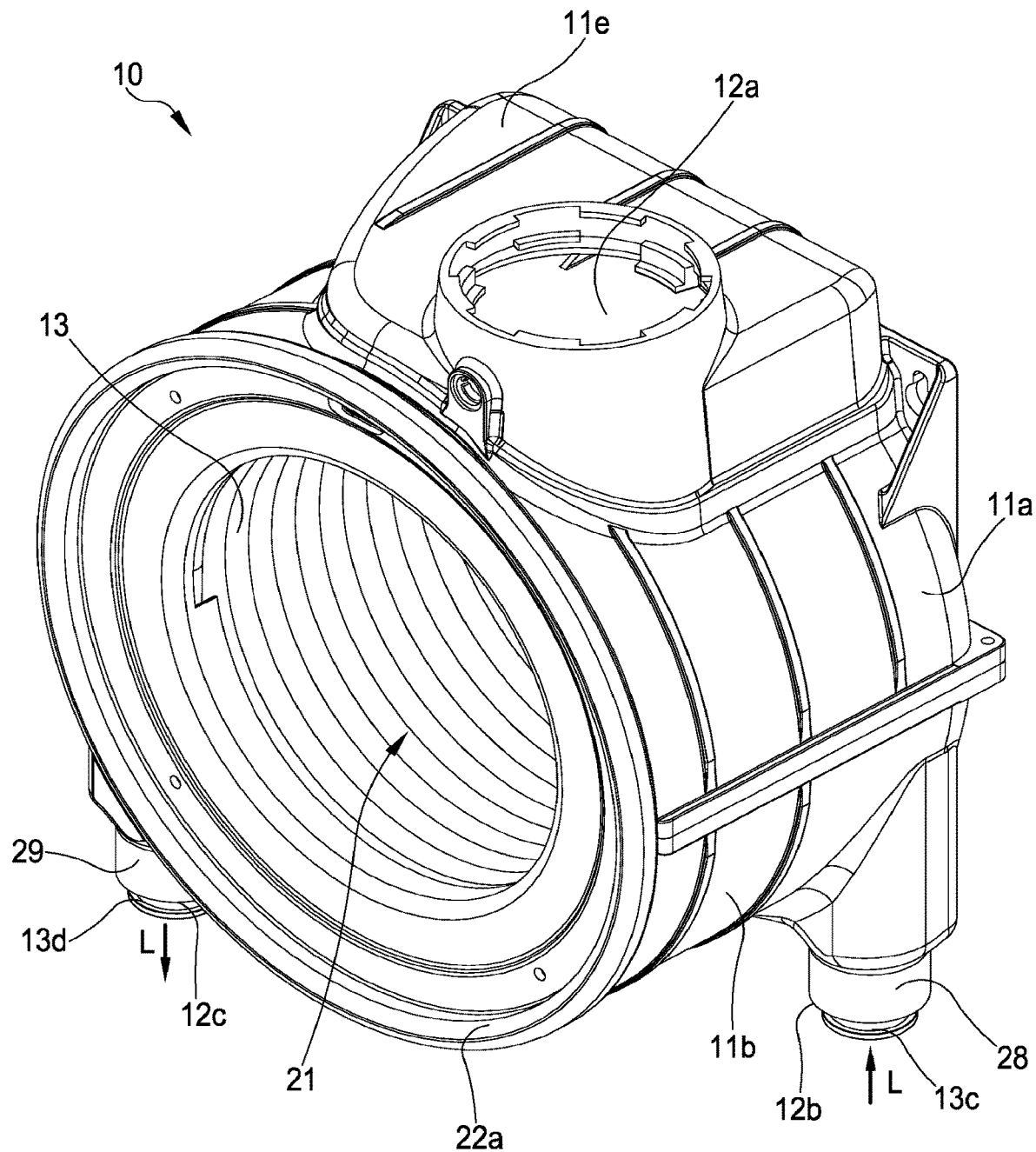
Figure 19:
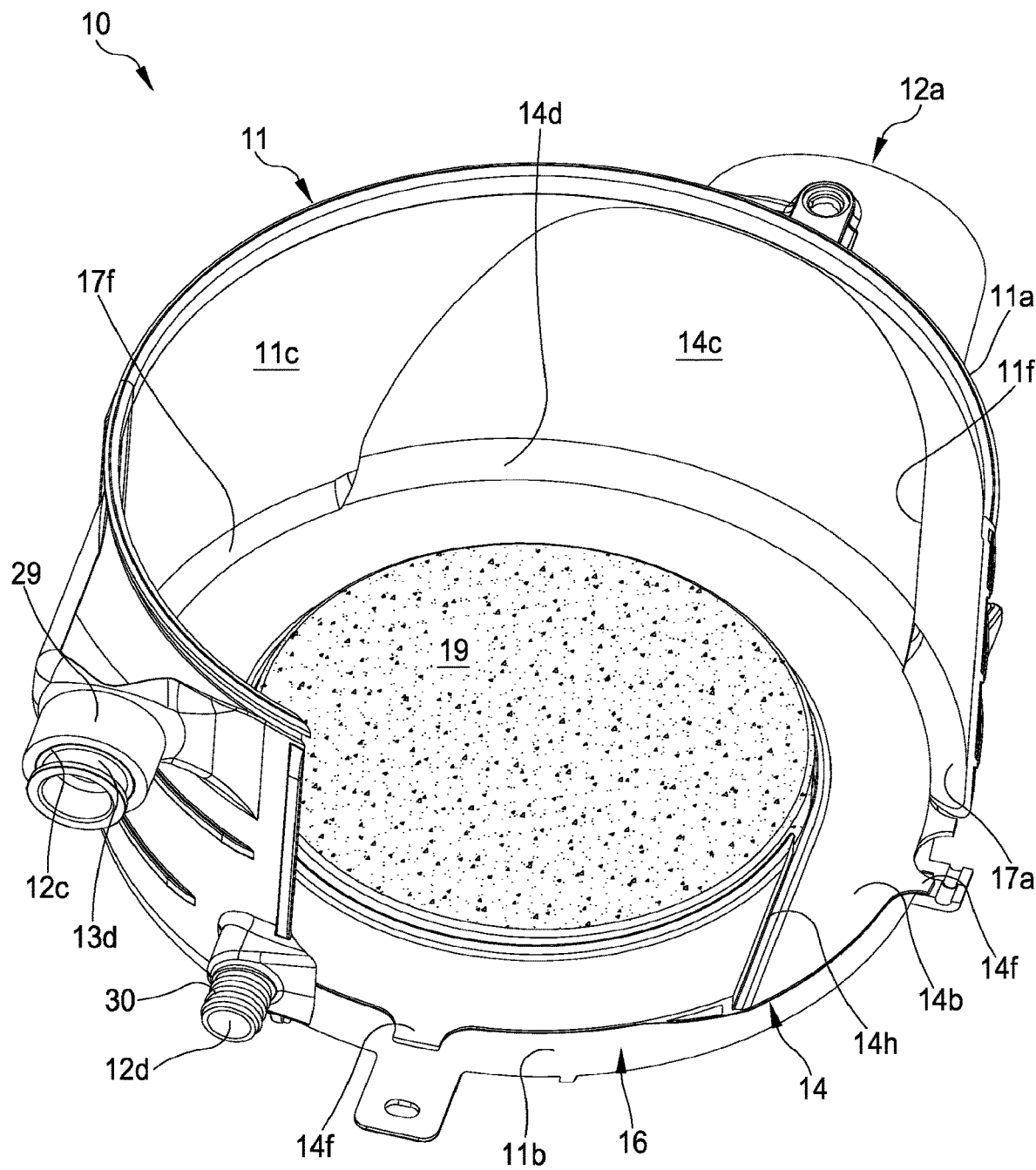

In such drawings,

FIG. 1 is a perspective partially exploded view with some details omitted of a first preferred embodiment of a heat exchange cell according to the present invention;

FIGS. 2a and 2b are top and, respectively, bottom plan views of the heat exchange cell of FIG. 1;

FIG. 3 is a perspective exploded view of the heat exchange cell of FIG. 1;

FIG. 4 is a longitudinal sectional view parallel to axis A-A of the heat exchange cell of FIG. 1 taken along line IV-IV of FIG. 2a;

FIG. 5 is a rear perspective view, in partial cross section, of the heat exchange cell of FIG. 1;

FIG. 6 is a cross section view perpendicular to the axis A-A of the heat exchange cell of FIG. 1 made according to line VI-VI of FIG. 2a;

FIGS. 7a and 7b are a front and, respectively, a rear perspective view of a first preferred embodiment of the separating element of the heat exchange cell of FIG. 1;

FIG. 8 is a longitudinal section view parallel to the axis A-A of the heat exchange cell, similar to FIG. 4, which illustrates a second preferred embodiment of the separating element of the cell;

FIGS. 9a and 9b are a front and, respectively, a rear perspective view of a third preferred embodiment of the separating element of a heat exchange cell according to the present invention;

FIGS. 10 and 11 are as many cross section views perpendicular to the axis A-A of the heat exchange cell, similar to FIG. 6, each of which illustrates additional preferred embodiments of the separating element of the cell;

FIGS. 12a and 12b are a front and, respectively, a rear perspective view of an additional preferred embodiment of the separating element of a heat exchange cell according to the present invention;

FIGS. 13a and 13b are a front and, respectively, a rear perspective view of an additional preferred embodiment of the separating element of a heat exchange cell according to the present invention;

FIGS. 14a and 14b are a front and, respectively, a rear perspective view of an additional preferred embodiment of the separating element of a heat exchange cell according to the present invention;

FIG. 15 is a longitudinal section view parallel to the axis A-A of the heat exchange cell, similar to FIG. 4, which illustrates an additional preferred embodiment of the cell;

FIG. 16 is an enlarged scale and partially sectional view of some details of a preferred embodiment of the closing partition wall between the first and the third collection chamber of the second heat transfer fluid;

FIG. 17 is an enlarged scale and partially sectional view of some details of an additional preferred embodiment of the closing partition wall between the first and the third collection chamber of the second heat transfer fluid;

FIG. 18 is a perspective view of an additional preferred embodiment of a heat exchange cell according to the present invention;

FIG. 19 is a perspective view of the heat exchange cell of FIG. 18 with some elements removed for better clarity.

DETAILED DESCRIPTION OF CURRENTLY PREFERRED EMBODIMENTS OF THE INVENTION

In the following description, identical reference numerals are used for the illustration of the figures to indicate construction elements having the same function. Moreover, for clarity of illustration, some reference numerals are not repeated in all the figures.

With reference to the figures, a heat exchange cell generally indicated at 10 is shown.

In the preferred embodiment shown in FIGS. 1-7, the heat exchange cell 10 is a gas-liquid heat exchange cell of the so-called condensation type in which a heat exchange is provided between a first heat transfer fluid for example constituted by water to be heated, and a second heat transfer fluid for example constituted by hot combustion gases coming from a burner schematically indicated at 20 in the accompanying figures.

With particular reference to the first preferred embodiment shown in FIGS. 1-7, the heat exchange cell 10 comprises a containment casing 11 in which a helically-shaped heat exchanger 13 is mounted.

Preferably, the containment casing 11 is made of a suitable structural material for this type of use, such as for example aluminium, steel or high-performance plastic materials such as for example polyphenylene sulphide (PPS).

The heat exchanger 13 preferably comprises a tubular duct for the flow of the first heat transfer fluid coiled about a longitudinal axis A-A of the helix according to a plurality of coils beginning and ending respectively at an inlet connection 13c of the first heat transfer fluid and at an outlet connection 13d of such a fluid.

Preferably, the heat exchanger is made of a metallic material with high thermal conductivity, such as for example steel or aluminium.

The inlet and outlet connections 13c, 13d of the first heat transfer fluid are configured in such a way as to allow the inlet and, respectively, the outlet of the first heat transfer fluid (water to be heated) into/from the heat exchanger 13. The inlet and outlet directions of the first heat transfer fluid are indicated in the figures with the arrow L.

In the preferred embodiment shown, the tubular duct has a flat, preferably oval, cross section (see FIGS. 3 and 4).

Preferably, the coils of said plurality of coils of the tubular duct of the heat exchanger 13 have a flat cross-section the major axis of which is substantially perpendicular to the longitudinal axis A-A of the helix.

In a further preferred embodiment (not shown) and in order to meet specific application requirements, the major axis of the flat cross-section of the coils of the tubular duct of the heat exchanger 13 may form an acute angle, for example between 60° and 87°, with respect to the longitudinal axis A-A of the helix.

An interstice 13b, preferably of substantially constant width, is located between the flat surfaces of two successive coils of the tubular duct, forming a fluid path for the passage of the second heat transfer fluid along a substantially radial direction (or substantially axial-radial direction in the case of inclined coils), having a predetermined and preferably constant thickness.

To this end, the cell 10 is preferably provided with suitable spacer elements, not better shown in the figures, such as ribs extending from the flat faces of the tubular duct or comb-shaped spacer elements interposed between said flat faces and configured to define the interstice 13b between the flat faces of the tubular duct.

Within the framework of the present description and of the following claims, the term: "width" of the interstice defined between the flat faces of the duct of the heat exchanger is used to indicate the distance between said faces measured along a direction perpendicular thereto.

Preferably, the helically-shaped heat exchanger 13 is mounted within the containment casing 11 in such a way as to define in said casing a feeding zone 21 of the second heat transfer fluid, in this case constituted by the hot combustion gases generated by the burner 20.

Preferably, the feeding zone 21 of the second heat transfer fluid is defined within the containment casing 11 coaxially and internally with respect to the heat exchanger 13.

In this way, it is advantageously possible to have such a configuration within the heat exchange cell 10 as to obtain a flow of the second heat transfer fluid that goes from the feeding zone 21 radially (or in a substantially axial-radial direction in the case of inclined coils) outwards through the interstices 13b defined between the coils of the helically-shaped heat exchanger 13.

In the preferred embodiment shown, the containment casing 11 is substantially cup-shaped and includes a peripheral side wall 11c and a rear wall 11d.

The containment casing 11 of this preferred embodiment is closed in a sealing manner at the front end by a substantially annular front wall 22 on which a support plate of the burner 20, conventional per se and not shown, is fixed in a removable manner and again in a sealing manner.

Preferably, the front wall 22 comprises a first annular element 22a fixed to the peripheral side wall 11c and a second annular element 22b removably associated to the first annular element 22a.

Preferably, the second annular element 22b is removably fixed in a sealing manner to the first annular element 22a at an inner peripheral edge thereof in a way known per se, for example by means of an O-ring 31 (see FIG. 4).

In this preferred configuration of the front wall 22 of the cell 10, the casing 11 is thus closed in a substantially sealing manner by the support plate of the burner 20 associated to the second annular element 22b.

In this preferred embodiment, the cell 10 further comprises a substantially annular heat-insulating element 33 facing the feeding zone 21 of the second heat transfer fluid.

The substantially annular heat-insulating element 33 is centrally provided with an opening 36 coaxial with the longitudinal axis A-A of the helix of the heat exchanger 13 (in this preferred case coinciding with the longitudinal axis of the heat exchange cell 10).

Advantageously, the heat-insulating element 33 thermally insulates the front wall 22 of the containment casing 11 from the feeding zone 21 of the second heat transfer fluid at a high temperature, thereby thermally protecting the material of such a wall.

Preferably, the heat-insulating element 33 is housed in a respective housing seat 34 formed in the front wall 22 of the containment casing 11.

Preferably, the housing seat 34 of the heat-insulating element 33 is formed coaxially and externally with respect to the opening 32, coaxial with the longitudinal axis A-A of the helix, formed in the second annular element 22b of the front wall 22 of the containment casing 11.

In this way, the burner 20 is received in the openings 32 and 36 centrally defined in the second annular element 22b of the front wall 22 of the cell 10 and, respectively, in the heat-insulating element 33 so as to be mounted in the feeding zone 21 of the second heat transfer fluid.

In the preferred embodiment shown, the containment casing 11 has in particular a substantially cylindrical shape and comprises two suitably shaped half-shells 11a, 11b.

In the operating configuration, preferably horizontal, the heat exchange cell 10 is in fluid communication with external components (not shown), forming part of the apparatus or system in which the cell is mounted, by means of a plurality of openings 12a-12d preferably formed on the side wall 11c of the containment casing 11 or in additional elements associated thereto.

Thus, in the preferred embodiment illustrated, a first opening 12a is configured for allowing the outlet of the second heat transfer fluid from the cell 10 and is preferably formed in a discharge cap 11e of such a fluid externally associated to the peripheral side wall 11c of the containment casing 11.

Preferably and as will become clearer hereafter, the discharge cap 11e is integral with the half-shell 11a so as to simplify the manufacture of the cell 10 by suitably reducing the number of elements of the cell and by simplifying the assembling operations thereof.

In the preferred operating configuration (horizontal) of the preferred embodiment of the heat exchange cell 10 shown in FIG. 1, the outlet opening 12a is preferably positioned in such a way as to have a vertical axis and to be facing upwards.

Second and third openings 12b, 12c are preferably formed at a free end of respective sleeves 28, 29 extending from the peripheral wall 11c of the containment casing 11 and preferably integrally formed with the lower half-shell 11b of the casing 11.

Preferably, the inlet and outlet connections 13c, 13d of the first heat transfer fluid of the heat exchanger 13 are mounted in abutment relationship in the sleeves 28, 29 so as to slightly protrude from the openings 12b and 12c, as shown in FIG. 1, for the connection with the hydraulic components of a heating apparatus or system—not shown—in which the cell 10 is installed.

The openings 12b, 12c are therefore preferably configured in such a way as to accommodate the inlet and outlet connections 13c, 13d of the heat exchanger 13 which allow, as already mentioned above, the inlet and, respectively, the outlet of the first heat transfer fluid (water to be heated) into/from the heat exchanger 13.

In the operating configuration of the heat exchange cell 10, the openings 12b, 12c of the containment casing 11 are respectively located at the rear and at the front relative to one another, with respect to the axial development of the cell 10 along the longitudinal axis A-A of the helix of the heat exchanger 13, and are facing downwards so as to facilitate the connection with external components (not shown) of the heating apparatus or system in which the cell 10 is installed.

In the preferred embodiment shown of the heat exchange cell 10 and since such a cell is of the condensation type, the containment casing 11 is further preferably provided with a fourth opening 12d formed at a free end of a respective sleeve 30 extending from the peripheral wall 11c of the containment casing 11 and preferably integrally formed with the lower half-shell 11b of the casing 11.

The opening 12d is configured for discharging the condensate generated during the heat exchange process between the two heat transfer fluids and which is collected in the lower part of the containment casing 11.

The heat exchange cell 10 according to the present invention comprises a first collection chamber 15 of the second heat transfer fluid externally defined with respect to the heat exchanger 13 between a radially outer wall 13a of the heat exchanger 13 and the peripheral side wall 11c of the containment casing 11.

In this case, and since the heat exchanger 13 is formed by the helically-shaped tubular duct, the outer wall 13a is discontinuous, i.e. axially interrupted by the interstices 13b defined between successive coils of the heat exchanger, and is formed by the radially outer face of the coils of the tubular duct itself.

Such a first collection chamber 15 is frontally delimited by the front wall 20 (specifically by the annular element 22a) and is delimited at the back by a separating element 14.

In this preferred embodiment, the separating element 14 is rearwardly mounted and is axially flanking the heat exchanger 13 and preferably comprises a substantially plate-shaped body that will be further discussed hereinafter.

In this preferred configuration of the heat exchange cell 10, the peripheral side wall 11c of the casing 11 encloses and laterally delimits the heat exchanger 13 and the first collection chamber (15) of the second heat transfer fluid substantially without interruptions and substantially for the entire axial extension thereof (see FIGS. 4 and 5).

Preferably, the separating element 14 closes at the rear and in a substantially complete manner the feeding zone 21 of the second heat transfer fluid coaxially defined within the heat exchanger 13, a zone which in this preferred embodiment is also referred to as combustion chamber 21.

A second collection chamber 16 of the second heat transfer fluid is thus defined in the cell 10, at an axially external position with respect to the heat exchanger 13, between the separating element 14, the peripheral side wall 11c and the rear wall 11d of the containment casing 11.

Basically, the second collection chamber 16 of the second heat transfer fluid is frontally delimited by the separating element 14, is laterally delimited by the peripheral side wall 11c and is delimited at the back by the rear wall 11d of the containment casing 11.

The first collection chamber 15 of the second heat transfer fluid is in fluid communication with the second collection chamber 16, structurally separated therefrom by the separating element 14, by means of a plurality of first passages 17a-17f configured to allow the flow of the second heat transfer fluid from the first collection chamber 15 to the second collection chamber 16 substantially in parallel to the peripheral side wall 11c of the casing 11 and in proximity thereto (see in particular FIG. 6).

The heat exchange cell 10 further comprises a second passage 35 allowing a fluid outlet from the second collection chamber 16 of the second heat transfer fluid, peripherally defined in the second collection chamber between an axial end 11g of the peripheral side wall 11c and the rear wall 11d of the containment casing 11.

Preferably, the separating element 14 comprises—at an angular position where the second passage 35 allowing a fluid outlet from the second collection chamber 16 of the second heat transfer fluid is made—a closing partition wall 14d extending between the peripheral side wall 11c of the casing 11 and a portion of the peripheral edge of the separating element 14 to close the fluid passage between the first collection chamber 15 and the second collection chamber 16 in such a zone (see in particular FIGS. 3-5 and 7).

In this way, it is advantageously possible to limit to the greatest possible extent direct by-pass phenomena of the second heat transfer fluid flowing from the first collection chamber 15 towards the second passage 35 allowing a fluid outlet from the second collection chamber 16 and to advantageously direct such a fluid towards the other zones of the second collection chamber 16 before the fluid leaves the chamber.

In the preferred embodiment illustrated and as will be better apparent in the following, the peripheral side wall 11c is formed partly by the half-shell 11a and partly by a plate-shaped portion 14c of the separating element 14 flush-mounted in the thickness of the peripheral side wall 11c and integrally extending from the closing partition wall 14d.

In this preferred embodiment, therefore, the axial end 11g of the peripheral side wall 11c of the containment casing 11 is defined at the rear axial end of the peripheral side wall 11c which is substantially defined at the joining zone between the closing partition wall 14d and the plate-shaped portion 14c.

Preferably, the second collection chamber 16 of the second heat transfer fluid is in fluid communication downstream with a third collection chamber 18 of the second heat transfer fluid which in turn is in fluid communication with the second passage 35 allowing a fluid outlet from the second collection chamber 16 and with the outlet opening 12a of the second heat transfer fluid from the cell 10 defined downstream of the third collection chamber 18, as shown in FIG. 4.

The third collection chamber 18 of the second heat transfer fluid is defined in the cap 11e that extends from the peripheral side wall 11c of the casing, radially outwards of the casing 11 and in which the outlet opening 12a is formed.

In this preferred embodiment of the cell 10, therefore, the cap 11e is positioned downstream of the second passage 35 allowing a fluid outlet from the second collection chamber 16.

Additional details of the configuration of the heat exchange cell 10 of this preferred embodiment and, in particular, of the peripheral side wall 11c, of the separating element 14, of the closing partition wall 14d, of the second and third collection chambers 16, 18 and of the second flow passage 35 can be gathered from FIG. 16.

In the preferred embodiment illustrated in FIGS. 1-7 and 16, the cap 11e is made at an inner opening 11f (better shown in FIG. 16) formed in the thickness of the peripheral side wall 11c of the casing 11 and configured to receive, with shape coupling, the plate-shaped portion 14c of the separating element 14.

In this preferred embodiment, the cap 11e is in axis with the centreline plane of the heat exchange cell 10 and, as outlined above, is preferably integrally formed with the peripheral side wall 11c of the casing 11.

In an alternative preferred embodiment, not shown, the cap 11e may be constituted by a separate element, fixed to the peripheral side wall 11c of the casing 11 by suitable fastening elements.

In the preferred embodiment of the separating element 14 shown in FIGS. 7a-7b, the separating element 14 has a shape substantially mating the shape of the containment casing 11.

In this way, the passages 17a-17f are preferably formed between the peripheral edge of the separating element 14 and the peripheral side wall 11c of the containment casing 11 (see in particular FIG. 6).

To this end, the separating element 14 has at least in part a transversal extension smaller than the cross-section of the containment casing 11.

In the preferred embodiment illustrated in FIGS. 1-7b, the total cross-sectional area of fluid flow defined by the plurality of first flow passages described above (in other words, the passages 17a-17f) is comprised between 15% and 30% of the total internal cross-section of the containment casing 11.

The Applicant has in this case experimentally found that by observing such specific values of the total cross-sectional area of fluid flow of the second heat transfer fluid defined by the first passages 17a-17f, an effective optimisation of the fluid dynamics of the second heat transfer fluid is achieved.

Such a fluid outwardly flows substantially radially or axially-radially through the heat exchanger 13 along substantially its entire axial extension and along substantially its entire circumferential extension, significantly reducing preferential fluid paths and by-pass phenomena of the coils of the exchanger 13.

In particular, the Applicant has found that the flow rate of the second heat transfer fluid, which flows through the heat exchanger 13 radially or axially-radially passing in the interstice defined between one coil and another, can be made substantially constant along the axial extension of the heat exchanger itself.

The Applicant has also observed that such a flow rate is made substantially constant also along the circumferential extension of the heat exchanger 13 ensuring that the second heat transfer fluid uniformly flows in the first collection chamber 15 along the circumferential extension of the heat exchanger 13, thereby significantly reducing the presence of dead zones not flown by the fluid in the first collection chamber 15.

The Applicant has found that by optimising in this way the fluid dynamics of the second heat transfer fluid and therefore the heat exchange between such a fluid and the heat exchanger 13, it is advantageously possible to increase the heat exchange efficiency of the cell 10—with respect to the first configuration of cells of the prior art without internal partition elements illustrated above—thereby reducing the size of the heat exchanger 13—in particular along the axial direction—with a consequent advantageous reduction of costs, consumption of material and size both of the heat exchanger 13 and of the heat exchange cell 10 that contains the same.

In this preferred embodiment and as can be appreciated from FIG. 6, moreover, the cross-sectional area of fluid flow defined by the first passages 17a-17f is substantially uniformly distributed along the perimeter of the peripheral side wall of the containment casing 11 and is substantially symmetrically distributed with respect to a vertical centreline plane of the cell 10.

In this way, it is advantageously possible to uniformly adjust the distribution of the second heat transfer fluid along the circumferential direction thereby optimising the fluid dynamics of the fluid.

In an alternative preferred embodiment, illustrated hereinafter with reference to FIG. 10, the separating element 14 has dimensions at least partially complementary to the dimensions of the peripheral side wall 11c and the flow passages of the second heat transfer fluid 17a-17f are partially made in the separating element 14 in a peripheral area thereof and comprise a plurality of suitably shaped openings, such as for example holes or slots.

In the preferred embodiment shown in the figures, the body of the separating element 14 is substantially disc-shaped.

The separating element 14 also comprises a heat exchange portion in contact with at least one portion of an end coil of the heat exchanger 13 (in this case the rear end) and configured to allow a heat exchange between this coil portion and the second collection chamber 16 of the second heat transfer fluid.

Preferably, the heat exchange portion of the separating element 14 is integral with the body of such an element.

Preferably, the heat exchange portion of the separating element 14 is made of a material, preferably metallic, having a high thermal conductivity, such as for example aluminium or steel.

Preferably, the body of the separating element 14 centrally defines a housing seat 14a wherein a disc 19 of heat-insulating material is housed, in such a way that the disc is facing towards the combustion chamber 21 (the feeding zone of the second heat transfer fluid in the cell 10).

In this preferred embodiment and with respect to the plane of the body of the separating element 14, the housing seat 14a axially extends towards the rear wall 11d of the containment casing 11, so that the second collection chamber 16 of the second heat transfer fluid has a preferred substantially annular shape.

In this preferred embodiment, the body of the separating element 14 comprises a peripheral crown 14b at a radially external position with respect to the seat 14a.

Preferably, the peripheral crown 14b constitutes the heat exchange portion of the separating element 14 in contact with and in heat exchange relationship with at least one portion of the end coil of the heat exchanger 13.

In this way, it is advantageously possible to transfer a part of the heat absorbed by the heat-insulating disc 19 to the peripheral crown 14b that constitutes the heat exchange portion of the separating element 14 and from this to the end coil of the heat exchanger 13 thereby increasing the heat exchange efficiency of the cell 10.

Preferably, the peripheral crown 14b develops at least in part spiral-wise and substantially with the same winding pitch of the coils of the heat exchanger 13.

In the preferred embodiment shown, therefore, the second collection chamber 16 of the second heat transfer fluid has a cross-sectional area of fluid flow which is variable along a circumferential direction.

In this preferred embodiment and as outlined above, the configuration of the second collection chamber 16 allows to achieve the following advantageous technical effects:
  the formation of an additional heat exchange element of the cell 10—basically a single-coil spiral duct—which is particularly effective in further increasing the heat exchange efficiency of the cell 10 and in particular the condensing effect of the second heat transfer fluid (in this case the combustion gases generated by the burner 20) thanks to the heat exchange with the peripheral crown 14b that forms the heat exchange portion of the separating element 14, peripheral crown 14b that is in heat exchange relationship and in direct contact with the inlet coil of the first fluid in the heat exchanger 13 and in which the first having the minimum temperature in the cell 10 is advantageously fed;
  imparting to the second heat transfer fluid a movement which hinders a direct passage towards the second passage 35 allowing a fluid outlet from the second collection chamber 16, thereby increasing the heat transfer by such a fluid and the condensing capacity of the second collection chamber 16 of the cell 10.

Advantageously, these technical effects are achieved simultaneously with an optimal exploitation of the space which is in any case occupied by the heat exchanger 13, since the second collection chamber 16 is partially interpenetrating in the volume occupied by the heat exchanger 13, having its own winding pitch and thus configured to generate a volume that in this case is advantageously exploited by the second collection chamber 16 for heat exchange purposes.

Preferably, the opposite ends of the peripheral crown 14b are connected at their bottoms by an inclined connecting wall 14b' configured to mitigate the turbulences which would be generated in the presence of a cavity or of a step connection between the opposite axially offset ends of the peripheral crown 14b.

The housing seat 14a of the disc 19 includes a bottom wall 14a' that is preferably internally provided with at least a first spacer relief 14i configured to keep the disc 19 at a predetermined distance from the bottom wall 14a' of the housing seat 14a.

The disc 19 is fixed in the housing seat 14a by suitable fastening elements, conventional per se and not shown, such as a threaded screw configured to cooperate with a housing seat provided with a corresponding threaded hole.

The bottom wall 14a' of the housing seat 14a also includes a second spacer relief 14j externally and rearwardly extending from the separating element 14 towards the rear wall 11d of the casing 11 and configured to keep the separating element 14 at a relationship of substantial contact of the bottom wall 14a' of the seat 14a with the rear wall 11d of the casing 11.

In this way, it is advantageously possible to prevent a substantial passage of the second heat transfer fluid between the bottom wall 14a' of the seat 14a and the rear wall 11d of the casing 11 with possible heating phenomena of the second heat transfer fluid by the heat-insulating disc 19 that can penalise the condensing capacity of the cell 10.

The housing seat 14a of the disc 19 is frontally peripherally delimited by a circumferential relief 14g which ensures a self-centering and a locking in the correct position of the heat exchanger 13 with respect to the separating element 14 and to the casing 11.

Thanks to this locking in the correct position of the heat exchanger 13 and as described above, it is advantageously possible to prevent that the inlet and outlet connections 13c, 13d of the heat exchanger 13 sealingly mounted in the two ends of the heat exchanger 13 and in abutment relationship in the corresponding inlet and outlet sleeves 28, 29 of the containment casing 11 may come out as a consequence of the pressure exerted by the first heat transfer fluid.

The circumferential relief 14g ends with a rectilinear portion 14h which laterally delimits a rectilinear portion which is formed in the peripheral crown 14b of the body of the separating element 14 and which is configured to accommodate a rectilinear end portion of the heat exchanger 13.

In the preferred embodiment shown, the separating element 14 comprises at least one spacer projection and, more preferably, a plurality of spacer projections 14f laterally extending from the peripheral edge of the separating element 14 to cooperate in abutment relationship with the peripheral side wall 11c of the containment casing 11.

Advantageously, the spacer protrusions 14f ensure correct mounting and centring of the separating element 14 and of the heat exchanger 13 associated thereto within the casing 11.

The spacer protrusions 14f also contribute to define the first flow passages 17a-17f between the peripheral edge of the separating element 14 and the peripheral side wall 11c of the containment casing 11.

As illustrated above, in the preferred embodiment shown and in order to limit a direct passage of the second heat transfer fluid from the first collection chamber 15 to the third collection chamber 18 through the inner opening 11f, the closing partition wall 14d of the separating element 14 comprises the plate-shaped portion 14c configured in such a manner as to be at least partially complementary to the inner opening 11f and as to be extending parallel to the peripheral side wall 11c of the casing 11.

In the assembled configuration, the plate-shaped portion 14c is housed with shape coupling in the inner opening 11f of the peripheral side wall 11c so as to be flush-mounted in the thickness of the peripheral side wall 11c and close the direct passage between the first and the third collection chambers 15, 18 of the second heat transfer fluid.

Basically, in this preferred embodiment and in the assembled configuration of the cell 10, the plate-shaped portion 14c forms an integral part of the peripheral side wall 11c of the casing 11.

In a preferred embodiment, the plate-shaped portion 14c of the separating element 14 can be made of a material different from the material of the heat exchange portion of such an element, for example made of high-performance plastic material provided with properties of resistance to chemicals, flame and water vapour, such as for example polyphenylene sulphide (PPS).

In this case, the separating element 14 is of the composite type and can be made by co-moulding by means of techniques known to those skilled in the art.

In the alternative preferred embodiment of the separating element 14 illustrated in FIG. 8, the lateral wall of the housing seat 14a of the heat-insulating disc 19 comprises a portion tapered towards the bottom wall 14a' of the housing seat 14a.

In this way, it is advantageously possible to reduce the pressure losses of the second heat transfer fluid flowing in the second collection chamber 16 allowing to reduce the power of the feeding devices (generally a fan) necessary to feed such a fluid in the heat exchange cell 10 while ensuring a correct operation thereof.

In the preferred embodiment of the separating element 14 shown in FIGS. 9a-9b, the closing partition wall 14d is provided with a plurality of holes 14e configured to define as many first passages adapted to allow a flow of the second heat transfer fluid from the first collection chamber 15 to the second collection chamber 16 substantially in parallel to the peripheral side wall 11c of the casing 11 and in proximity thereto.

Specifically, these additional first flow passages 14e are configured to allow a flow of the second heat transfer fluid from the first collection chamber 15 towards the second passage 35 allowing a fluid outlet from the second collection chamber 16.

In this way and as outlined above, it is advantageously possible to increase the possibilities of adjusting the fluid dynamics of the second heat transfer fluid, both by adjusting the value of the total cross sectional area of passage of the second heat transfer fluid from the first collection chamber 15 towards the second collection chamber 16, and by directing a secondary flow of the second heat transfer fluid towards the second passage 35 allowing a fluid outlet from the second collection chamber 16.

Also in this case and as outlined above in relation to the embodiment illustrated in FIGS. 1-7b, the total cross-sectional area of fluid flow defined by the plurality of first flow passages, in this case formed by the passages 17a-17f and by the holes 14e, is comprised between 15% and 30% of the total internal cross-section of the containment casing 11 so as to achieve the advantageous effects of fluid dynamic adjustment outlined above.

Also in this preferred embodiment of the cell 10 and as it is possible to appreciate from FIGS. 9a and 9b, the cross-sectional area of fluid flow defined by the first passages 17a-17f and 14e is substantially uniformly distributed along the perimeter of the peripheral side wall of the containment casing 11 and substantially symmetrically with respect to a vertical centreline plane of the cell 10, so as to uniformly adjust the distribution along the circumferential direction of the second heat transfer fluid, thereby optimising the fluid dynamics thereof.

In this preferred embodiment of the heat exchange cell 10, which is particularly advantageous when the cell is horizontally mounted in the operating configuration, moreover, the holes 14e formed in the closing partition wall 14d advantageously hinder the formation of accumulation pockets of the second heat transfer fluid in the upper zone of the first collection chamber 15 due to the convective rise of such a fluid.

Preferably and as illustrated for example in the preferred embodiment shown in FIGS. 9a-9b, the separating element 14 can comprise a plurality of substantially slot-shaped through slits 26 positioned close to the housing seat 14a of the disc 19.

Advantageously, the presence of the slits 26 in the separating element 14 leads to a partial thermal decoupling between the heat-insulating disc 19 and the seat 14a housing the same and the peripheral crown 14b of the body of the separating element 14 that constitutes the heat exchange portion of the latter.

In this way, it is advantageously possible to adjust the condensing capacity of the cell 10, in this case increasing the same, limiting the temperature of the peripheral crown 14b (heat exchange portion) of the body of the separating element 14.

In a preferred embodiment and as illustrated for example in FIGS. 10 and 11, the cross-sectional area of fluid flow defined by the plurality of first flow passages, increases along the perimeter of the peripheral side wall of the containment casing 11 of the cell 10 as the distance from the second passage 35 allowing a fluid outlet from the second collection chamber 16 of the second heat transfer fluid increases.

As outlined above, this preferred embodiment is particularly advantageous in the case considered here—in which the cell 10 is mounted horizontally in the operating configuration—since this type of variation of the cross-sectional area of fluid flow defined by the plurality of first flow passages hinders the formation of accumulation pockets of the second heat transfer fluid in the upper zone of the first collection chamber 15 close to the passage 35 allowing a fluid outlet from the second collection chamber 16.

In this way, the distribution of the second heat transfer fluid along the circumferential extension of the first collection chamber 15 is optimised, thereby significantly reducing the presence of dead zones not flown by the fluid.

In a preferred embodiment and as illustrated in FIG. 10, the desired increase of the cross-sectional area of fluid flow of the second heat transfer fluid is achieved by firstly arranging a plurality of through holes 17a', forming as many first fluid passages, in the upper zone of the peripheral crown 14b of the separating element 14.

Preferably, the through holes 17a' have a cross-sectional area of fluid flow which increases as the distance from the second fluid outlet passage 35 from the second collection chamber 16 increases.

Secondly and again as illustrated in FIG. 10, the desired increase of the cross-sectional area of fluid flow of the second heat transfer fluid is achieved by defining a further plurality of first fluid passages 17c, 17d between the lower peripheral edge of the separating element 14 and the peripheral side wall 11c of the containment casing 11 and a through hole 17g in a spacer 14f extending from such a peripheral edge of the separating element 14.

Preferably, the fluid passages 17c, 17d have a cross-sectional area of fluid flow which increases as the distance from the second passage 35 allowing a fluid outlet from the second collection chamber 16 increases.

Within the framework of this preferred embodiment, the total cross-sectional area of fluid flow defined by the plurality of through holes 17a', by the first flow passages 17c, 17d and by the through hole 17g is comprised between 5% and 20% of the total internal cross-section of the containment casing 11.

The Applicant has experimentally found that by observing such specific values of the total cross-sectional area of fluid flow of the second heat transfer fluid defined in this way, an effective optimisation of the fluid dynamics of the second heat transfer fluid is achieved.

In a further preferred embodiment and as illustrated in FIG. 11, the desired increase of the cross-sectional area of fluid flow of the second heat transfer fluid is achieved by defining a plurality of first fluid passages 17a, 17c, 17d and 17f between the peripheral edge of the separating element 14 and the peripheral side wall 11c of the containment casing 11 and a through hole 17g in a spacer 14f extending from such a peripheral edge of the separating element 14 in the lower zone thereof.

Preferably, the fluid passages 17a, 17c, 17d and 17f have a cross-sectional area of fluid flow that increases as the distance from the second passage 35 allowing a fluid outlet from the second collection chamber 16 increases.

In this further preferred embodiment, the total cross-sectional area of fluid flow defined by the fluid passages 17a, 17c, 17d and 17f and by the through hole 17g is comprised between 5% and 20% of the total internal cross-section of the containment casing 11.

Also in this case and similarly to the previous embodiments, the Applicant has experimentally found that by observing such specific values of the total cross-sectional area of fluid flow of the second heat transfer fluid defined in this way, an effective optimisation of the fluid dynamics of the second heat transfer fluid is achieved.

In a preferred embodiment and as illustrated for example in FIGS. 12a-14b, the separating element 14 further comprises a plurality of heat exchange protrusions 23 extending from a rear face of the separating element 14 facing the rear wall 11d of the casing 11.

More specifically, the heat exchange protrusions 23 extend from the rear face of the peripheral crown 14b about the housing seat 14a of the disc 19.

In the preferred embodiment of FIGS. 12a-14b, the heat exchange protrusions 23 are peg-shaped.

In this way, the heat exchange protrusions 23 extend in the second collection chamber 16, in this case having a substantially annular configuration, defined between the rear wall of the separating element 14 and the rear wall 11d of the containment casing 11, thereby advantageously increasing the heat exchange between the second heat transfer fluid which flows in the second collection chamber 16 and the heat exchange portion of the separating element 14 (the peripheral crown 14b).

Preferably, the heat exchange protrusions 23 are aligned with each other so as to form circumferentially spaced rows extending along a direction inclined with respect to the radial direction.

In this preferred embodiment, therefore, the plurality of heat exchange protrusions 23 is distributed so as to define at least one channel and more preferably, a plurality of passage channels 25 of the second heat transfer fluid extending along a direction inclined with respect to the radial direction, so as to impart to the flow of the second heat transfer fluid an advantageous centripetal motion towards the housing seat 14a of the heat-insulating disc 19.

In this way, the flow of the second heat transfer fluid is advantageously distributed substantially along the entire cross section of the second collection chamber 16 thereby limiting to the maximum extent the presence of dead zones within the chamber.

In alternative preferred embodiments, not shown, such protrusions 23 may be fin-shaped.

In the preferred embodiment of FIGS. 12a-12b, the separating element 14 is similar to that of FIGS. 10 and 11 purely as a non-limiting example, since the heat exchange protrusions 23 can be equally foreseen in any other embodiment of the separating element 14.

In a further preferred embodiment and as illustrated for example, again as a non-limiting example, in FIGS. 13a-13b and 14a-14b, at least one portion of the rear face of the peripheral crown 14b of the separating element 14 is free from heat exchange protrusions 23, also in this case preferably peg-shaped. In such portions, the heat exchange protrusions 23 are shown with broken lines.

In this additional preferred embodiment, the heat exchange protrusions 23 are aligned with each other so as to form rows extending along a substantially radial direction.

Also in this preferred embodiment, therefore, the plurality of heat exchange protrusions 23 is distributed in such a way as to define at least one channel and, more preferably, a plurality of channels 25 for the flow of the second heat transfer fluid extending along a substantially radial direction so as to direct the second heat transfer fluid towards the centre of the second collection chamber 16 where the heat exchange protrusions 23 are located.

Also in this case and similarly to the previous preferred embodiment illustrated in FIGS. 13*a*-13*b*, it is therefore advantageously possible to impart to the flow of the second heat transfer fluid a centripetal motion towards the housing seat 14*a* of the heat-insulating disc 19 so as to ensure that the flow of the second heat transfer fluid is distributed substantially along the entire cross section of the second collection chamber 16 thereby limiting to the maximum extent the presence of dead zones within the chamber.

In the preferred embodiment of the separating element 14 shown in FIGS. 14*a*-14*b*, the separating element 14 comprises the heat exchange protrusions 23 extending from the rear face of the peripheral crown 14*b*, the passage channels 25 of the second heat transfer fluid extending along a substantially radial direction and a plurality of substantially slot-shaped through slits 26 positioned about the housing seat 14*a* of the disc 19.

This preferred configuration of the separating element 14 is particularly advantageous in that the slits 26 lead to a partial thermal de-coupling between the housing seat 14*a* of the disc 19 and the peripheral crown 14*b*, the latter being in contact with the first inlet coil of the heat exchanger 13, significantly colder than the disc 19 housed in the central housing seat 14*a*.

Thanks to this partial thermal de-coupling and similarly to what has been outlined above in the preferred embodiment illustrated in FIGS. 9*a*-9*b*, the peripheral crown 14*b* of the separating element 14 and therefore the heat exchange protrusions 23 extending from such a portion are significantly colder in operation, thus favouring the condensation in the second collection chamber 16 of the second heat transfer fluid.

In the preferred embodiment of the separating element 14 illustrated in FIGS. 13*a*-13*b*, the closing partition wall 14*d* only comprises a portion of the disc-shaped body of the separating element 14 extending between the peripheral side wall 11*c* of the casing 11 and a portion of the peripheral edge of the at least one separating element 14.

In this preferred embodiment, the plate-shaped portion 14*c* is therefore not foreseen.

The separating element 14 according to the preferred embodiment illustrated in FIGS. 13*a*-13*b*, is therefore configured for use within a casing 11 in which the inner opening 11*f* in the thickness of the peripheral side wall 11*c* is not present.

In the preferred embodiment shown in FIGS. 14*a*-14*b*, the separating element 14 further includes a plurality of diverting fins 24 extending from the peripheral edge of the separating element 14 and having a development along a radial direction towards the peripheral side wall 11*c* of the casing 11 and optionally along the axial direction towards the rear wall 11*d* of the casing 11.

Advantageously, the fins 24 allow to adjust the fluid dynamics of the second heat transfer fluid within the second collection chamber 16, hindering a purely peripheral flow of said second heat transfer fluid that would lead the fluid to reach the second passage 35 allowing a fluid outlet of the second heat transfer fluid from the second collection chamber 16 substantially by-passing the annular area in which the heat exchange protrusions 23 are extending.

In the preferred embodiment of FIG. 15, the second collection chamber 16 is defined at an axially external position with respect to the heat exchanger 13 between the separating element 14, the peripheral side wall 11*c* and the front wall 22 of the containment casing 11.

In this preferred embodiment, the heat exchange cell 10 is preferably used as a heat recuperator, i.e. as an apparatus capable of recovering the heat possessed by a hot gas, for example hot combustion gases coming from a separate heat exchange cell.

The heat exchange cell 10 of this preferred embodiment is substantially similar, in its essential elements, to the previous embodiments described with reference to the remaining figures.

Also in this preferred embodiment the substantially annular heat-insulating element 33 is housed in the respective housing seat 34 formed in the front wall 22 of the containment casing 11 so as to achieve the maximum reduction of axial size of the heat exchange cell 10.

Preferably, the second collection chamber 16 of the second heat transfer fluid is therefore defined in the front area of the cell 10 coaxially and externally with respect to the substantially annular heat-insulating element 33, suitably exploiting a part of the axial size of such an element.

This preferred configuration of the cell 10 allows to achieve the additional advantageous technical effect of an effective heat insulation of the second collection chamber 16 of the second heat transfer fluid. As a result, there is an improved heat exchange between the second and the first heat transfer fluids respectively flowing in the second collection chamber 16 and in the front end coil of the heat exchanger 13 and—where desired—an improved condensing capacity of the second collection chamber 16.

Within the framework of this preferred embodiment, the separating element 14 comprises a substantially ring-shaped body, whereas the heat exchange portion 14*b* of the separating element in contact with at least one portion of a front end coil of the heat exchanger 13 is substantially constituted by the aforementioned substantially ring-shaped body.

In this way, it is advantageously possible to maximise the heat exchange between the second and the first heat transfer fluids respectively flowing in the second collection chamber 16 and in the front end coil of the heat exchanger 13.

Preferably, the substantially ring-shaped body of the separating element 14 is in direct contact, without leaving interspaces and without interposition of heat-insulating elements, with the front end coil of the heat exchanger 13 to which the first heat transfer fluid having the lowest temperature is advantageously fed.

This preferred configuration and similarly to what has been outlined above, allows to increase the heat exchange between the second heat transfer fluid that touches the front face of the separating element 14 and the heat exchanger 13, in particular increase the heat exchange with the front end coil of the heat exchanger, thereby increasing when desired the ability of recovering the latent condensation heat of the heat exchange cell 10.

Preferably, the substantially ring-shaped body of the front separating element 14 is radially external with respect to the substantially annular heat-insulating element 33.

Also in this case, it is thus advantageously possible to transfer a part of the heat absorbed by the substantially annular heat-insulating element 33 to the substantially ring-shaped separating element 14 and from this to the front end coil of the heat exchanger 13, thereby increasing the heat exchange efficiency of the cell 10.

Preferably, the substantially ring-shaped body of the front separating element 14 extends spiral-wise substantially with the same winding pitch as the coils of the heat exchanger 13.

Also in this preferred embodiment, therefore, the second collection chamber 16 of the second heat transfer fluid defined in the front zone of the cell 10 preferably has a cross-sectional area of fluid flow variable along a circumferential direction, achieving the advantageous technical effects described above and related to this feature.

As can be seen in FIG. 16, also in this preferred embodiment of the cell 10 the separating element 14 comprises—at the angular position where the second passage 35 allowing a fluid outlet from the second collection chamber 16 of the second heat transfer fluid is made—a closing partition wall 14d which extends between the peripheral side wall 11c of the casing 11 and a portion of the peripheral edge of the separating element 14 so as to close the fluid passage between the first collection chamber 15 and the second collection chamber 16 in such a zone.

In this way, it is advantageously possible to limit as much as possible direct by-pass phenomena of the second heat transfer fluid flowing from the first collection chamber 15 towards the second passage 35 allowing a fluid outlet from the second collection chamber 16 and to advantageously direct such a fluid towards the other zones of the second collection chamber 16 before it leaves the same.

Also in this case and similarly to the preferred embodiments illustrated earlier, the peripheral side wall 11c is formed in part by the half-shell 11a and in part by a plate-shaped portion 14c of the separating element 14 which is flush-mounted in the thickness of the peripheral side wall 11c and integrally extending from the closing partition wall 14d.

In this preferred embodiment, therefore, the axial end 11g of the peripheral side wall 11c of the containment casing 11 is defined at the front axial end of the peripheral side wall 11c, which is substantially defined at the joining area between the closing partition wall 14d and the plate-shaped portion 14c.

Unlike the previous preferred embodiments in which the second collection chamber 16 of the second heat transfer fluid is defined in the rear zone of the cell 10, the cell 10 can also be devoid of the third fluid passage and of the cap externally applied to the side wall 11c of the containment casing 11.

The opening 12a is therefore in this case defined at the free end of a substantially tubular element 11h extending from the side wall 11c of the containment casing 11 and preferably integrally formed with the half-shell 11a.

Unlike the previous preferred embodiments in which the second collection chamber 16 of the second heat transfer fluid is defined in the rear zone of the cell 10, the rear heat-insulating disc 19 facing towards the feeding zone 21 of the second heat transfer fluid is housed in a respective housing seat 37 defined in the rear wall 11d of the containment casing 11, which rear wall 11d is in this case suitably shaped.

Also in this preferred embodiment in which the second collection chamber 16 of the second heat transfer fluid is defined in the front zone of the cell 10, it is possible to adopt the preferred configurations illustrated earlier with reference to the variant provided with a rearwardly-positioned second collection chamber 16, adapting these preferred configurations—if necessary—to the ring-shaped configuration of the separating element 14.

In the preferred embodiment of the heat exchange cell 10 shown in FIG. 17, the peripheral side wall 11c does not have the inner opening 11f in the thickness thereof. The cap 11e provided with the outlet opening 12a of the second heat transfer fluid from the cell 10 is therefore also in this case laterally and externally defined with respect to the peripheral side wall 11c.

In this preferred embodiment, the closing partition wall 14d extends from the peripheral side wall 11c at the separating element 14 in such a way as to connect the peripheral side wall 11c with the peripheral crown 14b of the separating element 14 and to close at least locally the fluid communication between the first collection chamber 15 and the second collection chamber 16.

In the preferred embodiment of the heat exchange cell 10 shown in FIGS. 18 and 19, the cap 11e is offset with respect to the centreline plane of the heat exchange cell 10.

In this preferred embodiment, the closing partition wall 14d and the plate-shaped portion 14d have a circumferential extension greater than the embodiments provided with the cap 11e arranged along the axis so as to close, by shape coupling, the inner opening 11f formed in the thickness of the peripheral side wall 11c of the casing 11 and to limit a direct passage of the second heat transfer fluid from the first collection chamber 15 towards the second passage 35 allowing a fluid outlet from the second collection chamber 16.

A preferred embodiment of a heat exchange method according to the invention which may be carried out by means of the cell 10 described above will now be described with particular reference to FIGS. 1-7.

In an initial step of the method, the second heat transfer fluid is fed to the feeding zone 21, for example by means of the generation of combustion gases by means of the burner 20 positioned in such a zone (combustion chamber 21).

In a subsequent step, the second heat transfer fluid (combustion gases) flows through the coils of the heat exchanger 13 along a substantially radial direction (or axial-radial direction if the coils are inclined with respect to the longitudinal axis A-A of the heat exchanger 13) passing through the interstices 13b formed between two successive coils of the heat exchanger 13 and is collected in the first collection chamber 15 externally defined with respect to the heat exchanger 13.

During this passage, a first substantial transfer of heat takes place from the second to the first heat transfer fluid circulating inside the heat exchanger 13 preferably in countercurrent with respect to the flow direction of the combustion gases.

In a subsequent step, the second heat transfer fluid collected in the first collection chamber 15 is fed to the second collection chamber 16, rearwardly defined with respect to the heat exchanger 13, along a path substantially parallel to the peripheral side wall 11c of the casing 11 and in proximity thereto.

In a preferred embodiment of the method which may be carried out by means of the preferred embodiment of the cell 10 illustrated in FIGS. 1-7, this feeding step of the combustion gases (second heat transfer fluid) is carried out by means of the passages 17a-17f formed between the peripheral edge of the separating element 14 and the peripheral side wall 11c of the containment casing 11.

To this end and as already mentioned above, the separating element 14 is shaped so as to substantially mate with the cross-section of the casing 11 and has at least in part dimensions smaller than such a cross-section so as to peripherally define the passages 17a-17f along at least a portion of the peripheral side wall 11c of the casing 11.

In a preferred embodiment of the method, it is envisioned to limit the direct passage of the second heat transfer fluid from the first collection chamber 15 to the second collection chamber 16 by means of the closing partition wall 14d extending between the peripheral side wall 11c of the casing 11 and the separating element 14.

In this way, the advantageous technical effects outlined above are achieved, including a better control of the fluid dynamics of the second heat transfer fluid in the first collection chamber 15 and an optimization of the overall heat exchange.

In a preferred embodiment, which may be carried out by means of a cell 10 provided with a separating element 14 configured according to the variants of FIGS. 9a and 9b, the method can advantageously comprise the step of feeding a part (secondary flow) of the second heat transfer fluid from the first collection chamber 15 towards the second passage 35 allowing a fluid outlet from the second 16 collection chamber.

In a preferred embodiment, the method can advantageously comprise the step of adjusting the fluid dynamics of the second heat transfer fluid fed towards the second collection chamber 16, by adjusting the total cross-sectional area of fluid flow of the first passages 17a, 17a', 17b-17g and 14e formed between the peripheral edge of the separating element 14 and the peripheral side wall 11c of the containment casing 11 and/or in the peripheral area of the aforementioned separating element 14.

In a preferred embodiment, which may be carried out by means of a cell 10 provided with a separating element 14 configured according to the variant of FIG. 6, this adjusting step comprises uniformly distributing the flow rate of the second heat transfer fluid fed towards the second collection chamber 16 along the perimeter of said peripheral side wall 11c.

In an alternative preferred embodiment, which may be carried out by means of a cell 10 provided with a separating element 14 configured according to the variants of FIGS. 10 and 11, this adjusting step comprises distributing along the perimeter of the peripheral side wall 11c a flow of the second heat transfer fluid fed towards the second collection chamber 16 so as to increase the flow rate of such a fluid as the distance from the second passage 35 allowing a fluid outlet from the second collection chamber 16 increases.

These preferred embodiments achieve the advantageous technical effects illustrated above with reference to the description of the cell 10.

In a further step of the method of the invention, it is foreseen to carry out a heat exchange between the second heat transfer fluid flowing in the second collection chamber 16 and the first heat transfer fluid flowing within the end coil of the heat exchanger 13 by means of the heat exchange portion of the separating element 14 which may be constituted by the peripheral crown 14b of the separating element 14 (second rear collection chamber 16) or by the annular body of the separating element 14 itself in the variant of FIG. 16 (second front collection chamber 16).

In an additional step of the method of the invention, it is finally foreseen to discharge the second heat transfer fluid from the second collection chamber 16 along a direction substantially perpendicular to the longitudinal axis of the heat exchange cell 10 by means of the second passage 35 allowing a fluid outlet peripherally defined in the second collection chamber 16 between the axial end 11g of the peripheral side wall 11c and the rear wall 11d or the front wall 22 of the containment casing 11.

In a preferred embodiment of the method and according to particular application requirements of the heat exchange cell 10, it is envisioned to convey the second heat transfer fluid towards the heat exchange protrusions 23 extending from the rear face of the heat exchange portion of the separating element 14 facing the rear wall 11d of the casing 11 or from a front face of the heat exchange portion of the separating element 14 facing towards the front wall 22 of the casing 11, thereby obtaining an increased heat exchange and—where desired—a greater condensing capacity of the cell 10.

In a preferred embodiment of the method, it is envisioned to convey the second heat transfer fluid along a substantially radial direction and/or along a direction inclined with respect to the radial direction with a centripetal motion towards the central part of the second collection chamber 16 preferably by means of the passage channels 25 described above.

In a further preferred embodiment of the method, it is envisioned to divert the flow of the second heat transfer fluid by means of the aforementioned diverting fins 24 extending from the peripheral edge of the separating element 14 and having a development along a radial direction towards the peripheral side wall 11c of the casing 11 and possibly along the axial direction towards the rear wall 11d or the front wall 22 of the casing 11.

In a preferred embodiment, the method finally comprises the further step of feeding the second heat transfer fluid from the second collection chamber 16 to the third collection chamber 18 which is in fluid communication with the second passage 35 allowing a fluid outlet from the second chamber 16 and with the outlet opening 12a of the second heat transfer fluid from the cell 10.

The features of the heat exchange cell and method object of the invention as well as the relevant advantages are clear from the above description.

Additional variations of the embodiments described above are possible without departing from the teaching of the invention.

Finally, it is clear that several changes and variations may be made to the heat exchange cell and method thus conceived, all falling within the invention; moreover, all details can be replaced by technically equivalent elements. In practice, the materials used as well as the dimensions, can be whatever, according to the technical requirements.

The invention claimed is:

1. A heat exchange cell comprising:
   a containment casing comprising a rear wall, a front wall, and a peripheral side wall;
   a helically-shaped heat exchanger comprising at least one tubular duct for the flow of a first heat transfer fluid, wherein the at least one tubular duct is coiled about a longitudinal axis and defines a helix, wherein said heat exchanger is mounted in said containment casing;
   a feeding zone of a second heat transfer fluid, intended for a heat exchange with said first heat transfer fluid, defined in the containment casing coaxially and internally with respect to said helix;
   a first collection chamber of the second heat transfer fluid externally defined with respect to said heat exchanger between a radially outer wall of the heat exchanger and the peripheral side wall of the containment casing;
   a second collection chamber of the second heat transfer fluid at least partially delimited by at least one separating element mounted at an axially external position with respect to said heat exchanger;
   at least one first passage configured to allow a flow of the second heat transfer fluid from said first collection chamber to said second collection chamber substantially in parallel to said peripheral side wall and in proximity thereto;

at least one second passage allowing a fluid outlet from the second collection chamber, said at least one second passage being peripherally defined in said second collection chamber between an axial end of the peripheral side wall and the rear wall or the front wall of the containment casing; and at least one closing partition wall extending between the peripheral side wall of the containment casing and a portion of a peripheral edge of said at least one separating element at said at least one second passage defining a fluid outlet from the second collection chamber, said closing partition wall being configured to limit a direct fluid communication between the first collection chamber and the second collection chamber of the second heat transfer fluid, wherein the peripheral side wall of the casing encloses and laterally delimits the heat exchanger and the first collection chamber substantially along an entire axial extension of the heat exchanger and the first collection chamber, wherein said second collection chamber is defined at an axially external position with respect to said heat exchanger between said at least one separating element, the peripheral side wall, and the rear wall or the front wall of the containment casing, wherein said first and second collection chambers are separated by said at least one separating element and in fluid communication by means of the at least one first passage, and wherein said separating element comprises a heat exchange portion in contact with at least one portion of an end coil of the heat exchanger, the heat exchange portion being configured to allow a heat exchange between at least one coil portion of the heat exchanger and said second collection chamber.

2. The heat exchange cell according to claim 1, wherein said at least one first passage is at least one of:
formed between a peripheral edge of said at least one separating element and the peripheral side wall of the containment casing, and
formed in a peripheral area of said at least one separating element.

3. The heat exchange cell according to claim 1, wherein the total cross-sectional area of fluid flow defined by said at least one first passage is from 5% to 30% of the total internal cross-section of the containment casing.

4. The heat exchange cell according to claim 1, wherein said separating element includes at least one spacer protrusion that laterally extends from a peripheral edge of the separating element and abuts the peripheral side wall of the containment casing.

5. The heat exchange cell according to claim 1, further comprising a third collection chamber defined downstream of said second collection chamber, said third collection chamber being in fluid communication with said at least one second passage and an outlet opening from the heat exchange cell, said outlet opening being defined downstream of said third collection chamber.

6. The heat exchange cell according to claim 5, wherein said third collection chamber is defined in a cap extending from the peripheral side wall of the containment casing and positioned downstream of said at least one second passage.

7. The heat exchange cell according to claim 6, wherein said cap extends from the peripheral side wall of the containment casing at an inner opening formed at least in part in the peripheral side wall of the containment casing, and wherein said separating element further comprises a plate-shaped portion that extends from said at least one closing partition wall in parallel to the peripheral side wall of the casing.

8. The heat exchange cell according to claim 1, wherein said at least one closing partition wall extends from said portion of the peripheral edge of said at least one separating element or from the peripheral side wall of the casing at said at least one second passage.

9. The heat exchange cell according to claim 1, wherein said at least one closing partition wall comprises the at least one first passage configured to allow a flow of the second heat transfer fluid from said first collection chamber towards the at least one second passage.

10. The heat exchange cell according to claim 1, wherein a body of the separating element is substantially plate-shaped, and wherein said heat exchange portion of the separating element comprises a peripheral crown of said body.

11. The heat exchange cell according to claim 1, wherein a body of the separating element is substantially ring-shaped, and wherein said heat exchange portion of the separating element comprises a part of said body.

12. A heat exchange cell comprising:
a containment casing comprising a rear wall, a front wall, and a peripheral side wall;
a helically-shaped heat exchanger comprising at least one tubular duct for the flow of a first heat transfer fluid, wherein the at least one tubular duct is coiled about a longitudinal axis and defines a helix, wherein said heat exchanger is mounted in said containment casing;
a feeding zone of a second heat transfer fluid, intended for a heat exchange with said first heat transfer fluid, defined in the containment casing coaxially and internally with respect to said helix;
a first collection chamber of the second heat transfer fluid externally defined with respect to said heat exchanger between a radially outer wall of the heat exchanger and the peripheral side wall of the containment casing;
a second collection chamber of the second heat transfer fluid at least partially delimited by at least one separating element mounted at an axially external position with respect to said heat exchanger;
at least one first passage configured to allow a flow of the second heat transfer fluid from said first collection chamber to said second collection chamber substantially in parallel to said peripheral side wall and in proximity thereto; and
at least one second passage allowing a fluid outlet from the second collection chamber, said at least one second passage being peripherally defined in said second collection chamber between an axial end of the peripheral side wall and the rear wall or the front wall of the containment casing, wherein the peripheral side wall of the containment casing encloses and laterally delimits the heat exchanger and the first collection chamber substantially along an entire axial extension of the heat exchanger and the first collection chamber, wherein said second collection chamber is defined at an axially external position with respect to said heat exchanger between said at least one separating element, the peripheral side wall, and the rear wall or the front wall of the containment casing, wherein said first and second collection chambers are separated by said at least one separating element and in fluid communication by means of the at least one first passage, wherein said separating element comprises a heat exchange portion in contact with at least one portion of an end coil of the heat exchanger, the heat exchange portion being configured to allow a heat exchange between at least one coil portion of the heat exchanger and said second collection chamber, and wherein the separating element is shaped such that a cross-sectional area of fluid flow defined by said at least one first passage is configured to be one of:

uniformly distributed along a perimeter of said peripheral side wall, and increasing along the perimeter of said peripheral side wall as a distance from said at least one second passage increases.

13. The heat exchange cell according to claim 12, wherein said at least one first passage is at least one of:

formed between a peripheral edge of said at least one separating element and the peripheral side wall of the containment casing, and formed in a peripheral area of said at least one separating element.

14. The heat exchange cell according to claim 12, wherein the total cross-sectional area of fluid flow defined by said at least one first passage is from 5% to 30% of the total internal cross-section of the containment casing.

15. The heat exchange cell according to claim 12, wherein said separating element comprises a substantially plate-shaped or a substantially ring-shaped body.

16. The heat exchange cell according to claim 12, wherein said separating element includes at least one spacer protrusion that laterally extends from a peripheral edge of the separating element and abuts the peripheral side wall of the containment casing.

17. The heat exchange cell according to claim 12, further comprising a third collection chamber defined downstream of said second collection chamber, said third collection chamber being in fluid communication with said at least one second passage and an outlet opening from the heat exchange cell, said outlet opening being defined downstream of said third collection chamber.

18. The heat exchange cell according to claim 17, wherein said third collection chamber is defined in a cap extending from the peripheral side wall of the containment casing and positioned downstream of said at least one second passage.

19. The heat exchange cell according to claim 18, wherein said cap extends from the peripheral side wall of the containment casing at an inner opening formed at least in part in the peripheral side wall of the containment casing, and wherein said separating element further comprises a plate-shaped portion that extends from said at least one closing partition wall in parallel to the peripheral side wall of the casing.

20. A method of causing heat exchange between a first heat transfer fluid and a second heat transfer fluid in a heat exchange: cell, the heat exchange cell including:
a containment casing comprising a rear wall, a front wall and a peripheral side wall;
a helically-shaped heat exchanger comprising at least one tubular duct for the flow of a first heat transfer fluid coiled about a longitudinal axis to define a helix, said heat exchanger being mounted in said containment casing,
a feeding zone of a second heat transfer fluid, intended for the heat exchange with said first heat transfer fluid, defined in the casing coaxially and internally with respect to said helix,
a first collection chamber of the second heat transfer fluid externally defined with respect to said heat exchanger between a radially outer wall of the heat exchanger and the peripheral side wall of the containment casing,
a second collection chamber of the second heat transfer fluid at least partially delimited by at least one separating element mounted at an axially external position with respect to said heat exchanger,
wherein the peripheral side wall of the casing encloses and laterally delimits the heat exchanger and the first collection chamber of the second heat transfer fluid substantially along are entire axial extension of the heat exchanger and the first collection chamber,
wherein said first and second collection chambers of the second heat transfer fluid are separated from one another by said at least one separating element so as to define said second collection chamber between said at least one separating element, the peripheral side wall and the rear wall or the front wall of the containment casing,
wherein said separating element comprises a heat exchange portion in contact with at least one portion of an end coil of the heat exchanger, the heat exchange portion being configured to allow a heat exchange between at least one coil portion of the heat exchanger and the second heat transfer fluid flowing in said second collection chamber, the method comprising:

feeding the second heat transfer fluid in said feeding zone;

collecting the second heat transfer fluid in said first collection chamber;

feeding the second heat transfer fluid from said first collection chamber to said second collection chamber substantially in parallel to the peripheral side wall of the casing and in proximity thereto by means of at least one first passage formed between a peripheral edge of said at least one separating element and the peripheral side wall of the containment casing and/or in a peripheral area of said at least one separating element;

carrying out a heat exchange between the second heat transfer fluid flowing in said second collection chamber and the first heat transfer fluid flowing in the end coil of the heat exchanger by means of said heat exchange portion of the separating element; and discharging the second heat transfer fluid from the second collection chamber along a direction substantially perpendicular to a longitudinal axis of the heat exchange cell by means of at least one second passage allowing a fluid outlet peripherally defined in said second collection chamber between an axial end of the peripheral side wall and the rear wall or the front wall of the containment casing.

* * * * *